US012806609B2

(12) United States Patent
Baker et al.

(10) Patent No.: US 12,806,609 B2

(45) Date of Patent: Nov. 24, 2026

(54) POLYIONIC NANOCLAYS

(71) Applicant: THE CURATORS OF THE UNIVERSITY OF MISSOURI, Columbia, MO (US)

(72) Inventors: Gary A Baker, Columbia, MO (US); Nathaniel E. Larm, Columbia, MO (US)

(73) Assignee: THE CURATORS OF THE UNIVERSITY OF MISSOURI, Columbia, MO (US)

( * ) Notice: Subject to any disclaimer, the term of this patent is extended or adjusted under 35 U.S.C. 154(b) by 596 days.

(21) Appl. No.: 17/656,383

(22) Filed: Mar. 24, 2022

(65) Prior Publication Data

US 2022/0305472 A1 Sep. 29, 2022

Related U.S. Application Data

(60) Provisional application No. 63/165,253, filed on Mar. 24, 2021.

(51) Int. Cl.

*B01J 31/12* (2006.01)

*B01D 15/00* (2006.01)

(Continued)

(52) U.S. Cl.

CPC ............ *B01J 31/127* (2013.01); *B01D 15/00* (2013.01); *B01J 23/52* (2013.01); *B01J 31/26* (2013.01);

(Continued)

(58) Field of Classification Search

CPC . B01J 31/127; B01J 31/26; B01J 37/04; B01J 37/16; B01J 2531/005;

(Continued)

(56) References Cited

U.S. PATENT DOCUMENTS 8,334,232 B2 12/2012 Jess et al.

8,454,832 B2 6/2013 Hamad et al.

(Continued)

FOREIGN PATENT DOCUMENTS

CN 105148989 A 12/2015

CN 103599707 B 1/2016

(Continued)

OTHER PUBLICATIONS

Gopinath Sanjay and Sankaran Sugunan, Glucoamylase immobilized on montmorillonite: influence of nature of binding on surface properties of clay-support and activity of enzyme, 2007, J Porous Mater, 14:127-136 (Year: 2007).*

(Continued)

*Primary Examiner* — Bobby Ramdhanie

*Assistant Examiner* — William Addison Geisbert

(74) *Attorney, Agent, or Firm* — McKee, Voorhees & Sease, PLC

(57) ABSTRACT

Disclosed herein are organic-inorganic hybrid materials, in particular polyionic nanoclays, along with methods of making and using the same. The functionalized organic-inorganic hybrid materials are preferably of a phyllosilicate structure and comprise an octahedral ionic layer sandwiched between two tetrahedral layers, one or more charged chemical moieties covalently bonded to the tetrahedral layers, and optionally one or more counterions or functional groups associated with the hybrid materials. Methods of producing the same, by contacting a silane with a nucleophile and hydrolyzing the product thereof in the presence of a metal salt, are also provided.

18 Claims, 36 Drawing Sheets

(32 of 36 Drawing Sheet(s) Filed in Color)

(51) Int. Cl.

| | |
|---|---|
| ***B01J 23/52*** | (2006.01) |
| ***B01J 31/26*** | (2006.01) |
| ***B01J 35/30*** | (2024.01) |
| ***B01J 35/34*** | (2024.01) |
| ***B01J 35/45*** | (2024.01) |
| ***B01J 35/70*** | (2024.01) |
| ***B01J 37/04*** | (2006.01) |
| ***B01J 37/16*** | (2006.01) |
| *B01J 35/23* | (2024.01) |

(52) U.S. Cl.
CPC ............. *B01J 35/34* (2024.01); *B01J 35/393* (2024.01); *B01J 35/395* (2024.01); *B01J 35/45* (2024.01); *B01J 35/70* (2024.01); *B01J 37/04* (2013.01); *B01J 37/16* (2013.01); *B01J 35/23* (2024.01); *B01J 2235/00* (2024.01); *B01J 2235/05* (2024.01); *B01J 2235/10* (2024.01); *B01J 2235/15* (2024.01); *B01J 2235/30* (2024.01); *B01J 2531/005* (2013.01)

(58) Field of Classification Search
CPC ........ B01J 31/0254; B01J 35/23; B01J 35/30; B01J 35/393; B01J 37/0209; B01J 23/52; B01J 31/12; B01J 20/12; B01J 20/32; B01J 2235/00; B01J 2235/05; B01J 2235/10; B01J 2235/15; B01J 2235/30; B01D 15/00; C02F 2305/08; C02F 1/288
USPC .......................................................... 210/660
See application file for complete search history.

(56) References Cited

U.S. PATENT DOCUMENTS

| | | | |
|---|---|---|---|
| 2006/0278536 A1 | 12/2006 | Burrell et al. | |
| 2009/0030229 A1 | 1/2009 | Riisager et al. | |
| 2009/0266230 A1 | 10/2009 | Radosz et al. | |
| 2011/0236295 A1 | 9/2011 | Anderson et al. | |

FOREIGN PATENT DOCUMENTS

| | | | |
|---|---|---|---|
| WO | 2013010676 A2 | 1/2013 | |
| WO | 2013181345 A2 | 12/2013 | |
| WO | WO-2019162638 A1 * | 8/2019 | ............. B01J 20/12 |

OTHER PUBLICATIONS

Ning An, Chun Hui Zhou, Xiao Yu Zhuang, Dong Shen Tong, Wei Hua Yu, "Immobilization of enzymes on clay minerals for biocatalysts and biosensors" (Year: 2015).*
Jianhua Huang, Yuanfa Liu, XingguoWang "Silanized palygorskite for lipase immobilization", Journal of Molecular Catalysis B: Enzymatic 57 (2009) 10-15 (Year: 2009).*
K. K. R. Datta, A. Achariâ a and M. Eswaramoorthy "Aminoclay: a functional layered material with multifaceted applications", J. Mater. Chem. A, 2013,1, 6707-6718 (Year: 2013).*
Machine translation including english and original of specification of WO 2019162638A 1 (Year: 2019).*
Machine translation including english and original of claims of WO 2019162638A 1 (Year: 2019).*
Full machine translation, english only of WO2019162638A1 (Year: 2019).*
Zhao et. al., J. Phys. Chem. C 2011, 115, 6350-6359 (Year: 2011).*
Habibi N, Kamaly N, Memic A, Shafiee H. Self-assembled peptide-based nanostructures: Smart nanomaterials toward targeted drug delivery. Nano Today. Feb. 2016;11(1):41-60. doi: 10.1016/j.nantod.2016.02.004. PMID: 27103939; PMCID: PMC4834907. (Year: 2016).*
Dudkin, Loukhina, Isupov, Avvakumov, Russian Journal of Applied Chemistry, vol. 78, No. 1, 2005, pp. 33-37. Translated from Zhurnal Prikladnoi Khimii, vol. 78, No. 1, 2005, pp. 36-40. (Year: 2005).*
Anand Kumar, Kristian Klumpp, Chen Barak, Giora Rytwo, Michael Plotze, Thomas Peter, and Claudia Marcolli, Atmos. Chem. Phys., 23, 4881-4902, 2023 (Year: 2023).*
https://chem.libretexts.org/@go/page/36441 24.03 Basicity of Amines (Year: 2025).*
A. Achari, K.K.R. Datta, M. De, V.P. Dravid, Amphiphilic aminoclay-RGO hybrids: a simple strategy to disperse a high concentration of RGO in water, 2013, Nanoscale, 5, 5316-5317) (Year: 2013).*
Rajendra R Bhat and Jan Genzer 2007 Nanotechnology 18 025301 (Year: 2007).*
Biro JC. Amino acid size, charge, hydropathy indices and matrices for protein structure analysis. Theor Biol Med Model. Mar. 22, 2006;3:15. doi: 10.1186/1742-4682-3-15. PMID: 16551371; PMCID: PMC1450267 (Year: 2006).*
Eswaramoorthy Muthusamy, Dominic Walsh, and Stephen Mann "Morphosynthesis of Organoclay Microspheres with Sponge-like or Hollow Interiors" Adv. Mater. 2002, 14, No. 13-14, Jul. 4, 2002.*
Rao, Datta, Muthusamy Eswaramoorthy, and George, "Light-Harvesting Hybrid Hydrogels: Energy-Transfer-Induced Amplified Fluorescence in Noncovalently Assembled ChromophoreOrganoclay Composites", Angewandte Chemie International Edition 50, 5, 2011 (pp. 1179-1184) (Year: 2011).*
Zhao et. al., J. Phys. Chem. C 2011, 115, 6350-6359 (Year: 2011) (Year: 2011).*
Zhou, "Designing Supported Ionic Liquids (ILs) within Inorganic Nanosheets for CO2 Capture Applications", ACS Appl. Mater. Interfaces 2016, 8, 5547-5555 (Year: 2016).*
Mateyawa, "Effect of the ionic liquid 1-ethyl-3-methylimidazolium acetate on the phase transition of starch: Dissolution or gelatinization? ", Carbohydrate Polymers 94 (2013) 520-530 (Year: 2013).*
Benachour, "Multifunctional Peptide-Conjugated Hybrid Silica Nanoparticles for Pho-todynamic Therapy and MRI", Theranostics 2012, 2(9):889-904 (Year: 2012).*
Jiang, "Magnetic nanoparticles supported ionic liquids for lipase immobilization: Enzyme activity in catalyzing esterification", Journal of Molecular Catalysis B: Enzymatic 58 (2009) 103-109 (Year: 2009).*
Xin and Hao, "Imidazolium-based ionic liquids grafted on solid surfaces", Chem. Soc. Rev., 2014, 43, 7171 (Year: 2014).*
Beall et al., "Analysis of Oligonucleotide DNA Binding and Sedimentation Properties of Montmorillonite Clay Using Ultraviolet Light Spectroscopy", Biomacromolecules. Jan. 12, 2009; 10(1): 105-112 (Year: 2009).*
Antonietti et al., "Ionic Liquids for the Convenient Synthesis of Functional Nanoparticles and Other Inorganic Nanostructures," Angewandte Chemie International Edition, Sep. 2004, vol. 43, Issue 38, pp. 4988-4992.
Baker et al., "An analytical view of ionic liquids," The Analyst, Apr. 2005, vol. 130, Issue 6, pp. 800-808.
Bauer et al., "Dynamic Equilibria in Supported Ionic Liquid Phase (SILP) Catalysis: In-Situ IR Spectroscopy Identifies [Ru(CO)xCly]n Species in Water Gas Shift Catalysis," Catalysis Science & Technology, Jan. 2018, vol. 8, Issue 1: 344-357, pp. 1-25.
Berthod et al., "Ionic liquids in separation techniques," Journal of Chromatography A, Mar. 2008, vol. 1184, Issues 1-2, pp. 6-18.
Bhawawet et al., "Ionic Liquid Anion Controlled Nanoscale Gold Morphology Grown at a Liquid Interface," Langmuir, May 2017, vol. 33, No. 24: 6029-6037, pp. 1-30.
Burkett et al., "Synthesis, Characterization, and Reactivity of Layered Inorganic-Organic Nanocomposites Based on 2:1 Trioctahedral Phyllosilicates," Chemistry of Materials, May 1997, vol. 9, No. 5, pp. 1071-1073.
Castillo et al., "Supported Ionic-Liquid Films (SILF) as Two-Dimensional Nanoreactors for Enantioselective Reactions: Surface-Mediated Selectivity Modulation (SMSM)," Chemistry- A European Journal, Dec. 2006, vol. 13, Issue 1, pp. 287-291.
Datta et al., "Aminoclay: a functional layered material with multi-faceted applications," Journal of Materials Chemistry A, Mar. 2013, vol. 1, Issue 23: 6707-6718, pp. 1-13.

(56) References Cited

OTHER PUBLICATIONS

Deraedt et al., "Sodium borohydride stabilizes very active gold nanoparticle catalysts," Chemical Communications, Sep. 2014, vol. 50, Issue 91:14194-14196, pp. 1-3.
Dupont et al., "Ionic Liquid (Molten Salt) Phase Organometallic Catalysis," Chemical Reviews, Aug. 2002, vol. 102, No. 10, pp. 3667-3692.
Fehrmann et al., Supported Ionic Liquids: Fundamentals and Applications, New Jersey, Wiley-VCH, Mar. 2014, pp. 1-473.
Ferre et al., "Recyclable organocatalysts based on hybrid silicas," Green Chemistry, Jan. 2016, vol. 18, No. 4: 881-922, pp. 1-52.
Gaharwar et al., "2D Nanoclay for Biomedical Applications: Regenerative Medicine, Therapeutic Delivery, and Additive Manufacturing," Advanced Materials, Jun. 2019, vol. 31, Issue 23: 1900332, pp. 1-28.
Ha et al., "Functionalization of Nanoclays with Ionic Liquids for Polypropylene Composites," Polymer Composites, May 2009, vol. 30, Issue 5, pp. 534-542.
Han et al., "Ionic Liquids in Separations," Accounts of Chemical Research, Oct. 2007, vol. 40, No. 11, pp. 1079-1086.
He et al., "Nanoparticles in ionic liquids: Interactions and organization," Physical Chemistry Chemical Physics, Jun. 2015, vol. 17, Issue 28, pp. 1-23.
Ito et al., "Sulfonated polyimide/ionic liquid composite membranes for carbon dioxide separation," Polymer Journal, Jun. 2017, vol. 49, pp. 671-676.
Kim et al., "Aqueous synthesis and stabilization of highly concentrated gold nanoparticles using sterically hindered functional polymer," Chemical Physics Letters, Jun. 2013, vol. 575, pp. 1-21.
Larm et al., "Bottom-up formation of ionic liquid-functionalized polyionic nanoclays (PINCs): a new generation of SIL technology," Communication, Wiley-VCH, 6 pages.
Lemus et al., "Characterization of Supported Ionic Liquid Phase (SILP) materials prepared from different supports," Adsorption, 2011, vol. 17, pp. 561-571.
Manojkumar et al., "A short review on stable metal nanoparticles using ionic liquids, supported ionic liquids, and poly(ionic liquids)" Journal of Nanoparticle Research, Apr. 2016, vol. 18, Issue 4: 103, pp. 1-22.
Marr et al., "Entrapping homogeneous catalysts by sol-gel methods: the bottom-up synthesis of catalysts that recycle and cascade," Dalton Transactions, Jan. 2011, vol. 40, No. 1, pp. 20-26.
Monge-Marcet et al.,"Imidazolium-derived organosilicas for catalytic applications," Catalysis Science & Technology, Dec. 2011, vol. 1, Issue 9, pp. 1544-1563.
Ravula et al., "Sunlight-assisted route to antimicrobial plasmonic aminoclay catalysts," Nanoscale, 2015, vol. 7, pp. 86-91.
Ray et al., "Synthesis and Characterization of High Concentration Block Copolymer-Mediated Gold Nanoparticles," Langmuir, Mar. 2011, vol. 27, No. 7, pp. 4048-4056.
Riisager et al., "Supported ionic liquids: versatile reaction and separation media," Topics in Catalysis, Nov. 2006, vol. 40, Nos. 1-4. pp. 91-102.
Riisager et al., "Very Stable and Highly Regioselective Supported Ionic-Liquid-Phase (SILP) Catalysis: Continuous-Flow Fixed-Bed Hydroformylation of Propene," Angewandte Chemie International Edition, Jan. 2005, vol. 44, No. 5, pp. 815-819.
Romanovsky et al., "Supported ionic liquids in catalysis," Russian Chemical Reviews, May 2017, vol. 86, No. 5, pp. 444-458.
Wasserscheid et al., "Ionic Liquids—New "Solutions," for Transition Metal Catalysis," Angewandte Chemie International Edition, Nov. 2000, vol. 39, pp. 3773-3789.
Xin et al., "Imidazolium-Based Ionic Liquids Grafted on Solid Surfaces," Chemical Society Reviews, Jul. 2014, vol. 43. Issue 20: 7171-7187, pp. 1-18.
Zhao et al., "Tuning Task-Specific Ionic Liquids for the Extractive Desulfurization of Liquid Fuel," ACS Sustainable Chemistry & Engineering, Aug. 2016, vol. 4, No. 9: 4771-4780, pp. 1-32.

* cited by examiner

A. 70 wt% [ppy]Cl PINC/PVA film (average thickness = 0.149 mm)

B. 70 wt% [mpim]Cl PINC/PVA film (average thickness = 0.155 mm)

C. 70 wt% [mppyr]Cl PINC/PVA film (average thickness = 0.169 mm)

POLYIONIC NANOCLAYS

CROSS-REFERENCE TO RELATED APPLICATIONS

This application claims priority under 35 U.S.C. § 119 to provisional application Ser. No. 63/165,253, filed Mar. 24, 2021, herein incorporated by reference in its entirety.

TECHNICAL FIELD

The present disclosure relates to organic-inorganic hybrid materials and methods of making the same by linking organic molecules to inorganic supports. More particularly, the functionalized organic-inorganic hybrid materials comprise atomically thin inorganic nanosheet supports whose surfaces are functionalized with organic ion chemistries. The nanosheets of the disclosure provide several benefits, such as an extremely high ionic density on the nanosheet surface, the ability to provide supplementary functionality based on the selected ion chemistry, and the facility for tailoring the organic component or mixed moieties.

TECHNICAL BACKGROUND

Material multifunctionality is an important trait in contemporary material science. Novel materials combining inorganic sheets or lattices can be assigned various physical properties based on the traits of molecular chemistry associated with the inorganic substrate. However, obtaining such material in the form of chemically active, atomically thin substrates is very difficult.

The existing technology largely focuses on ionic liquids. Ionic liquids (ILs) have amassed considerable academic and industrial attention as alternatives to traditional solvents for a wide range of applications including liquid-liquid separations, catalysis, and nanoparticle synthesis. Relatedly, nanofilm layers of IL dispersed on solid substrates, coined supported ionic liquids (SILs), have also received significant attention as an alternative to bulk IL. Because these SILs mimic the physicochemical properties of bulk IL in a nanoscale layer on a solid support, they impart several inherent benefits over bulk IL such as an increase in diffusivity of analytes within the SIL nanofilm, alleviating the retardation of reaction rates observed in viscous IL solution, a greater affinity for continuous flow (rather than batch) applications, increasing product throughput, and an inclusion of a tailorable solid support, promoting simple separation and recovery of the SIL.

When preparing SILs, selection of a support and synthesis direction (e.g., top-down or bottom-up) is vital, as the substrate has extensive control over the surface area, solid-state packing efficiency, and dispersibility of the SIL composite in solvents. Traditionally SIL synthesis favors top-down methods of IL dispersion onto porous three-dimensional and lamellar two-dimensional substrates by exploiting physisorption (e.g., van der Waals forces and hydrogen bonding interactions) or chemisorption (e.g., covalent bonding) between the cation of the IL and the substrate surface.

Despite the simplified appearance of these top-down approaches and the access they provide to both two- and three-dimensional supports, the top-down methodology imparts several significant drawbacks. First, pre-treatment of the substrate is often required before IL modification. Second, the IL and substrate must be solvent-compatible limiting the selection of the materials. Third, heterogenous surfaces can result from incomplete IL deposition, reducing the efficacy of the material. Fourth, the IL product requires separation/purification from excess IL and unmodified substrate.

Although others have attempted to mitigate these deficiencies, the successful solutions encompass bottoms-up procedures for synthesizing three-dimensional SILs. However, there is an absence of methods for two-dimensional SIL synthesis.

Thus, there exists a need for novel materials that overcome the deficiencies of ILs and SILs.

Further, there is a need to develop methods of synthesis for two-dimensional SIL synthesis at least because two-dimensional substrates intrinsically possess more accessible and less size-restricted surface areas, increasing diffusion rates during continuous-flow reactions and increasing SIL efficiency over a broader range of catalytic and separations applications.

These and other objects, advantages, and features of the present disclosure will become apparent from the following specification taken in conjunction with the claims set forth herein.

BRIEF SUMMARY

An advantage of the methods and hybrid materials disclosed herein is the chemical tailorability of the of the polyionic nanoclays that can be achieved by using multiple ionic silanes during the synthesis of the clay nanosheets. Beneficially, this tailorability can occur on or with any suitable structure/form of the nanoclays, for example a 2:1 lamellar sheet, a 1:1 clay, or the like.

Disclosed herein are organic-inorganic hybrid materials comprising: an inorganic metal silicate clay nanosheet having a surface and comprising an inorganic metal and a plurality of silicon atoms; wherein the surface is modified by covalent attachment ("decorated") with a plurality of charged organic moieties; and wherein the charged organic moieties are covalently bound to the silicon atoms at the surface.

In some embodiments, the functionalized organic-inorganic hybrid materials further comprise a plurality of non-covalent counterions having a charge opposite to the charged organic moieties, wherein the non-covalent counterions accompany the charged organic moieties to maintain electric neutrality.

In further embodiments, the charged organic moieties comprise one or more cationic groups. In an embodiment, the one or more cationic groups comprise imidazolium, pyrrolidinium, pyridinium, cholinium, ammonium, phosphonium, sulfonium, a small biological species, a metal cation, a complex cation, a cationic fluorophore, or a combination thereof. In a still further embodiment, the small biological species comprises a saccharide, a peptide, or a combination thereof.

In some embodiments, the non-covalent counter ions comprise one or more anionic groups. According to an embodiment, the one or more anionic groups comprise hexafluorophosphate, tetrafluoroborate, triflate, dicyanamide, methyl sulfate, dimethyl phosphate, acetate, trifluoroacetate, perchlorate, an amino acid, a carboxylate, bis(trifluoromethylsulfonyl)imide, an alkylsulfate, a sulfate, a halide, a pseudo-halide, a chromophore, a fluorophore, a complex anion, or a combination thereof.

In a further embodiment, the non-covalent counterion or the charged organic moiety comprises a fluorophore, wherein the fluorophore is a natural fluorophore, synthetic fluorophore, fluorescent protein, fluorescent peptide, nucleic acid, fluorogenic dye, reactive dye, or a combination thereof.

In a still further embodiment, the charged organic moieties comprise an anionic group. In a further embodiment, the anionic group comprises an alkylsulfate, alkylsulfonate, alkylcarboxylate, alkylphosphate, or a combination thereof.

In some embodiments, the charged organic moieties comprise a covalently bound zwitterionic organic moiety, such as a betaine, amino acid, or a combination thereof. In such an embodiment, no counterion is necessary to satisfy electroneutrality.

In an embodiment, charged organic moiety comprises a pendant reactive group. In a still further embodiment, the pendant group comprises a vinyl group, alkene, alkyne, methacrylate, alkyl halide, amine, epoxide, aldehyde, ketone, sulfhydryl group, maleimide, carboxylate, isothiocyanate, NHS ester, sulfonyl chloride, tosylate ester, glyoxal, photoreactive cross-linker, or a combination thereof.

In a further embodiment, the pendant reactive group is covalently coupled to a fluorescent probe, contrast agent, oligomer, polymer, chelating, extracting, targeting, or therapeutic ligand, aptamer, nucleic acid, enzyme, peptide, lipid, nanoparticle, or natural or synthetic antibody, or a combination thereof.

According to some embodiments, the functionalized organic-inorganic hybrid material further comprises one or more metal nanoparticles, bi-metallic nanoparticles, multi-metallic nanoparticles, or a combination thereof. In an embodiment, the one or more nanoparticles are supported on the surface of the inorganic metal silicate clay nanosheet.

According to some embodiments, the inorganic metal comprises $Mg^{2+}$, $Ca^{2+}$, $Zn^{2+}$, $Mn^{2+}$, $Co^{2+}$, $Ni^{2+}$, $Cu^{2+}$, $Ce^{3+}$, $Fe^{3+}$, $Al^{3+}$ or a lanthanide.

In an embodiment, the metal silicate clay nanosheet is a 1:1 clay and wherein the inorganic metal forms an octahedral oxide sheet and the silicon atoms form a tetrahedral sheet. In a further embodiment, the metal silicate clay nanosheet is a 2:1 clay wherein the inorganic metal forms an octahedral oxide layer, and wherein the octahedral oxide layer is sandwiched on both sides by a tetrahedral sheet comprising the silicon atoms.

In an embodiment, the functionalized organic-inorganic hybrid material has an individual sheet thickness of 5 nanometers or less. In a further embodiment, the functionalized organic-inorganic hybrid material has a completely or partially functionalized surface.

In some embodiments, the functionalized organic-inorganic hybrid material of claim is incorporated within a film, self-supported membrane, conformal coating, network, bulk material, or a combination thereof.

Additionally disclosed herein are methods of synthesizing a functionalized organic-inorganic hybrid material comprising: (i) reacting at least one non-ionic silane with at least one nucleophile to generate at least one ionic organosilane having a plurality of charged organic moieties; wherein the charged organic moieties are covalently bound to the organosilane; and (ii) reacting the ionic organosilane with a metal salt to form a functionalized organic-inorganic hybrid material comprising a clay nanosheet having a surface and comprising an inorganic metal and a plurality of silicon atoms; wherein the surface is modified by covalent attachment with a plurality of organic moieties; and wherein the charged organic moieties are covalently bound to the silicon atoms at the surface.

In some embodiments, the method of synthesizing further comprises one or more steps of (iii) dissolving the functionalized organic-inorganic hybrid material in water to form an aqueous solution; (iv) contacting the aqueous solution with one or more nanoparticles in the presence of a reducing agent; and (v) stabilizing the one or more nanoparticles on the surface of the functionalized organic-inorganic hybrid material. In a preferred embodiment, the nanoparticles are gold nanoparticles.

Alternatively, in some embodiments, the method of synthesizing further comprises one or more steps of (iii) dissolving the functionalized organic-inorganic hybrid material in water to form an aqueous solution; (iv) contacting the aqueous solution with a water-soluble polymer, preferably a poly(vinyl alcohol); and (v) forming the functionalized organic-inorganic hybrid material into a film.

Additionally disclosed herein are organic-inorganic hybrid materials produced by the method of synthesizing described herein.

Further disclosed herein are methods of using a functionalized organic-inorganic hybrid material comprising: (i) preparing a functionalized organic-inorganic hybrid material by reacting at least one non-ionic silane with at least one nucleophile to generate at least one ionic organosilane having a plurality of charged organic moieties; wherein the charged organic moieties are covalently bound to the organosilane; and reacting the ionic organosilane with a metal salt to form a functionalized organic-inorganic hybrid material comprising a clay nanosheet having a surface and comprising an inorganic metal and a plurality of silicon atoms; wherein the surface is modified by covalent attachment with a plurality of organic moieties; and wherein the charged organic moieties are covalently bound to the silicon atoms at the surface; and (ii) using the functionalized organic-inorganic hybrid material.

In some embodiments, the method of using further comprises one or more steps of (ia) dissolving the functionalized organic-inorganic hybrid material in water to form an aqueous solution; (ib) contacting the aqueous solution with one or more nanoparticles in the presence of a reducing agent; and (ic) stabilizing the one or more nanoparticles on the surface of the functionalized organic-inorganic hybrid material. In a preferred embodiment, the nanoparticles are gold nanoparticles. In an embodiment, method of using comprises using the functionalized organic-inorganic hybrid material in a catalytic reaction. In a preferred embodiment, the reaction rate of the catalytic reaction is at least ten times faster than the rate of the catalytic reaction conducted without the presence of the functionalized organic-inorganic hybrid material.

In a further embodiment, using comprises a method for purifying a solution that contains one or more contaminants, comprises the steps of (iia) contacting a solution with a surface comprising the functionalized organic-inorganic hybrid material (for example by passing the solution over or through the hybrid material); (iib) reducing the concentration of the one or more contaminants in the solution to form a treated solution; and (iic) optionally, repeating step (iia) or step (iib) one or more times with the treated solution.

In a further embodiment, the application is a fluorescence application, wherein the clay nanosheet comprises one or more fluorophores.

While multiple embodiments are disclosed, still other embodiments of the present disclosure will become apparent based on the detailed description, which shows and describes illustrative embodiments of the disclosure. The forgoing summary is illustrative only and is not intended to be in any way limiting. In addition to the illustrative aspects, embodiments, and features described above, further aspects, embodiments, and features of the present technology are apparent from the following drawings and the detailed description, which shows and describes illustrative embodiments of the present technology. Each feature of the technology described herein may be combined with any one or more other features of the disclosure, e.g., the methods may be used with any hybrid material described herein. Accordingly, the drawings and detailed description are to be regarded as illustrative and not restrictive.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 depicts the characterization of the [mpim]I silane IL and PINC. FIG. 1C depicts the XRPD pattern of [mpim]I PINC, while FIG. 1E shows the TGA thermogram of [mpim]I PINC, while

FIG. 2 shows SEM and TEM images of [mpim]Cl PINC. Specifically.

Figure 13:
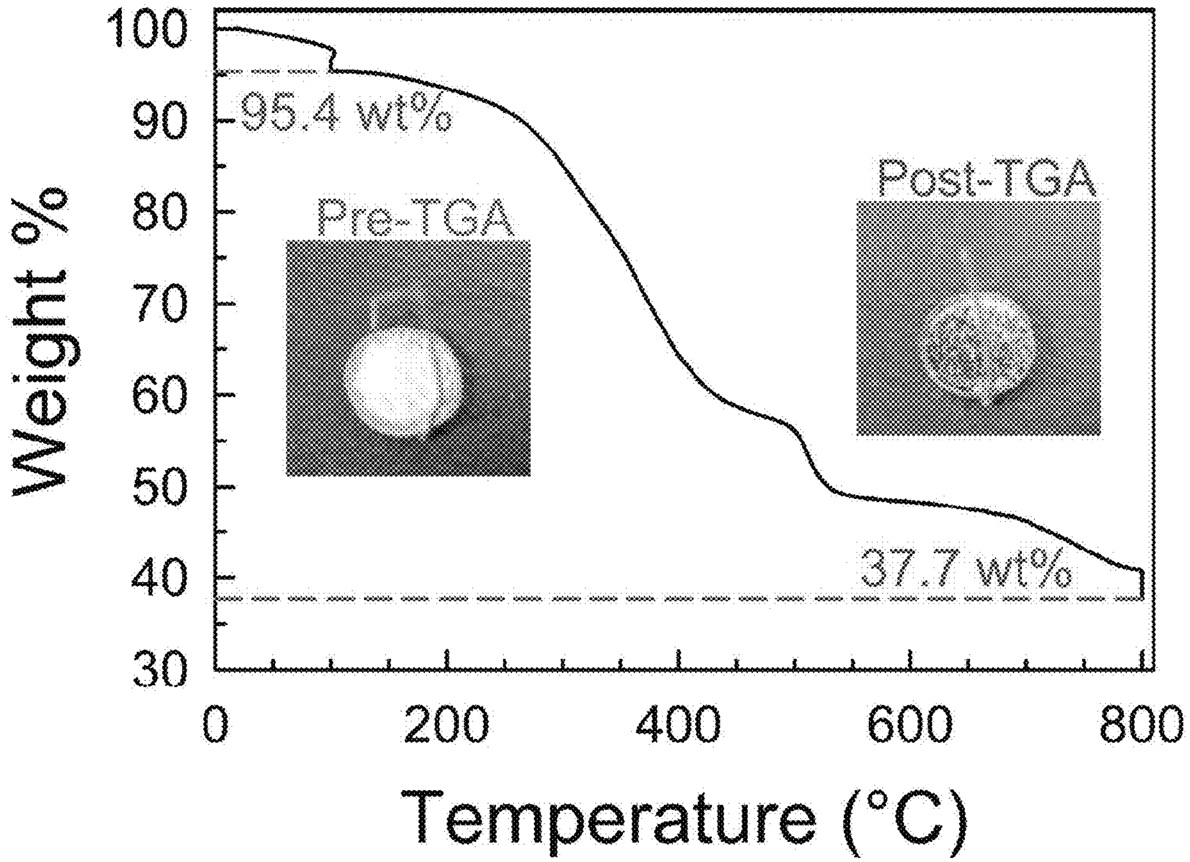
Figure 14A:
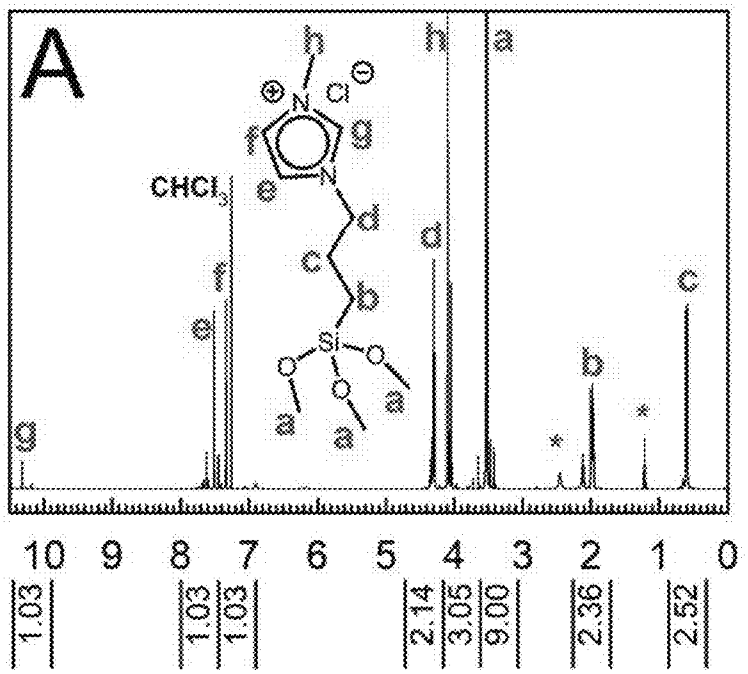
Figure 14B:
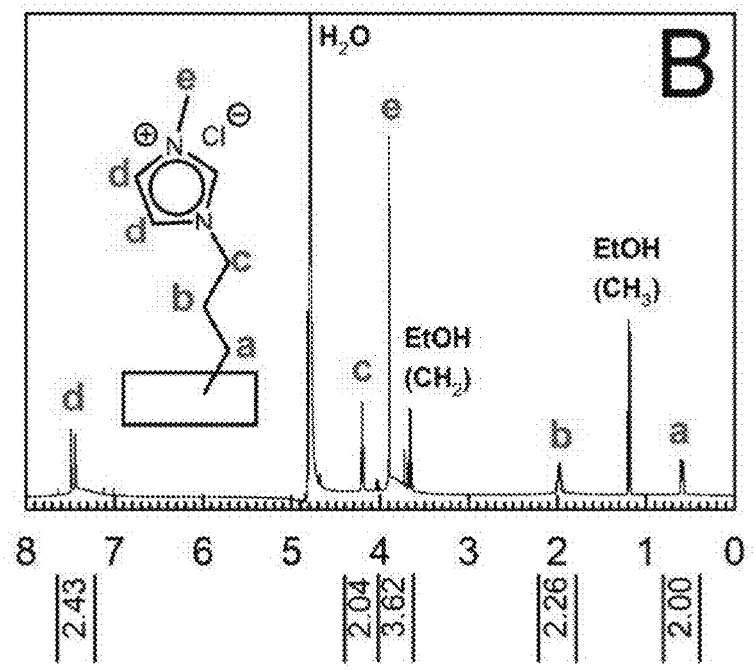
Figure 14C:
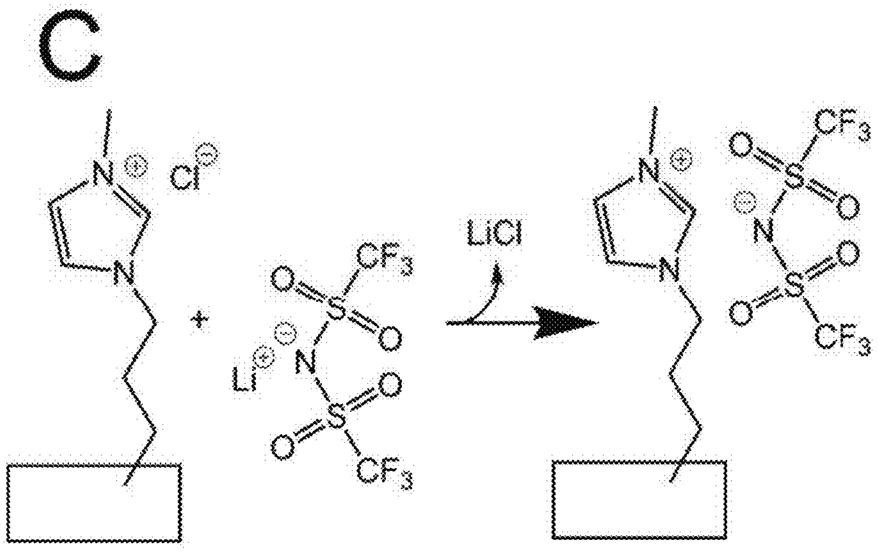
Figure 14D:
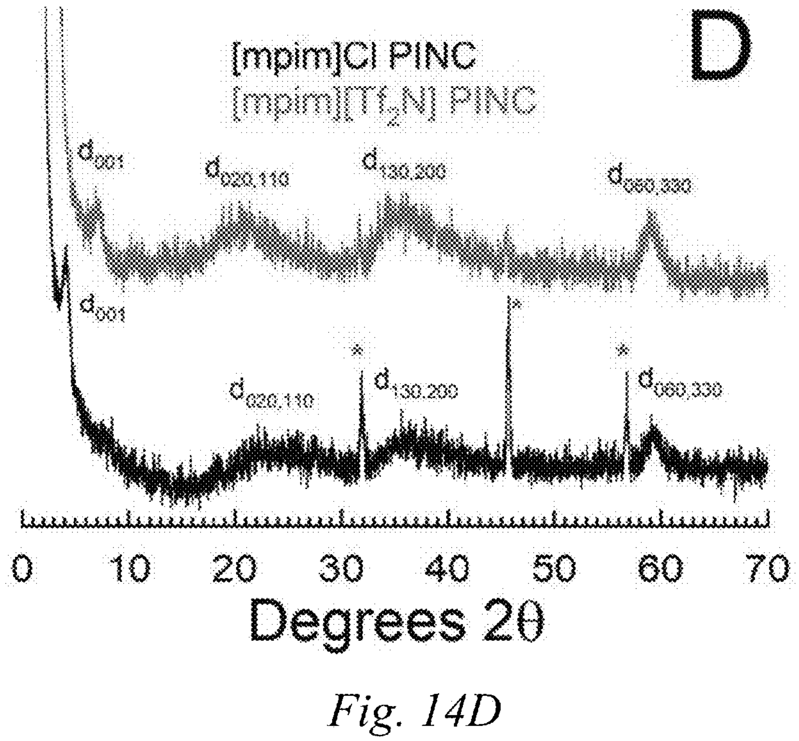
Figure 14E:
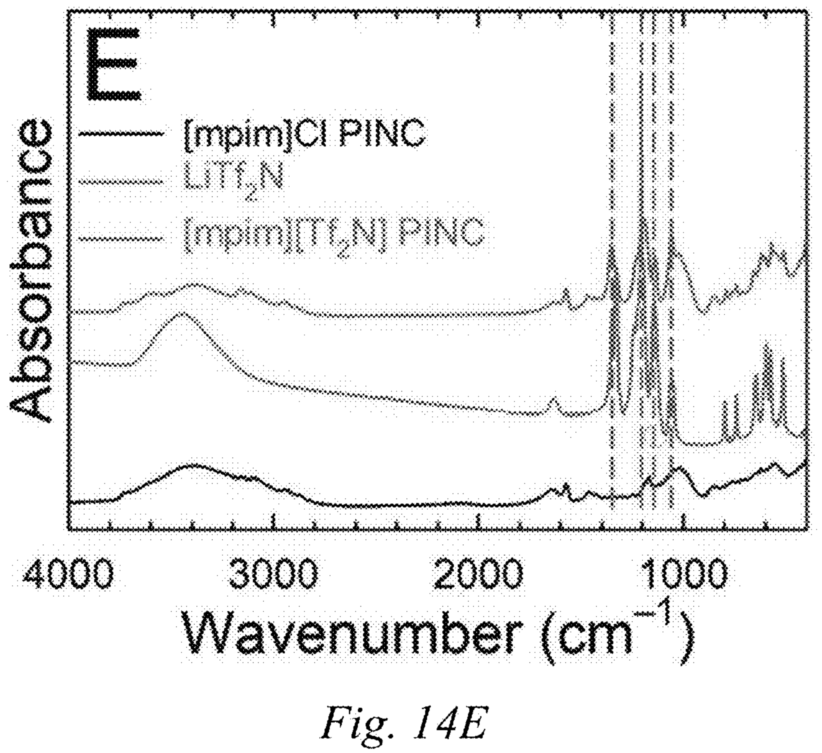
Figure 14F:
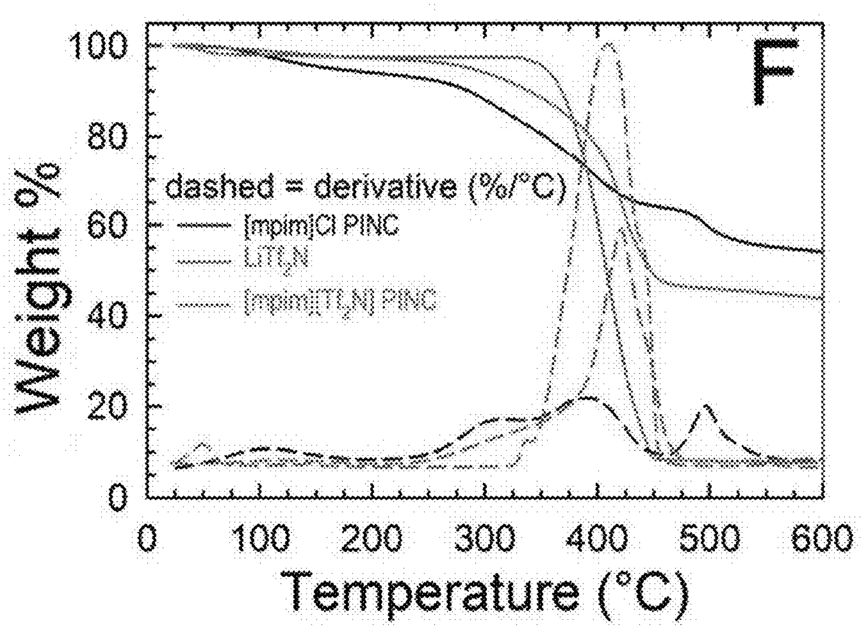

FIG. 13 shows a TGA profile for [mpim]Cl PINC which was, before analysis, cleaned repeatedly with ethanol and thoroughly dried to remove as much solvent and interlamellar salt and reactants as possible. Using a heating rate of 10° C. min-1, the white sample was heated from room temperature to 100° C., where it remained for 1 b, and then continued to 800° C., where it remained for 1 h. Subtracting the wt. % after drying at 100° C. for 1 h (95.4 wt. %) and after run completion (37.7 wt. %) yields a total mass loss due to degradation of organic moieties (i.e., the covalently-bound IL) of 57.7 wt. %. Using the molecular weight of the [mpim]Cl IL moiety (159.64 g $mol^{-1}$), we calculate an IL loading of 3.8 mmol $g^{-1}$. We note that the presence of residual salt and char, the latter of which can be seen in the "post-TGA" picture, can cause error in this estimation.

FIG. 14 shows the characterization of [mpim]Cl silane IL/PINC and [mpim][$Tf_2N$] PINC. Specifically, FIG. 14A and FIG. 14B show [mpim]Cl silane IL and PINC H-NMR spectra, wherein asterisks (*) denote impurities tentatively attributed to degraded methyl imidazole. FIG. 14C depicts a scheme showing the anion exchange between [mpim]Cl PINC and [mpim][$Tf_2N$]. FIG. 14D shows PXRD diffractograms for both [mpim]Cl and [mpim][$Tf_2N$] PINCs, with asterisks (*) in this Figure denoting the NaCl (200), (220), and (222) impurity peaks. The higher diffraction angle for the (001) peak in [mpim][$Tf_2N$] PINC when compared to [mpim]Cl PINC is attributed to the hydration of $Cl^-$, which expands the interlayer region. FIG. 14E shows the FTIR spectra, with the denoted $\nu_a$S—O (1350 $cm^{-1}$), $\nu_a$C—F (peak at 1147 $cm^{-1}$), and shoulder at 1230 $cm^{-1}$), and $\nu_a$S—N—S($10^{60}$ $cm^{-1}$) bands arising from the [$Tf_2N$]$^-$ anion. FIG. 14F shows the TGA thermogram (solid lines) and first derivative plot (dashed lines) for each analyte from panel E, with characteristic mass losses from $Tf_2N$ in the corresponding [mpim][$Tf_2N$] PINC. The legend in panel E also applies to panel F.

Figure 15A:
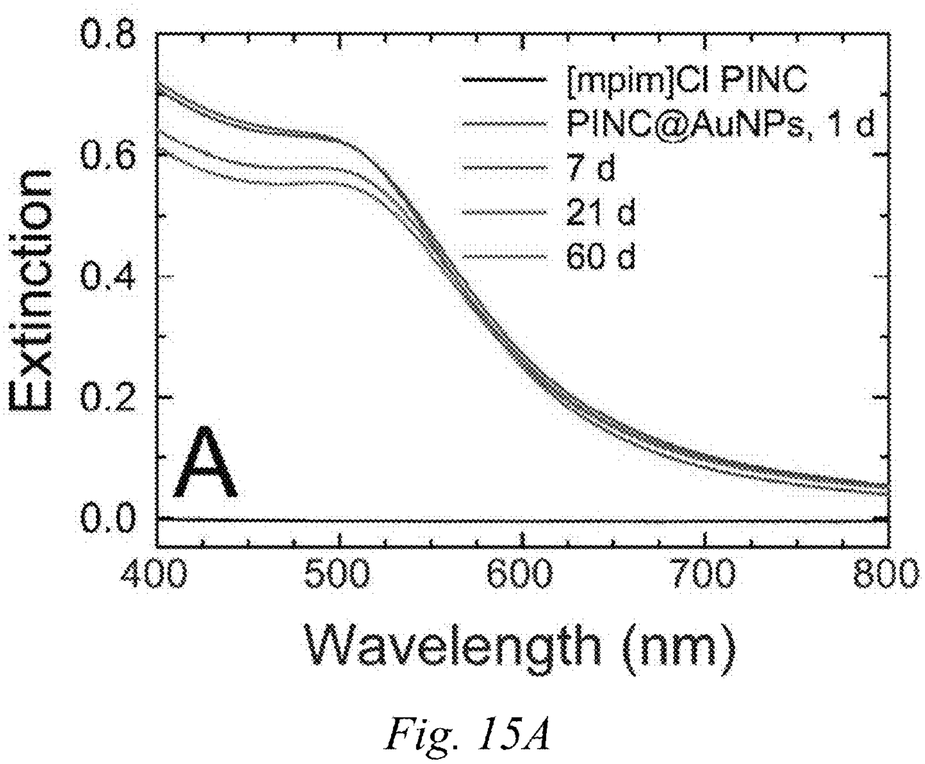
Figure 15B:
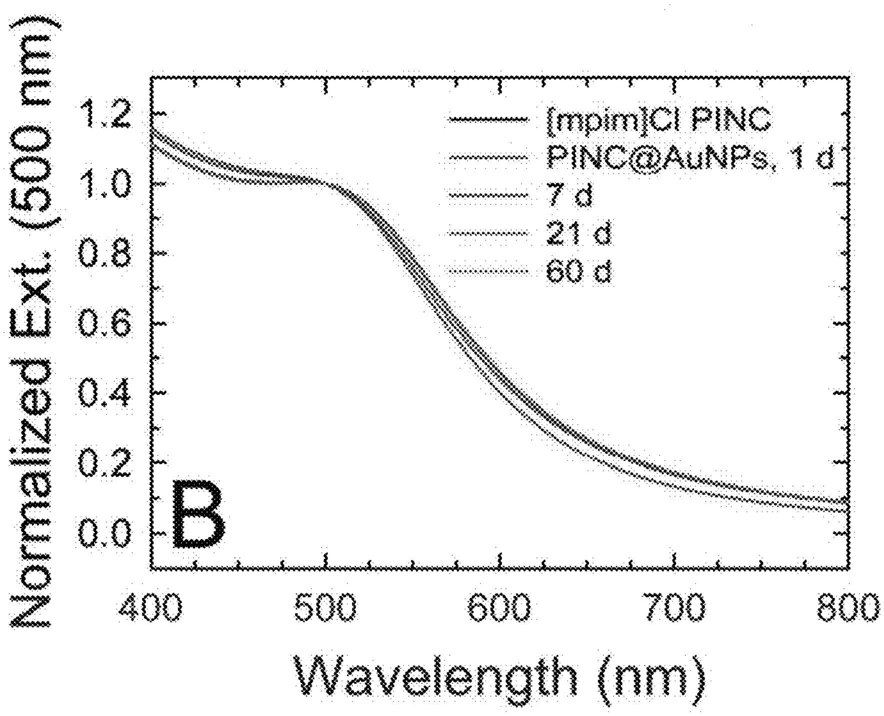

FIG. 15 depicts a stability analysis, wherein FIG. 15A shows the UV-vis spectra showing PINC@AuNP (1.0 mM Au sample, diluted to 0.25 mM for measurement) stability, and FIG. 15B shows the corresponding normalized spectra. A very slight red shift (~2 nm) was observed in the spectra for samples aged for 21 and 60 days, indicating slight growth in the AuNPs over time.

Figure 16A:
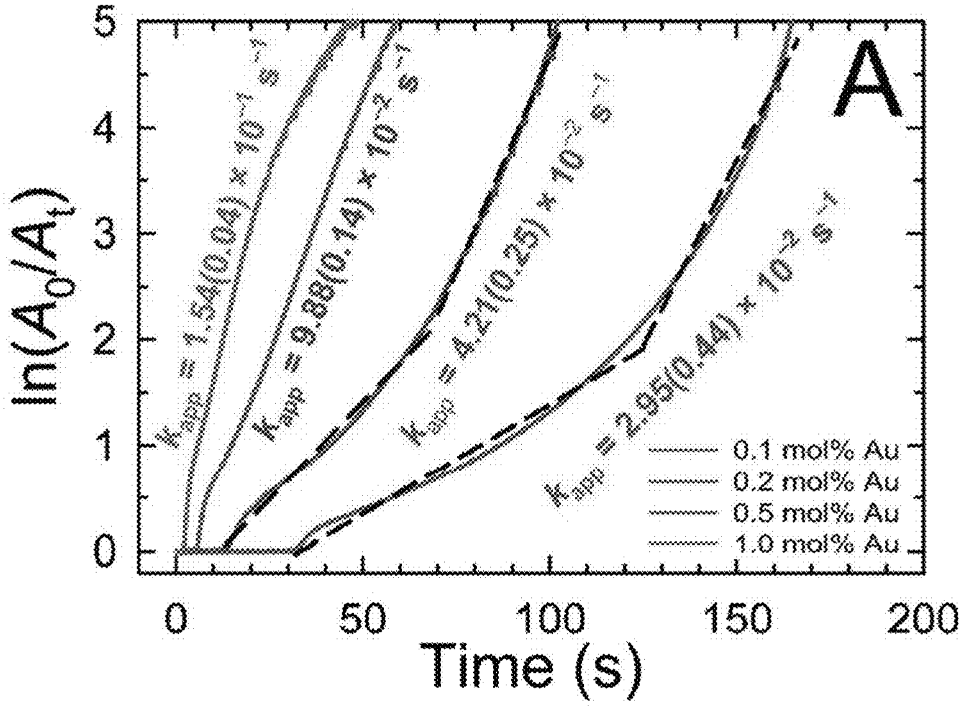
Figure 16B:
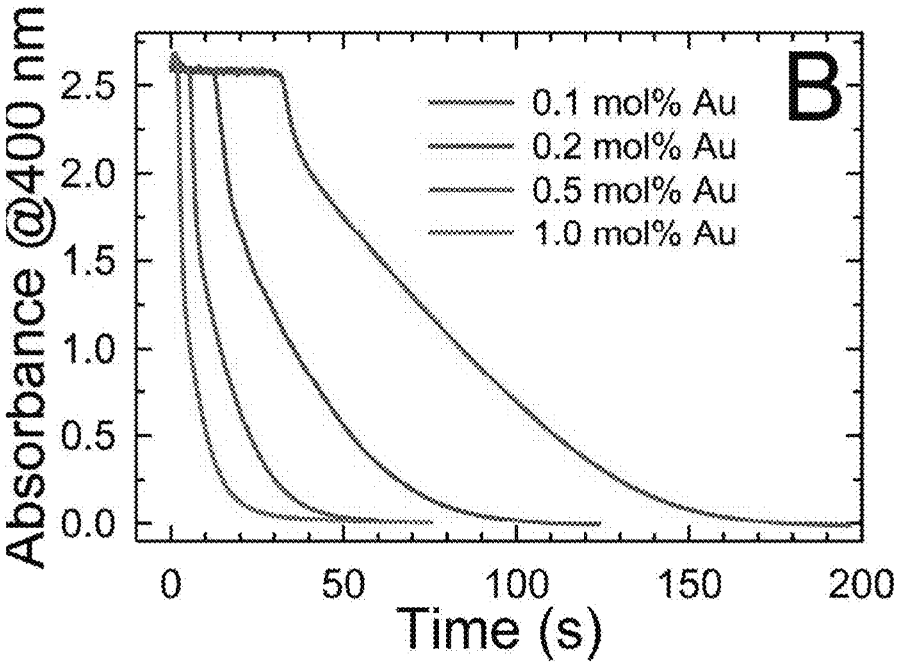

FIG. 16 shows two plots, with FIG. 16A showing the rate plot and FIG. 16B depicting the spectra showing the reduction of 4-NP to 4-AP using $NaBH_4$ and 2-month-old PINC@AuNPs as the catalyst. The apparent rates indicated in FIG. 16A show good agreement with those obtained from 1-day-old PINC@AuNPs, indicating good catalyst stability.

Figure 17A:
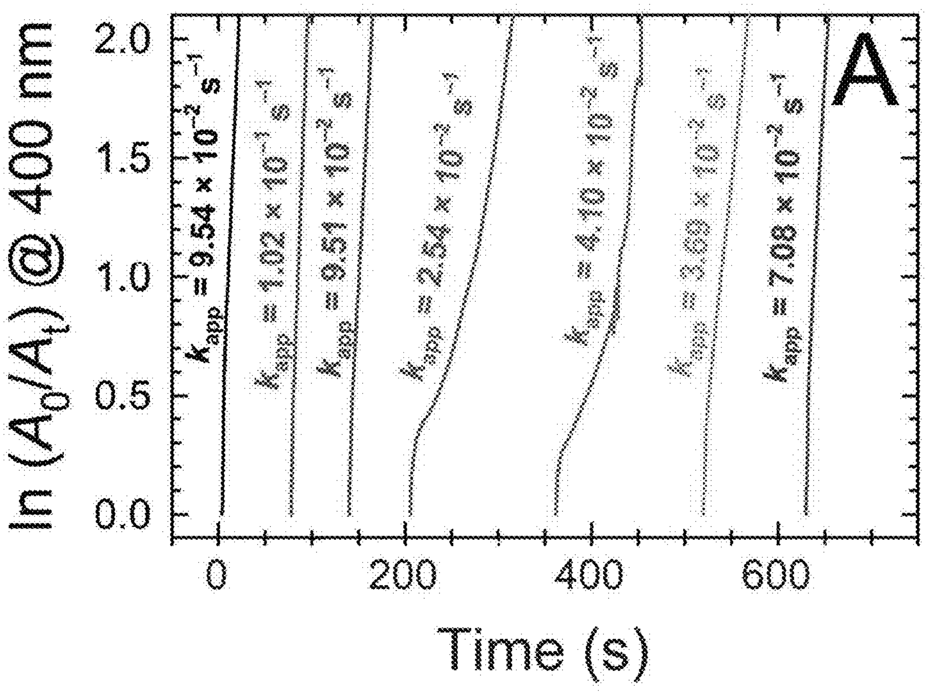
Figure 17B:
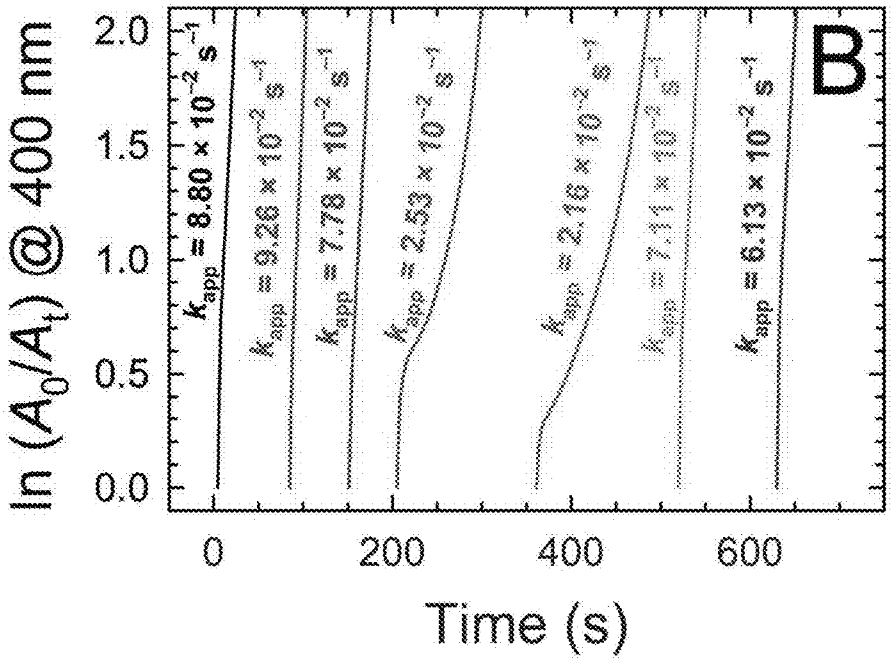

FIG. 17 depicts rate plots showing the change in the apparent rate ($k_{app}$) imposed by recycling 10-day-old PINC@AuNPs (as shown in FIG. 17A) and 2-month-old PINC@AuNPs (as shown in FIG. 17B) for the catalyzed reduction of 4-NP. Both reductions were performed using 0.5 mol % Au to 4-NP. Notably, extra $NaBH_4$ was not added until cycles 6 and 7, resulting in a noticeable increase in the apparent rate. Rate retardations of 26% and 30% were observed for the 10-day-old and 2-month-old PINC@AuNPs after 7 cycles, respectively, attributed in part to the large increases to both ionic character and product concentration in the latter cycles.

Figure 18A:
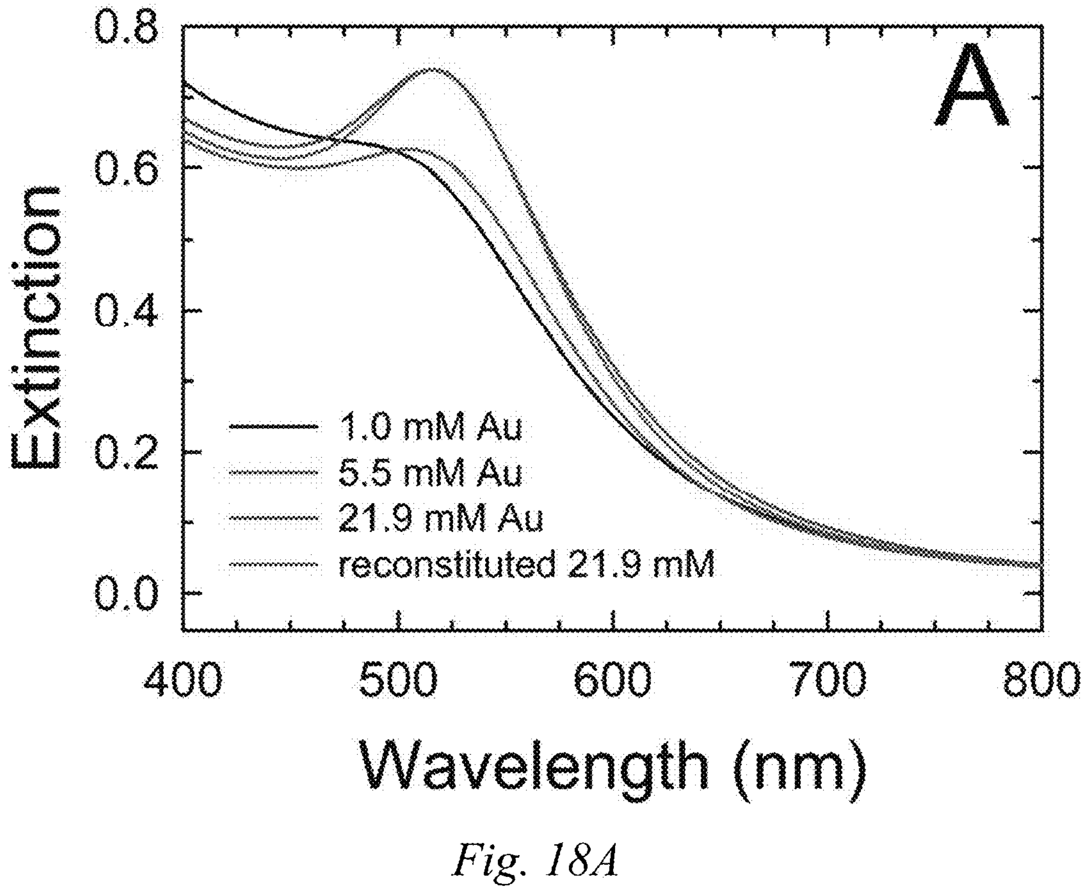
Figure 18B:
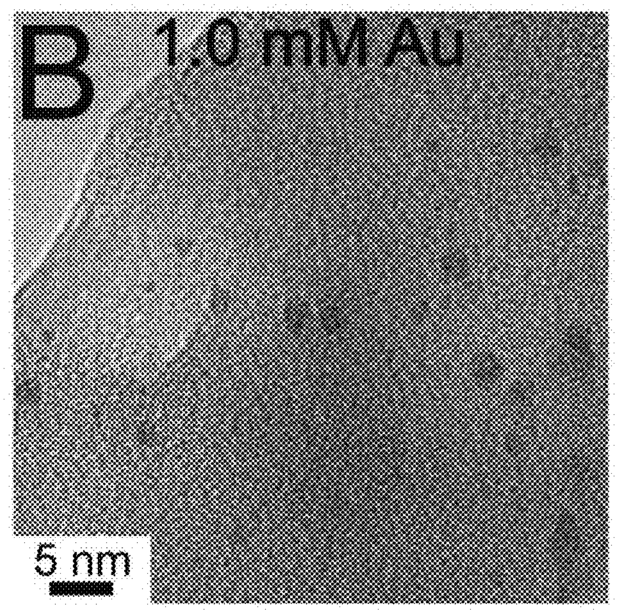
Figure 18C:
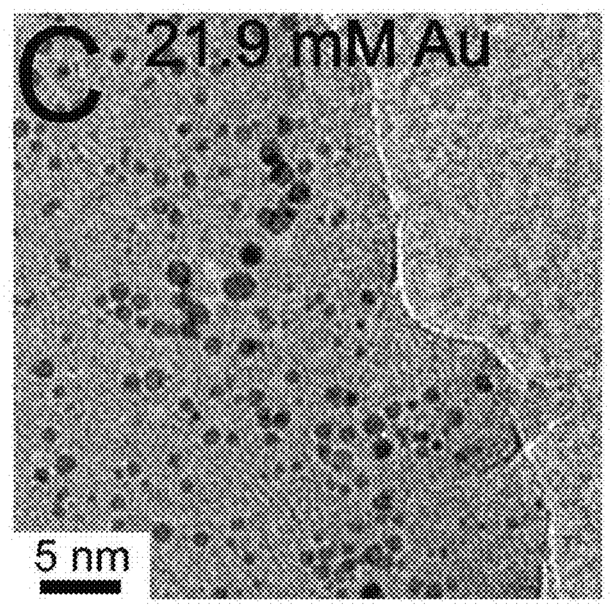

FIG. 18 shows the results of spectroscopic analysis and TEM imaging. Specifically, FIG. 18A shows the UV-vis spectroscopic analysis of PINC@AuNPs synthesized using several Au concentrations (all diluted to 0.25 mM for measurement) as well as the spectrum of a reconstituted aliquot of previously lyophilized 21.9 mM PINC@AuNPs. A red shift in the LSPR is evident as [Au] increases, indicating an increase in particle size. Further, the reconstituted PINC@AuNPs solution is nearly identical to its parent solution, indicating that dry storage followed by aqueous dispersion before use is an attractive feature of these supported AuNPs. FIG. 18B and FIG. 18C show TEM images of 1.0 and 21.9 mM PINC@AuNPs, showing Au-free areas in the former image and possible particle aggregation in the latter. The average particle sizes for each sample are below 5 nm.

Figure 19A:
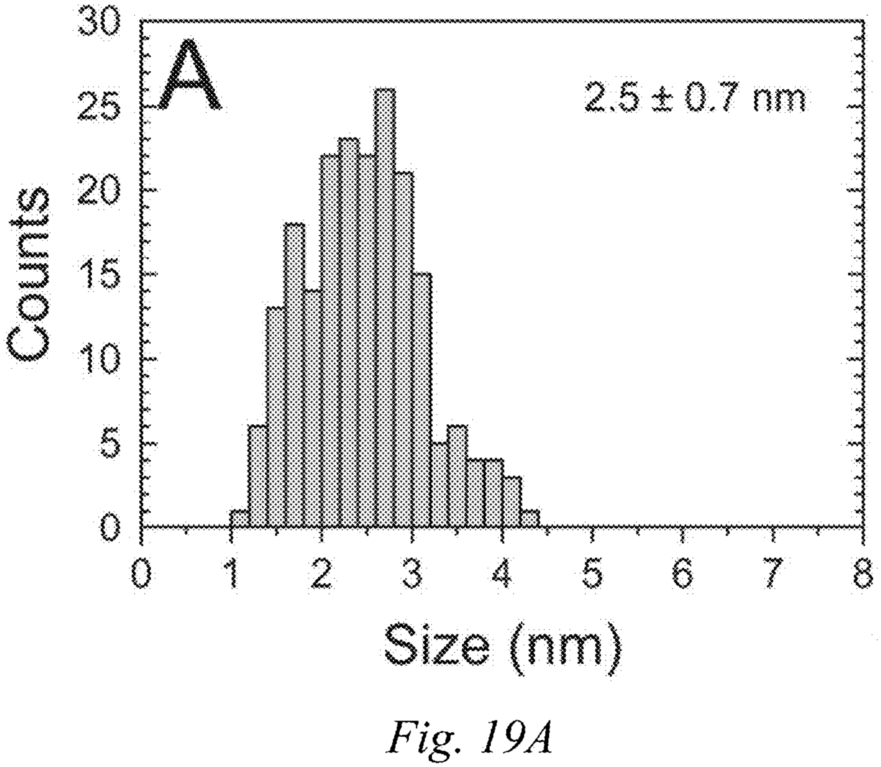
Figure 19B:
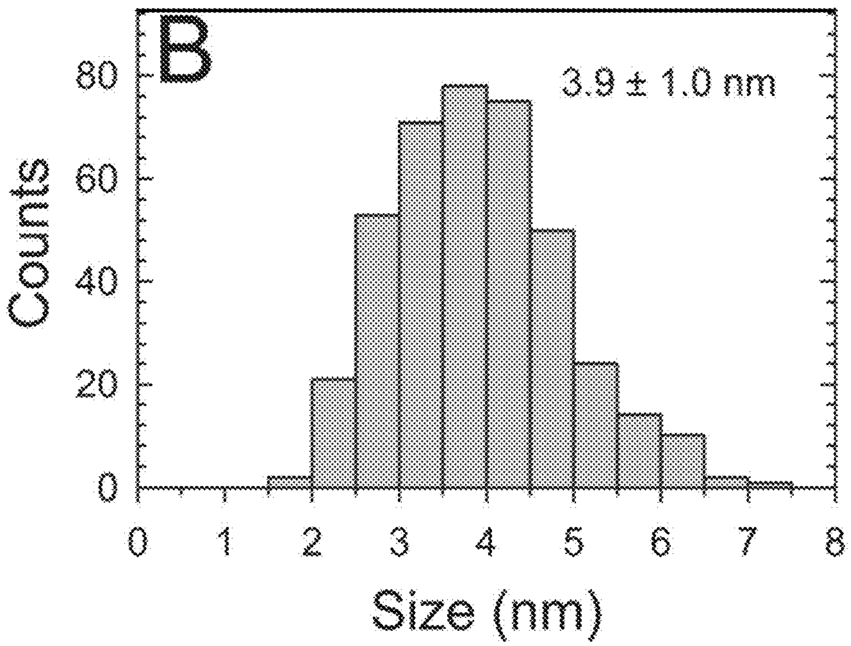

FIG. 19 depicts two histograms representing TEM size analysis. Specifically, FIG. 19A shows a histogram representing the analysis of 1.0 mM PINC@AuNPs, and FIG. 19B shows a histogram representing the analysis of 21.9 mM PINC@AuNPs. As observed in the corresponding UV-vis spectral analysis, particles produced at the lower Au concentration are smaller on average, with no observed particles with diameters larger than 5 nm. Conversely, particles synthesized using an Au concentration of 21.9 mM are about 64% larger, indicating slight aggregation. Both solutions primarily consist of particles smaller than 5 nm in diameter, and no particles with diameters larger than 10 nm were observed.

Figure 20:
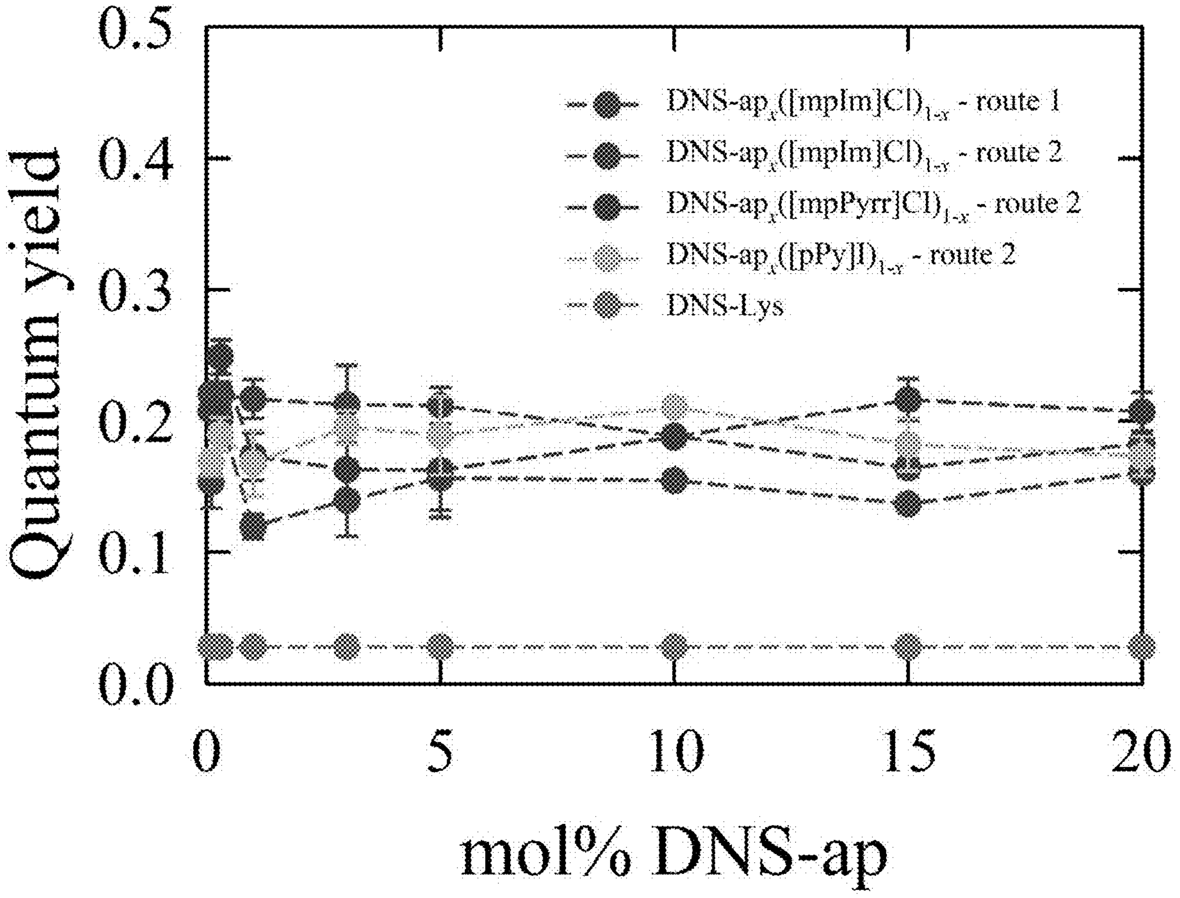

FIG. 20 shows the quantum yield vs. mol % of DNS-ap silane in DNS-$ap_x$([mpIm]Cl)$_{1-x}$ PINC from route #1 where pre synthesized DNS-APTMS silane was used to make a PINC with [mpIm]Cl silane compared to post synthetically modified ap-PINC using different PINCs with DNS-Cl (route #2) namely DNS-$ap_x$([mpIm]Cl)$_{1-x}$ PINC, DNS-$ap_x$ ([mpPyrr]Cl)$_{1-x}$ PINC, and DNS-$ap_x$([pPy]I)$_{1-x}$ PINC.

Figure 21A:
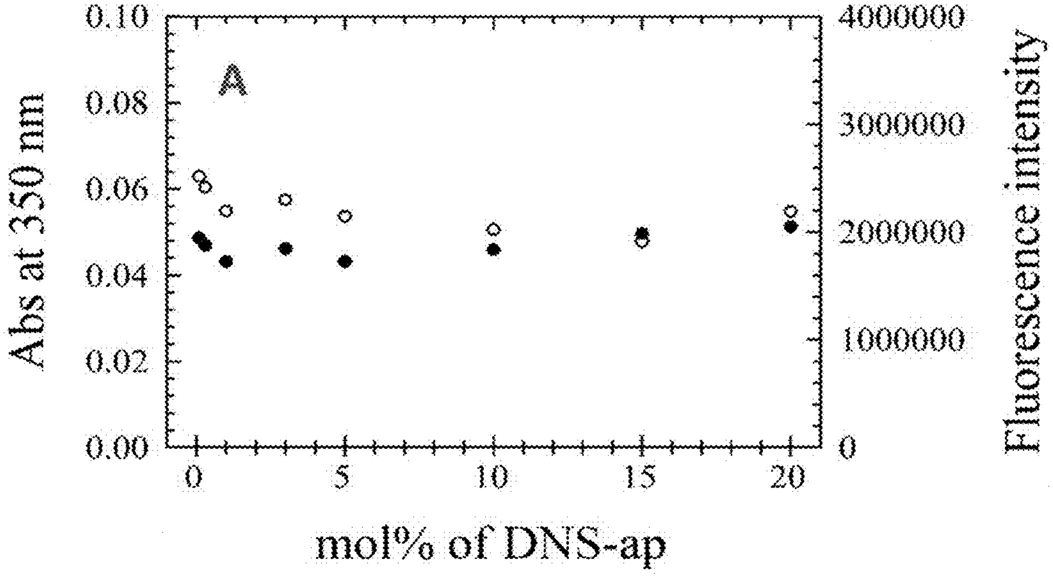
Figure 21B:
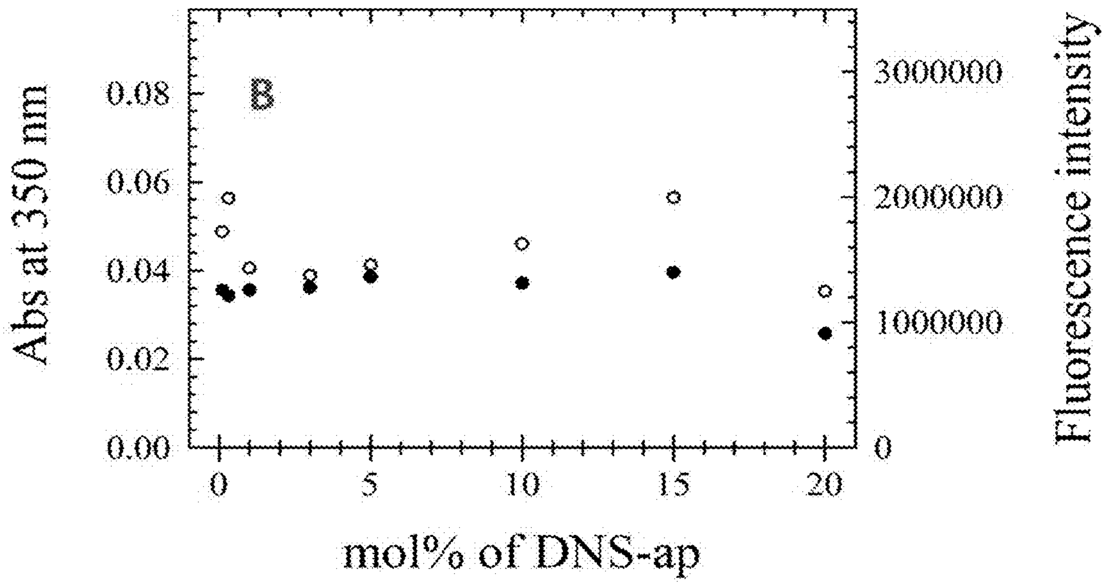
Figure 21C:
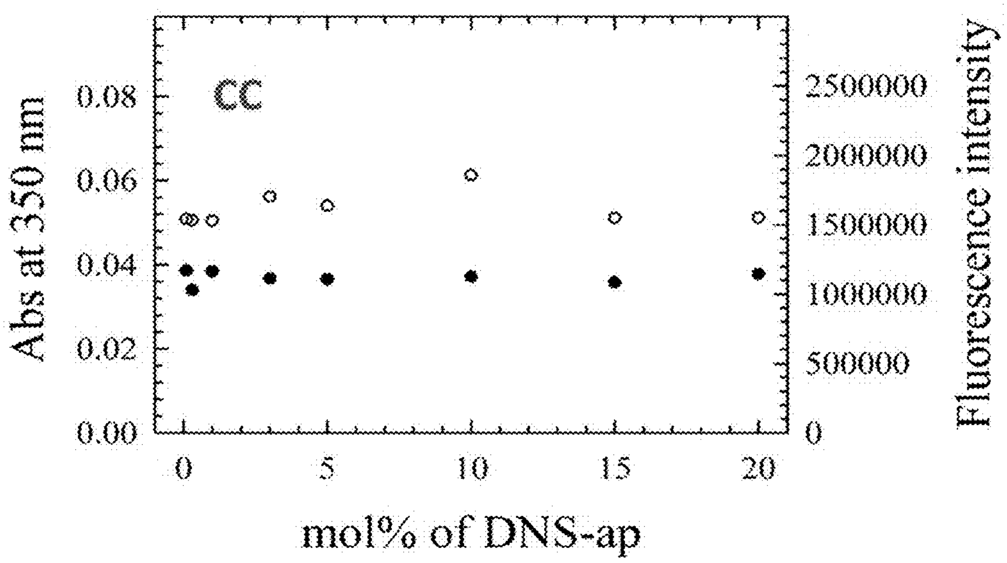

FIG. 21 shows the absorbance measured at 350 nm (filled circles) and area under the curve of the fluorescence spectrum calculated in the wavelength range of 400-679 nm (hollow circles) for different mol % of dansylated PINCs wherein FIG. 21A represents DNS-$ap_x$([mpIm]Cl)$_{1-x}$ PINC, FIG. 21B represents DNS-$ap_x$([mpPyrr]Cl)$_{1-x}$ PINC, and FIG. 21C represents DNS-$ap_x$([pPy]I)$_{1-x}$ PINC.

Figure 22:
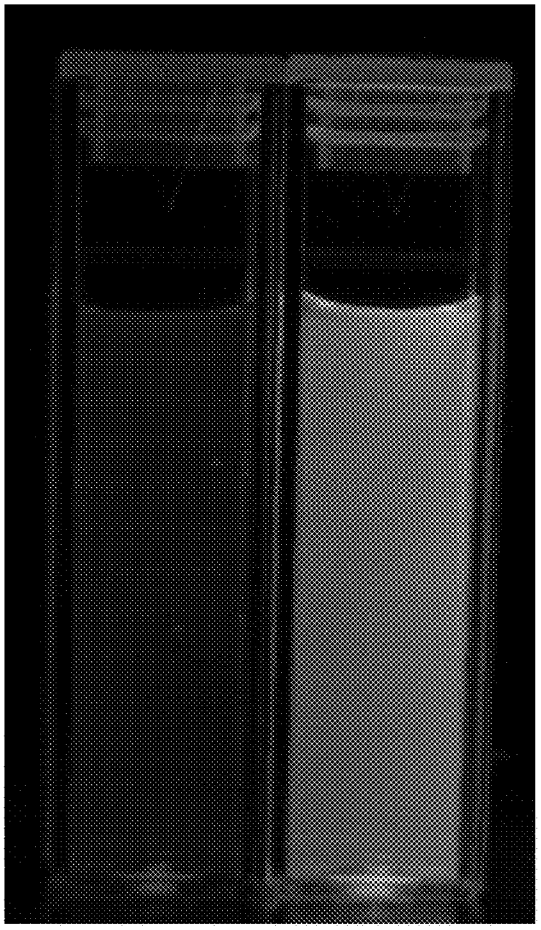

FIG. 22 shows two cuvettes under a UV lamp, the cuvette on the left shows 30 μM DNS-Lys and the cuvette of the right shows 30 μM DNS-$ap_{0.10}$ ([mpIm]Cl)$_{0.90}$ PINC in pH 7.4 buffer (0.02 M) visualized under UV lamp (short wavelength) in dark in a PMMA cuvette (3 mL solution).

Figure 23A:
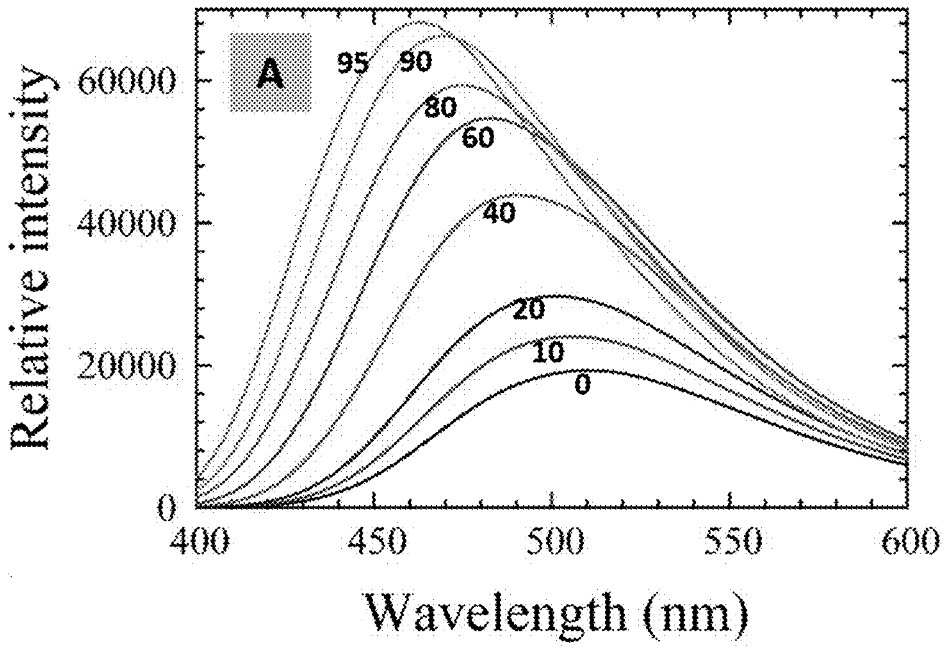
Figure 23B:
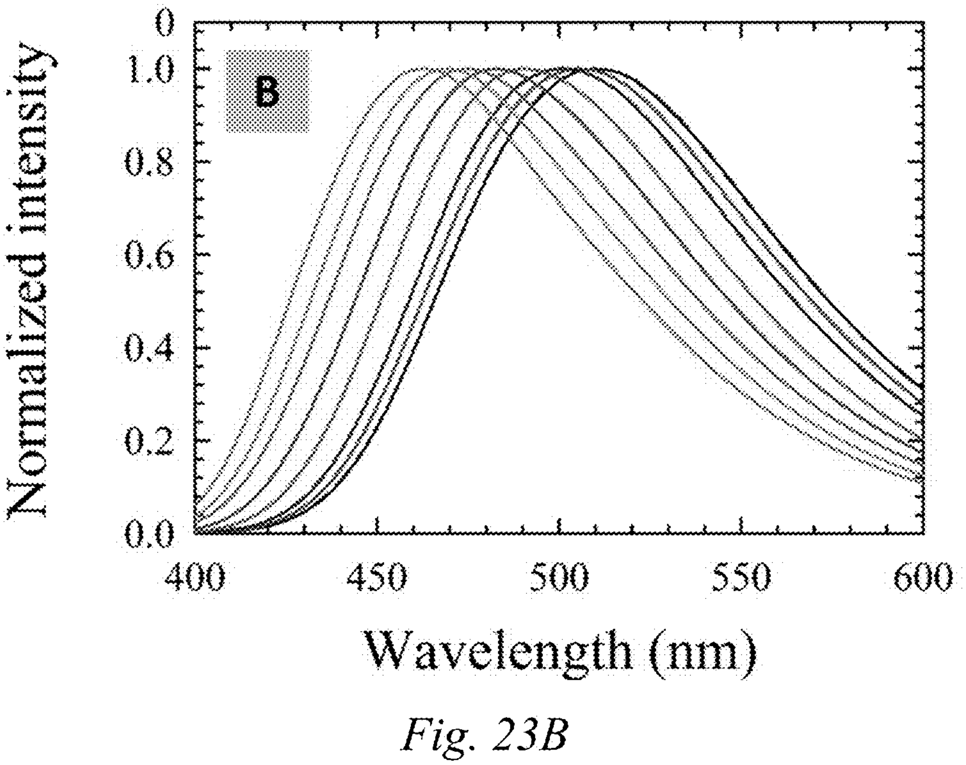

FIG. 23 depicts the fluorescence of DNS-$ap_{0.03}$ ([mpIm] Cl)$_{0.97}$ PINC in dioxane/water mixtures. Values mentioned on each plot represent the wt. % of dioxane in dioxane/water mixtures. FIG. 23A shows the emission spectra of relative intensity vs wavelength obtained in various mixtures showing hypochromic shift (blue shift) of wavelength and hyperchromic shift of intensity as the solvent polarity decreases (increasing wt. % of dioxane). FIG. 23 B shows a normalized emission spectra (normalized emission intensity vs wavelength) to emphasize the wavelength shift.

Figure 24:
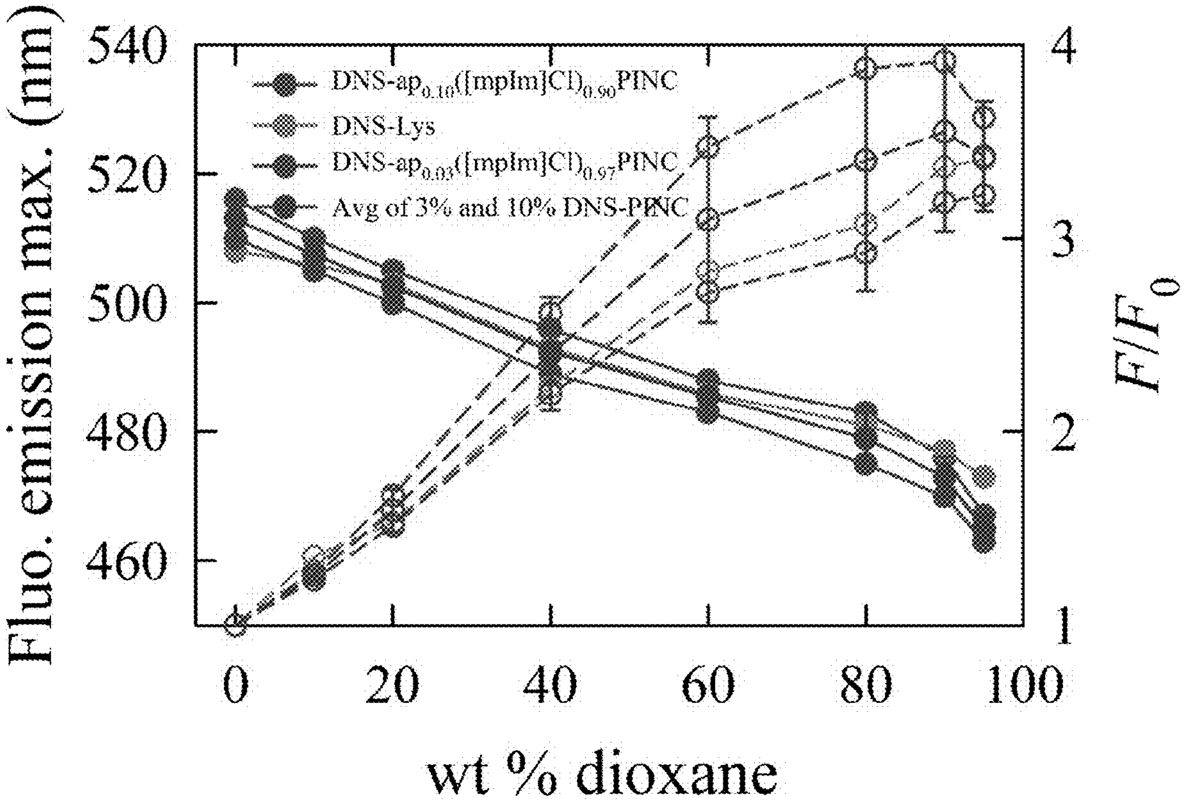

FIG. 24 shows the fluorescence emission maximum wavelength variation (left Y-axis; solid lines) and Integrated fluorescence calculated in the wavelength range of 400-679 nm where F and $F_0$ is integrated fluorescence in the presence and absence of dioxane (right Y-axis; dashed lines) variation with the wt. % of dioxane in dioxane/water mixture for DNS-$ap_{0.10}$([mpIm]Cl)$_{0.90}$ PINC, DNS-$ap_{0.03}$([mpIm]Cl)$_{0.97}$PINC, DNS-1-Lysine, and the average of two DNS-PINCs with error bars. The average fluorescence maximum (nm) shift of two dansylated PINCs overlaps with DNS-Lys results.

Figure 25:

FIG. 25 depicts photographs of DNS-$ap_{0.10}$([mpIm]Cl)$_{0.90}$ PINC in buffers having different pH values visualized with UV lamp (366 nm).

Figure 26:
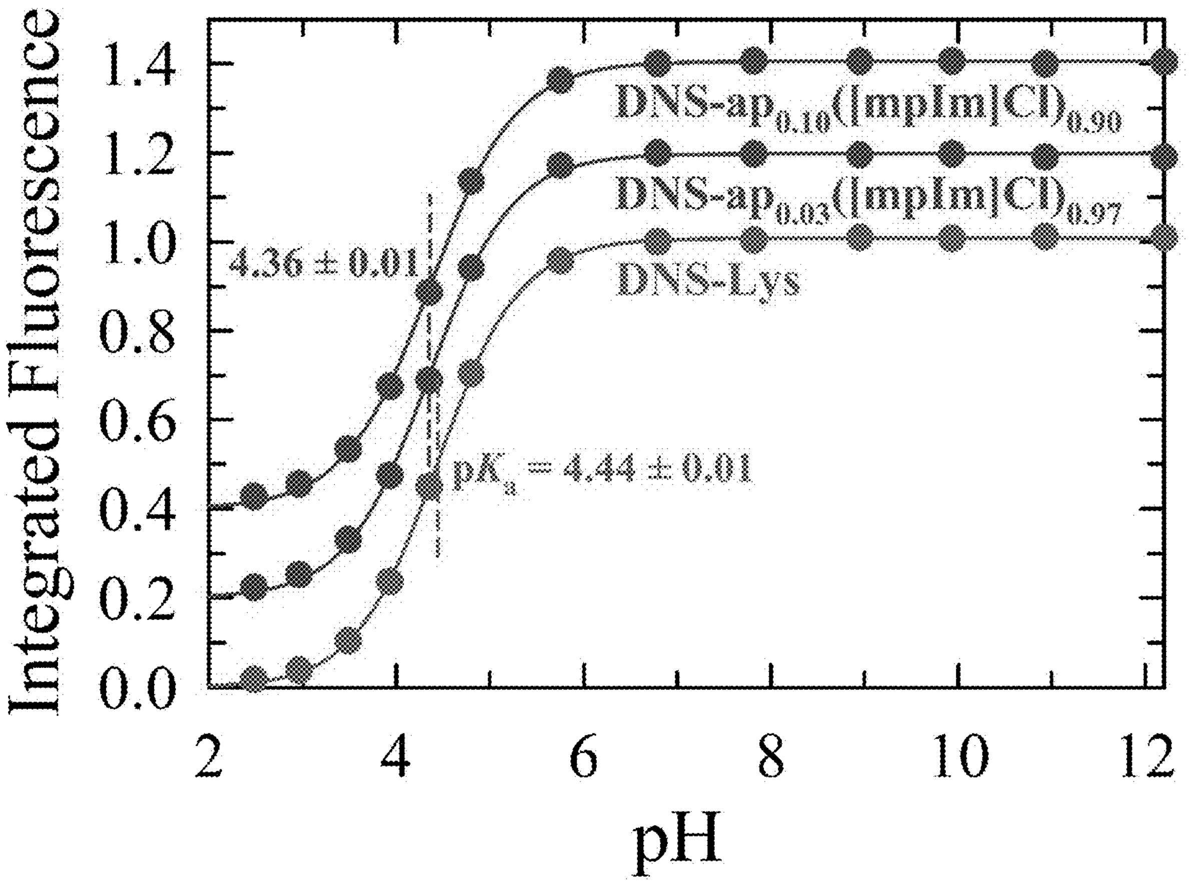

FIG. 26 shows the variation of integrated intensity (425-625 nm) (normalized to pH 6.79 buffer to avoid the plots being in different scales for free probe and PINC probe since they have different QY values for equimolar solutions) with the pH of the buffer. All plots almost overlap with each other (i.e., have a similar response to pH). pKa was determined using a regression curve obtained from a sigmoidal fit to be around the same value for the free probe and the dansylated PINC.

Figure 27A:
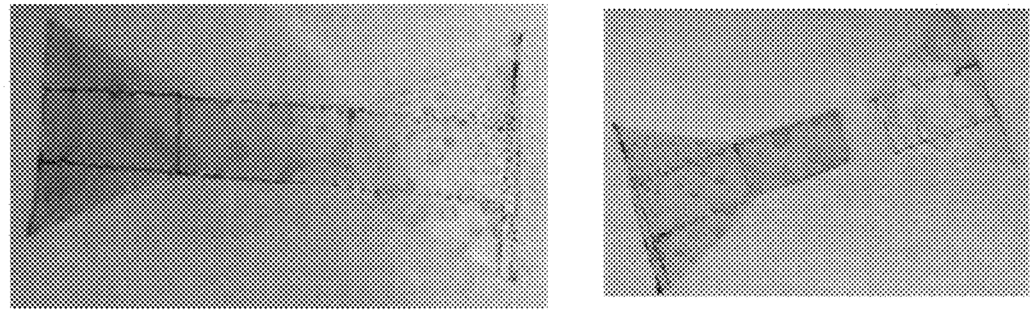
Figure 27B:
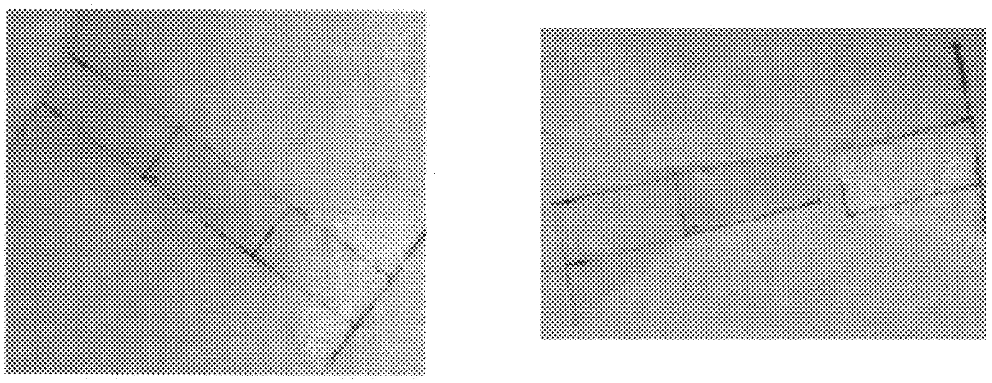
Figure 27C:
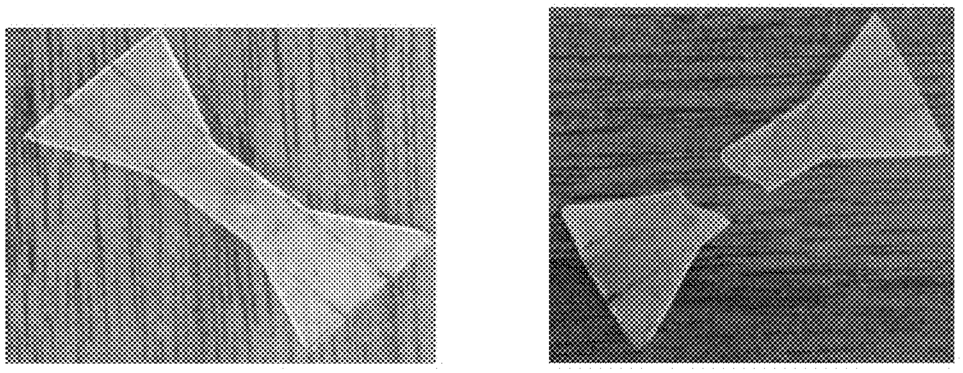

FIG. 27 shows the results of a mechanical stress test on various types of PINC/PVA film.

Figure 28:
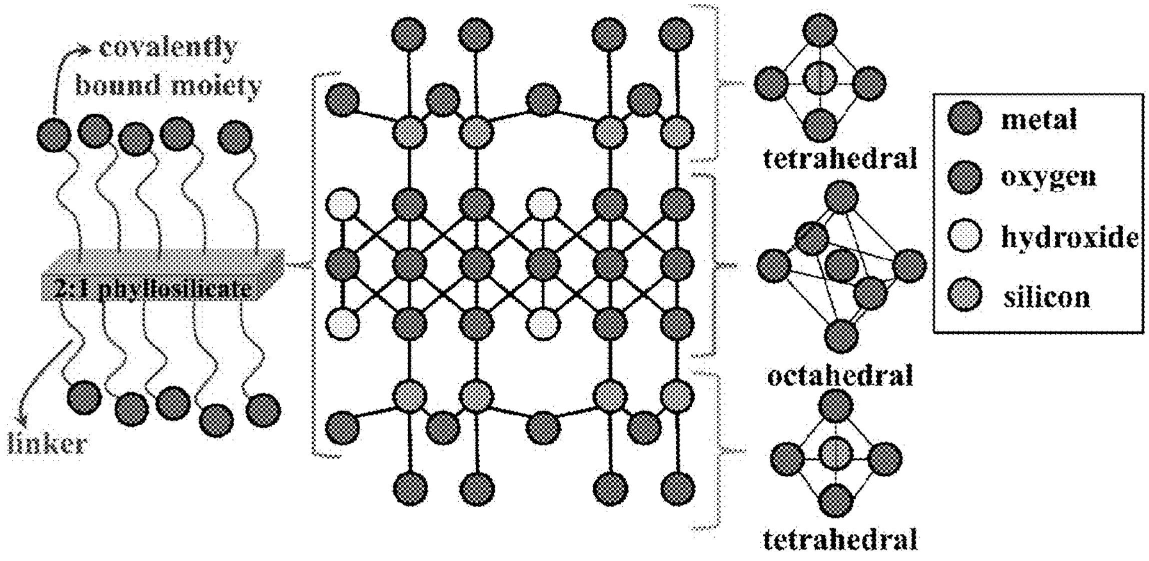

FIG. 28 depicts an example of the functionalized organic-inorganic hybrid clay nanosheets disclosed herein, wherein the nanosheet is provided as a 2:1 phyllosilicate clay with covalently bound charged organic moieties. As described herein, the clay nanosheets may be provided in other forms, such as a 1:1 clay.

Figure 29:
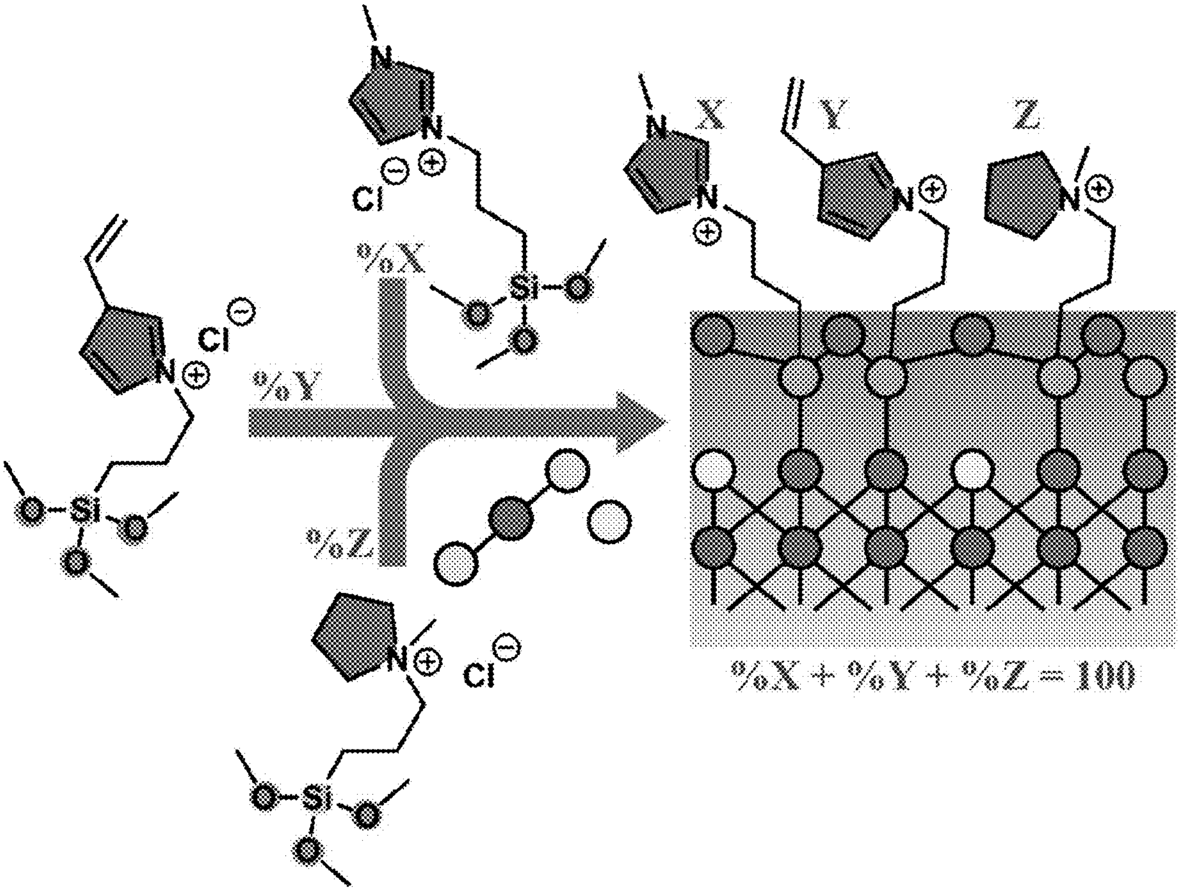

FIG. 29 is an example illustrating the chemical tailorability of the polyionic nanoclays that can be achieved by using multiple ionic silanes during the synthesis of the clay nanosheets. As shown in FIG. 29, the ionic silane "Y" contains a pendant reactive group, specifically a vinyl group, for further modification or conjugation, for example via alkene-thiol coupling. This tailorability can occur on or with any suitable structure/form of the nanoclays, for example, a 2:1 lamellar sheet, a 1:1 clay, or the like.

Figure 30A:
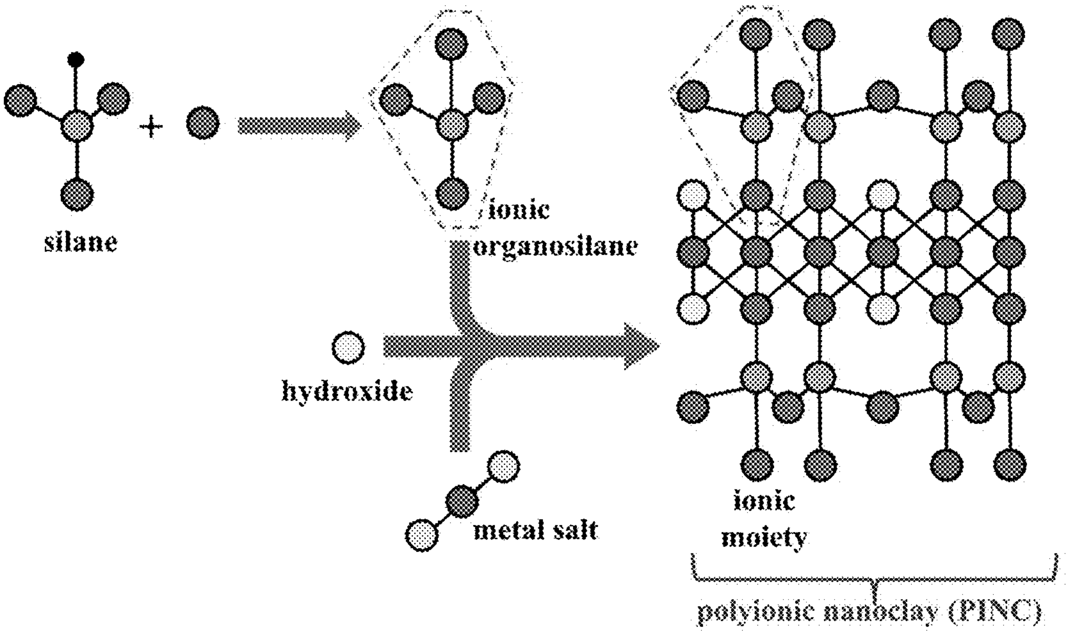

FIG. 30 provides examples of the synthesis of an ionic organosilane containing a covalently bound charged organic moiety by reaction between a non-ionic silane ((3-chloropropyl)trimethoxysilane) and a nucleophile (N-methylimidazole) and subsequent reaction under base (hydroxide)-catalyzed conditions with a metal salt to form covalently functionalized organic-inorganic hybrid clay nanosheets. The anionic counterions are not shown explicitly. FIG. 30A shows a general example of ionic organosilane synthesis.

Figure 30B:
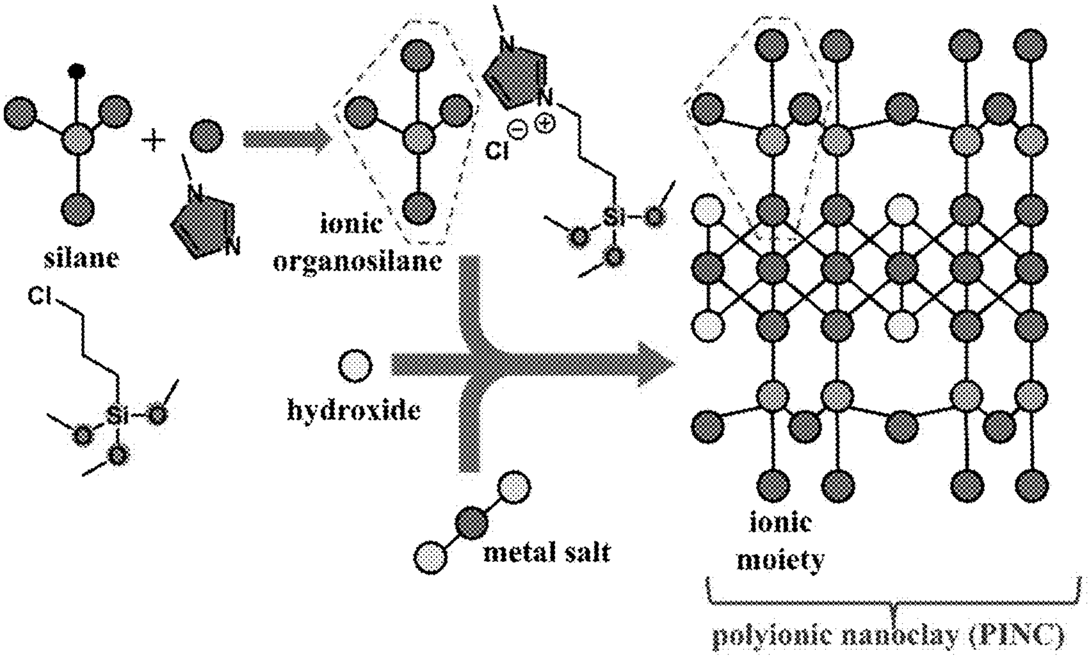

FIG. 30B shows a more particular example of ionic organosilane synthesis, with particular silanes and nucleophiles illustrated.

Various embodiments of the present disclosure will be described in detail regarding the drawings. Reference to various embodiments does not limit the scope of the disclosure. Figures represented herein are not limitations to the various embodiments according to the disclosure and are presented for exemplary illustration of the disclosure.

DETAILED DESCRIPTION OF THE PREFERRED EMBODIMENTS

The present disclosure relates to organic-inorganic hybrid materials made by linking molecules to inorganic supports are known to create enhanced functionality. We disclose a new class of organic-inorganic hybrid material which consists of atomically thin inorganic nanosheet supports with a dense population of ion chemistries periodically installed at the surface. These organic-inorganic materials—specifically polyionic nanoclays (PINCs)—are inspired supports for catalysis, separations, device applications, chemical analysis, and (bio)sensors. Moreover, the approach is flexible and allows for the controlled installation of different functionalities at the surface, including the generation of polyfunctional nanoclay hybrids bearing multiple types of chemistry in a single discrete hybrid.

Ionic liquids (ILs) have amassed a great deal of commercial interest (see Proionic as a retail example) as industries switch from traditional solvents to less volatile and more easily recyclable alternatives, utilizing the unique salvation, catalytic, and electrolytic properties of ILs to increase profit and decrease waste. Unfortunately, the catalytic and separations applications of ILs have traditionally been hindered by the high viscosity and low diffusivity of bulk IL. Recently, this problem has been circumvented through the use of supported ILs (SILs), composite materials which are typically prepared by depositing IL on a substrate, creating a thin film of IL wherein diffusion and reaction occur unimpeded by the viscosity of the surrounding medium.

A primary shortcoming of SILs is their low dispersibility in solvents, a consequence of the substrate's size and likelihood to form laminated sheets or closely packed aggregates. This limitation can greatly decrease or eliminate the accessibility of the IL film. Additionally, the primary method of making SILs is through deposition, resulting in incomplete and sporadic surface modification and, ultimately, irreproducible and poorly performing films It is an advantage that the polyionic nanoclays (PINCs) disclosed herein demonstrate excellent catalysis-enhancing supports for nanoparticles, such as gold nanoparticles (AuNPs). Beneficially, their unique electronic properties increase the catalytic efficiency of AuNPs by almost an order of magnitude, resulting in the most rapid turnover frequencies ever reported for AuNP-based nitroarene reduction, an important reaction in the preparation of pharmaceuticals and fine chemicals. Additionally, while most nanocatalysts display either high activity or good stability (corresponding to how highly active the nanoparticle surface is), the PINC-supported AuNPs disclosed herein beneficially provide both properties and are highly recyclable. Without being bound by theory, it is thought these benefits can be attributed to the stabilizing effects of the PINC platform.

To increase the industrial attraction of these heterogeneous catalysts, they are incorporated into composite films to produce recyclable, highly active catalytic materials which can be used in other catalytic reactions where ILs and metal nanoparticles excel (e.g., alcohol oxidation, formic acid synthesis). Finally, these PINCs are ideal platforms for separations, making them attractive to the petroleum, environmental cleanup, and nuclear industries.

The embodiments of this disclosure are not limited to particular types of materials or methods, which can vary. It is further to be understood that all terminology used herein is to describe particular embodiments only and is not intended to be limiting in any manner or scope. For example, as used in this specification and the appended claims, the singular forms "a," "an" and "the" can include plural referents unless the content indicates otherwise.

Unless indicated otherwise, "or" can mean any one alone or any combination thereof, e.g., "A, B, or C" means the same as any of A alone, B alone, C alone, "A and B," "A and C," "B and C" or "A, B, and C."

Further, all units, prefixes, and symbols may be denoted in their SI accepted form.

Numeric ranges recited within the specification are inclusive of the numbers defining the range and include each integer within the defined range. Throughout this disclosure, various aspects of this disclosure are presented in a range format. It should be understood that the description in range format is merely for convenience and brevity and should not be construed as an inflexible limitation on the scope of the disclosure. Accordingly, the description of a range should be considered to have specifically disclosed all the possible sub-ranges, fractions, and individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6, etc., as well as individual numbers within that range, for example, 1, 2, 3, 4, 5, and 6, and decimals and fractions, for example, 1.2, 3.8, ½, and 4% This applies regardless of the breadth of the range.

So that the present disclosure may be more readily understood, certain terms are first defined. Unless defined otherwise, all technical and scientific terms used herein have the same meaning as commonly understood by one of ordinary skill in the art to which embodiments of the disclosure pertain. Many methods and materials similar, modified, or equivalent to those described herein can be used in the practice of the embodiments of the present disclosure without undue experimentation, the preferred materials and methods are described herein. In describing and claiming the embodiments of the present disclosure, the following terminology will be used in accordance with the definitions set out below.

The term "about," as used herein, refers to variation in the numerical quantity that can occur, for example, through typical measuring techniques and equipment, with respect to any quantifiable variable, including, but not limited to, mass, volume, time, temperature, pH, reflectance, whiteness, etc. Further, given solid and liquid handling procedures used in the real world, there is certain inadvertent error and variation that is likely through differences in the manufacture, source, or purity of the ingredients used to make the hybrid materials or carry out the methods and the like. The term "about" also encompasses amounts that differ due to different equilibrium conditions for a hybrid material resulting from a particular initial mixture. The term "about" also encompasses these variations. Whether or not modified by the term "about," the claims include equivalents to the quantities.

The term "actives" or "percent actives" or "percent by weight actives" or "actives concentration" are used interchangeably herein and refer to the concentration of those ingredients involved in cleaning expressed as a percentage minus inert ingredients such as water or salts.

As used herein, the term "alkyl" or "alkyl groups" refers to saturated hydrocarbons having one or more carbon atoms, including straight-chain alkyl groups (e.g., methyl, ethyl, propyl, butyl, pentyl, hexyl, heptyl, octyl, nonyl, decyl, etc.), cyclic alkyl groups (or "cycloalkyl" or "alicyclic" or "carbocyclic" groups) (e.g., cyclopropyl, cyclopentyl, cyclohexyl, cycloheptyl, cyclooctyl, etc.), branched-chain alkyl groups (e.g., isopropyl, tert-butyl, sec-butyl, isobutyl, etc.), and alkyl-substituted alkyl groups (e.g., alkyl-substituted cycloalkyl groups and cycloalkyl-substituted alkyl groups).

Unless otherwise specified, the term "alkyl" includes both "unsubstituted alkyls" and "substituted alkyls." As used herein, the term "substituted alkyls" refers to alkyl groups having substituents replacing one or more hydrogens on one or more carbons of the hydrocarbon backbone. Such substituents may include, for example, alkenyl, alkynyl, halogeno, hydroxyl, alkylcarbonyloxy, arylcarbonyloxy, alkoxycarbonyloxy, aryloxy, aryloxycarbonyloxy, carboxylate, alkylcarbonyl, arylcarbonyl, alkoxycarbonyl, aminocarbonyl, alkylaminocarbonyl, dialkylaminocarbonyl, alkylthiocarbonyl, alkoxyl, phosphate, phosphonato, phosphinato, cyano, amino (including alkyl amino, dialkylamino, arylamino, diarylamino, and alkylarylamino), acylamino (including alkylcarbonylamino, arylcarbonylamino, carbamoyl and ureido), imino, sulfhydryl, alkylthio, arylthio, thiocarboxylate, sulfates, alkylsulfinyl, sulfonates, sulfamoyl, sulfonamido, nitro, trifluoromethyl, cyano, azido, heterocyclic, alkylaryl, or aromatic (including heteroaromatic) groups.

In some embodiments, substituted alkyls can include a heterocyclic group. As used herein, the term "heterocyclic group" includes closed ring structures analogous to carbocyclic groups in which one or more of the carbon atoms in the ring is an element other than carbon, for example, nitrogen, sulfur or oxygen. Heterocyclic groups may be saturated or unsaturated.

As used herein, "substituted" refers to an organic group as defined below (e.g., an alkyl group) in which one or more bonds to a hydrogen atom contained therein are replaced by a bond to non-hydrogen or non-carbon atoms. Substituted groups also include groups in which one or more bonds to carbon(s) or hydrogen(s) atoms replaced by one or more bonds, including double or triple bonds, to a heteroatom. Thus, a substituted group is substituted with one or more substituents, unless otherwise specified. A substituted group can be substituted with 1, 2, 3, 4, 5, or 6 substituents.

Substituted ring groups include rings and ring systems in which a bond to a hydrogen atom is replaced with a bond to a carbon atom. Therefore, substituted cycloalkyl, aryl, heterocyclic, and heteroaryl groups may also be substituted with substituted or unsubstituted alkyl, alkenyl, and alkynyl groups are defined herein.

The term "amine" (or "amino") as used herein refers to $—R^1NR^2R^3$ groups. $R^1$ is absent, a substituted or unsubstituted alkylene, cycloalkylene, alkenylene, alkynylene, arylene, aralkylene, heterocyclylalkylene, or heterocyclylene group as defined herein. $R^2$ and $R^3$ are independently hydrogen, or a substituted or unsubstituted alkyl, cycloalkyl, alkenyl, alkynyl, aryl, aralkyl, heterocyclylalkyl, or heterocyclyl group as defined herein.

The term "amine" as used herein also refers to an independent compound. When an amine is a compound, it can be represented by a formula of $R^{1'}NR^{2'}R^{3'}$ groups, wherein $R^{1'}$ $R^{2'}$, and $R^3$ are independently hydrogen, or a substituted or unsubstituted alkyl, cycloalkyl, alkenyl, alkynyl, aryl, aralkyl, heterocyclylalkyl, or heterocyclyl group as defined herein.

The term "weight percent," "wt. %," "percent by weight," "% by weight," and variations thereof, as used herein, refer to the concentration of a substance as the weight of that substance divided by the total weight of the hybrid material and multiplied by 100. It is understood that, as used here, "percent," "%," and the like are intended to be synonymous with "weight percent," "wt. %," etc.

When describing PINCs produced herein, said PINCs have been assigned nomenclature based on the halide present in the precursor silane IL despite the presence of other anions (e.g., $OH^-$ and $Cl^-$) in the nanoclay reaction media.

Organic-Inorganic Hybrid Materials

The functionalized organic-inorganic hybrid materials described herein are polyionic nanoclay hybrid materials synthesized by linking organic molecules to inorganic supports or inorganic support precursors. Preferably, the hybrid materials comprise a phyllosilicate with an octahedral magnesium cation interlayer sandwiched between cation-functionalized tetrahedral organosilicates. Phyllosilicates, or sheet silicates, are an inorganic class of minerals that include, among others, chlorite, serpentine, talc, kaolinites, and clay minerals. As used herein, the term "phyllosilicate" refers to a compound based on interconnected six-member rings of $SiO_4^{-4}$ tetrahedra that extend outward in two-dimensional sheets, wherein three of the four oxygens from each tetrahedron are shared with other tetrahedra, leading to a compound which comprises a basic structural unit of $Si_2O_5^{-2}$. Most phyllosilicates contain hydroxyl ion, $OH^-$, with the OH located at the center of the 6 membered rings. Thus, the group becomes $Si_2O_5(OH)^{-3}$. When other cations, such as $Mg^{+2}$, are bonded to the $SiO_4$ sheets, they share the apical oxygens and the (OH) ions which bond to the other cations in octahedral coordination. This forms a layer of cations that occur in octahedral coordination with the 0 and OH ions of the tetrahedral phyllosilicate layer leading to a tetrahedral-octahedral (T-O) structure. This type of structure is known as a 1:1 phyllosilicate. Kaolinite and serpentine clays are examples of 1:1 phyllosilicates.

In a 2:1 phyllosilicate, the joining of two phyllosilicate tetrahedral sheets to one octahedral sheet where the octahedral sheet is sandwiched between the tetrahedral sheets produces a three-sheet (tetrahedral-octahedral-tetrahedral) mineral type or "TOT." Examples of 2:1 phyllosilicates are mica, smectite, talc, chlorites, and vermiculites. It is important to note that phyllosilicates may contain coordinating anions other than hydroxyls and cations in the octahedral layer may exist in a divalent or trivalent state. Examples of metal cations in the octahedral layer are hydrated structures of $Mg^{2+}$, $Ca^{2+}$, $Zn^{2+}$, $Mn^{2+}$, $Co^{2+}$, $Ni^{2+}$, $Cu^{2+}$, $Ce^{3+}$, $Fe^{3+}$, $Al^{3+}$, or a lanthanide (Ce, Pr, Nd, Pm, Sm, Eu, Gd, Tb, Dy, Ho, Er, Tm, Yb, Lu).

In a preferred embodiment, the functionalized organic-inorganic hybrid materials described herein comprise a phyllosilicate nanosheet wherein, the silica-bonded oxygen not shared among the tetrahedra may be replaced with a chemical moiety covalently bound to the silica wherein the chemical moiety contains one or more one or more functional groups comprising organic moieties such as amine, hydroxyl, thiol, imidazole, and others.

The functionalized organic-inorganic hybrid materials may be provided in the form of a phyllosilicate, wherein optionally more than one chemical moieties or functional groups are covalently bonded to the silica. Alternatively, the functionalized organic-inorganic hybrid materials may also be provided in the form of a silicate clay other than a phyllosilicate and one or more chemical moieties or functional groups are covalently bonded to the silica. In an embodiment, at least one chemical moiety covalently bound to the silica of the inorganic-hybrid material contains a permanently-charged functional group such a cationic quaternary ammonium group with a counter anion. The at least one chemical moiety covalently bound to the silica of the inorganic-hybrid material can also contain a functional group such as a vinyl group that allows for further chemical modification of the chemical moiety.

As used herein, the terms "chemical moiety" and "functional group" are used interchangeably and refer to a group of atoms responsible for, or playing a key role in, the characteristic reactions of a particular compound thus giving that compound certain physical and chemical properties. The terms "chemical moiety" and "functional group" include derivatives and salts thereof, including derivatives and salts which render the groups more reactive or better able to react with a silane. The term "chemical moiety" includes, without limitation, organic moieties and inorganic moieties of varying charges. For example, the term chemical moiety includes charged organic moieties, such as those covalently bound to the inorganic metal silicate clay nanosheet described herein. The charged organic moieties include, for example, cationic groups/cations. Suitable cationic groups include, without limitation, imidazolium, alkylimidazolium, N-alkylpyrrolodinium, pyridinium, pyrrolidinium, cholinium, ammonium, phosphonium, sulfonium, a small biological species (e.g., saccharide, peptide), a metal cation (e.g., $Na^+$, $Li^+$, $Cu^{2+}$, $Eu^{3+}$), a complex cation (e.g., $[Co(NH_3)_6]^{3+}$, a cationic fluorophore, or a combination thereof.

The term "chemical moiety" also includes counterions associated with, but not covalently bound to, the charged organic moieties. The counterions include, for example, anionic groups/anions such as hexafluorophosphate, tetrafluoroborate, triflate, dicyanamide, methyl sulfate, dimethyl phosphate, acetate, trifluoroacetate, perchlorate, an amino acid, a carboxylate, bis(trifluoromethylsulfonyl)imide, a sulfonate, alkylsulfate, or sulfate (e.g., trifluoromethane-sulfonate, methyl sulfate), a halide, a pseudo-halide, a chromophore, a fluorophore, a complex anion (e.g., $[CoCl_4(NH_3)_2]^-$), dicynamide, dimethyl phosphate, acetate, an amino acid, carboxylate, bis(trifluoromethanesulfonyl)imide, or a combination thereof.

Further, the term chemical moiety includes pendant groups, small biological molecules/biomolecules (e.g., fatty acids, saccharides, glycolipids, sterols, vitamins, neurotransmitters, or hormones, in whole or in part), a fluorescent probe, contrast agent, oligomer, polymer (for example, water-soluble polymers such as poly(vinyl) alcohol), chelating group/chelant, extracting group, targeting group, therapeutic ligand, aptamer, nucleic acid, enzyme, peptide, lipid, nanoparticle (e.g., metal nanoparticles such as gold, silver, platinum, or palladium nano particles; bi-metallic nanoparticles; and multi-metallic nanoparticles such as silver-gold-nanoparticles), a natural or synthetic antibody, a hydroxyl, methyl, carbonyl, carboxyl, amino, phosphate, or sulfhydryl group; other organic groups such as a protein, protein fragment, DNA, or RNA Suitable pendant groups include, without limitation, a vinyl group, alkene, alkyne, methacrylate, alkyl halide, amine, epoxide, aldehyde, ketone, sulfhydryl group, maleimide, carboxylate, isothiocyanate, NHS ester, sulfonyl chloride, tosylate ester, glyoxal, photoreactive cross-linker, or a combination thereof.

The term "chemical moiety" also includes zwitterionic groups, such as a betaine, amino acid, other biobased-zwitterionic groups, or a combination thereof.

The functionalized organic-inorganic hybrid materials described herein may be functionalized with one or more task-specific functional groups, wherein the nanoclay is functionalized to have targeted biological properties combined with chosen physical and chemical properties.

In some embodiments, the polyionic nanoclay hybrid material comprises one type of functional group. In other embodiments, the polyionic nanoclay hybrid materials comprise two different functional groups, three different functional groups, or four-plus different types of functional groups.

Beneficially, in some embodiments, the surface of the functionalized organic-inorganic hybrid material (e.g., a polyionic nanoclay) is completely functionalized.

According to some embodiments, the two-dimensional nanosheet is sub-5 nm thick (i.e., 5 nanometers or less). Beneficially, the covalent bonds between the chemical moieties and the silicate permit the formation of sub-5 nm nanosheets instead of beads.

In some embodiments, the two-dimension nanosheet will undergo self-assembly into the form of layered sheets.

The inorganic metal silicate clay nanosheet may be provided as a 1:1 clay, wherein the inorganic metal forms an octahedral oxide sheet and the silicon atoms form a tetrahedral sheet. Alternatively, the metal silicate clay nanosheet is provided as a 2:1 clay, wherein the inorganic metal forms an octahedral oxide layer, and wherein the octahedral oxide layer is sandwiched on both sides by a tetrahedral sheet comprising the silicon atoms.

Methods of Synthesizing Organic-Inorganic Hybrid Materials

The disclosure provides methods of synthesizing a functionalized organic-inorganic hybrid material, particularly a polyionic nanoclay, comprising (i) reacting at least one silane (for example an alkyl silane) with one or more functional groups to generate at least one ionic organosilane; (ii) hydrolyzing the ionic organosilane in the presence of a metal cation to produce a polyionic nanoclay with a functionalized surface which permits optional further post-synthesis modifications/functionalization.

As used herein, the term "alkyl silane" refers to a saturated compound comprising one or more silicon atoms linked to each other or one or more atoms of other elements. A series of connected silicon atoms is referred to as a silicon skeleton or a silicon backbone. Suitable silanes include, without limitation, those according to the general formula XR—$Si(OR')_3$, wherein X is a vinyl group, epoxy group, amino group, methacryloxy group, mercapto group, or anionic counterion, preferably a halide, still more preferably chlorine or iodine; wherein R is a branched or unbranched, substituted or unsubstituted $C_1$-$C_{10}$ alkyl group, preferably a propyl group; and wherein OR' is OH or a hydrolyzable or leaving alkoxy group, preferably methoxy ($OCH_3$), ethoxy ($OC_2H_5$), or acetoxy ($OCOCH_3$). When X is not an anionic counterion, the silane may further comprise an anionic counterion or group, preferably a halide, still more preferably chlorine or iodine.

More particularly, the method of synthesizing a functionalized organic-inorganic hybrid material comprises (i) reacting at least one non-ionic silane with at least one nucleophile to generate at least one ionic organosilane having a plurality of charged organic moieties; wherein the charged organic moieties are covalently bound to the organosilane; and (ii) reacting the ionic organosilane with a metal salt to form a functionalized organic-inorganic hybrid material comprising a clay nanosheet having a surface and comprising an inorganic metal and a plurality of silicon atoms; wherein the surface is decorated (i.e., modified by covalent attachment) with a plurality of organic moieties; and wherein the charged organic moieties are covalently bound to the silicon atoms at the surface.

In a further embodiment, the method of synthesizing a functionalized organic-inorganic hybrid material comprises:

(i) reacting at least one silane, preferably a non-ionic silane with at least one nucleophile to generate at least one ionic organosilane having a plurality of charged organic moieties, wherein the charged organic moieties are covalently bonded to the organosilane. In a preferred embodiment, the silane is a compound according to the formula: XR—$Si(OR')_3$, wherein X is a vinyl group, epoxy group, amino group, methacryloxy group, mercapto group, or anionic counterion, preferably a halide, still more preferably chlorine or iodine; wherein R is a branched or unbranched, substituted or unsubstituted C1-C10 alkyl group, preferably a propyl group; and wherein OR' is OH or a hydrolyzable or leaving alkoxy group, preferably methoxy ($OCH_3$), ethoxy ($OC_2H_5$), or acetoxy ($OCOCH_3$); and in a preferred embodiment, the ionic organosilane is a compound according to the formula: $R_o$—XR—$Si(OR')_3$, wherein $R_o$ is the one or more functional groups or chemical moieties; wherein X is a vinyl group, epoxy group, amino group, methacryloxy group, mercapto group, or an anionic counterion, preferably a halide, still more preferably chlorine or iodine; wherein R is a branched or unbranched, substituted or unsubstituted $C_1$-$C_{10}$ alkyl group, preferably a propyl group; and wherein OR' is OH or a hydrolyzable or leaving alkoxy group, preferably methoxy ($OCH_3$), ethoxy ($OC_2H_5$), or acetoxy ($OCOCH_3$); and (ii) hydrolyzing the ionic organosilane in the presence of a metal cation to produce a polyionic nanoclay with a functionalized surface with the general formula $R_8Si_8M_6O_{10}(OH)_4$, wherein the R group is one or a combination of chemical moieties R often containing an aliphatic chain(s) with at least one terminal functional group being a permanently-charged organic ion with a counter ion and the metal (M) cation is $Mg^{2+}$, $Ca^{2+}$, $Zn^{2+}$, $Mn^{2+}$, $Co^{2+}$, $Ni^{2+}$, $Cu^{2+}$, $Ce^{3+}$, $Fe^{3+}$, $Al^{3+}$ or a lanthanide.

In a further preferred embodiment, the method of synthesizing an organic-inorganic hybrid material of a 2:1 lamellar structure comprises:

(i) reacting at least one silane according to the formula:

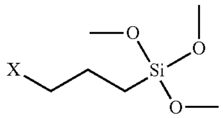

wherein X is an anionic counterion, preferably a halide, still more preferably chlorine or iodine; with at least one nucleophile according to the formula:

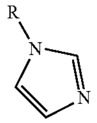

wherein R is a branched or unbranched, substituted or unsubstituted alkyl group; to form at least one ionic organosilane according to the formula:

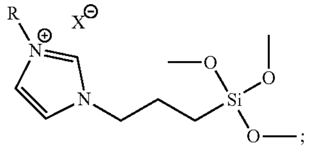

wherein X is an anionic counterion, preferably a halide, still more preferably chlorine or iodine; and wherein R is a branched or unbranched, substituted or unsubstituted alkyl group, preferably methyl, butyl, or octyl; and (ii) reacting the at least one ionic organosilane in the presence of a metal salt to form a functionalized organic-inorganic hybrid material comprising a clay nanosheet according to the structure:

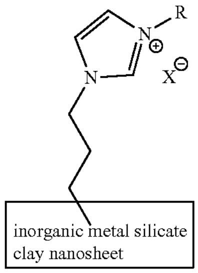

wherein X is an anionic counterion, preferably a halide, still more preferably chlorine or iodine; and wherein R is a branched or unbranched, substituted, or unsubstituted alkyl group, preferably methyl, butyl, or octyl. In a preferred embodiment, the functionalized organic-inorganic hybrid material comprises an inorganic metal and a plurality of silicon atoms, and the surface of the material is decorated with a plurality of organic moieties that are covalently bound to silicon atoms at the surface.

In a further embodiment, the method of synthesizing a functionalized organic-inorganic hybrid material comprises: (i) reacting at least one silane comprising 3-iodopropyltrimethoxysilane with at least one nucleophile comprising 1-methylamidazole, 1-butylarnidazole, 1-octylamidazole, or a combination thereof to generate a at least one ionic organosilane comprising 1-methyl-3-(3-trimethylsiloxyl) propyl imidazolium iodide, 1-butyl-3-(3-trrimethylsiloxyl) propyl imidazolium iodide, 1-octyl-3-(3-trrimethylsiloxyl) propyl irnidazolium iodide, or a combination thereof; and (ii) reacting the at least one ionic organosilane in the presence of magnesium ions/a magnesium salt to produce a polyionic nanoclay with an imidazolium functionalized surface.

In a still further embodiment, the method synthesizing a fluorescent dansyl-tagged organic-inorganic hybrid material comprises one of two routes: (i) reacting dansyl chloride with 3-aminopropyl trimethoxysilane to generate a fluorescent silane which is then co-hydrolyzed alongside the desired amount of an ionic silane comprising one or more imidazolium, pyrrolidinium, or pyridinium moieties to form a fluorescent clay; or (ii) co-reaction of a desired ionic silane, or a combination thereof, and 3-aminopropyl trimethoxysilane to produce a 2:1 phyllosilicate organic-inorganic hybrid material having a controllable level of free amines (e.g., 0-20 mol %) which are then post-synthetically modified by aqueous phase reaction with dansyl chloride. Both routes yield polyionic nanoclays having a programmable level of covalently attached dansyl moieties.

In a further embodiment, by incorporating reactive chemistry on the of the organic-inorganic nanoclay surface, downstream modification of the nanosheet can be used to attached functional or targeting chemistries including, but not limited to nanoparticles (e.g., quantum dots, metal or metal oxide, nitride, or phosphide nanoparticles, graphene analogs, MXenes, perovskites, MoS2, boron nitride), biomolecules, (e.g., peptides, proteins, DNA, RNA, sugars), fluorescent species, or ligands. There is a wide range of post-synthetic modification amenable to amine, alcohol, acid, or vinyl-substituted polyionic nanoclays (PINCs) for example, including many classical "click" chemistry approaches, so-named for their facile nature such as copper (I)-catalyzed azide-alkyne Huisgen cycloaddition and thiol-ene or thiol-yne coupling. Using vinylimidazolium-modified PINC as one example, the vinyl group serves as the locus for attachment of a range of species using thiol-ene coupling. Overall, this flexibility offers tremendous opportunities for incorporating orthogonal and otherwise incompatible chemistry onto the same nanoscale surface to offer a level of task-specificity not previously achievable. The relative synthetic facility with which molecular structures and interactions can be systematically varied in PINCs will prove useful in efforts to address the many fundamental questions guarding the nature of catalysis at ionic organic surfaces and is likely to open unforeseen technological possibilities as well.

Magnesium Phyllo(organo) Silicate Imidazolium-Functionalized Nanosheets

Described herein is the first reported bottom-up approach for the synthesis of two-dimensional, imidazolium-functionalized, phyllosilicate nanoclay-based SILs (coined polyionic nanoclays, or PINCs, due to their ionic liquid surface functionality). Broadly speaking, 3-iodopropyltrimethoxysilane was reacted with methyl-, butyl-, or octylimidazole to produce the corresponding 1-alkyl-3-(3-(trimethoxysilyl) propyl) imidazolium iodide IL ([m-, [b-, or [opim]I silane, respectively). These silane ILs were hydrolyzed in the presence of $Mg^+$ ions (MgCl·6H O) under basic conditions to produce IL-functionalized PINCs, referred to herein as [m-, [b-, and [opim]I PINCs based on their methyl, butyl, or octyl functionalities, respectively.

Beneficially, the facile synthesis is not wasteful of expensive IL, and the products possess intrinsic homogeneous surface functionality due to the building-block nature of the bottom-up nanoclay synthesis.

Synthesis Routes

Two example routes are proposed for synthesizing PINCs, the first according to Route 1:

Route 1

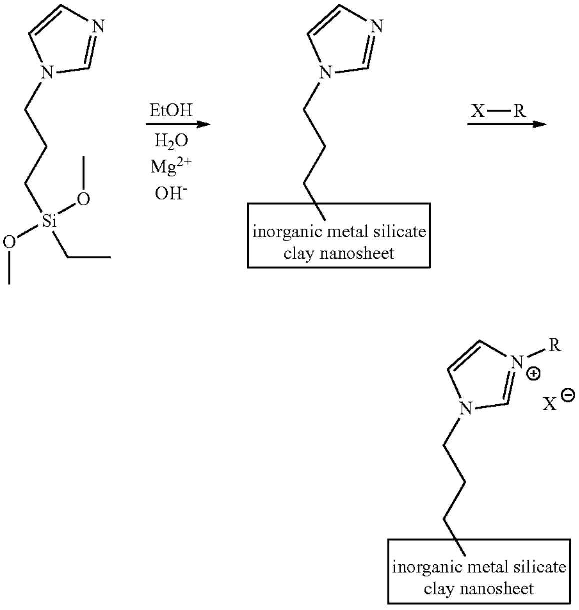

[Rpim]X PINC

Route 1 involves the alkylation of a propylimidazole-functionalized nanoclay to yield PINC. Due to negligible delamination of the imidazole nanoclay in solvent, alkylation occurs on the exposed surfaces of nanoclay stacks. Example Route 2 is as follows:

Route 2

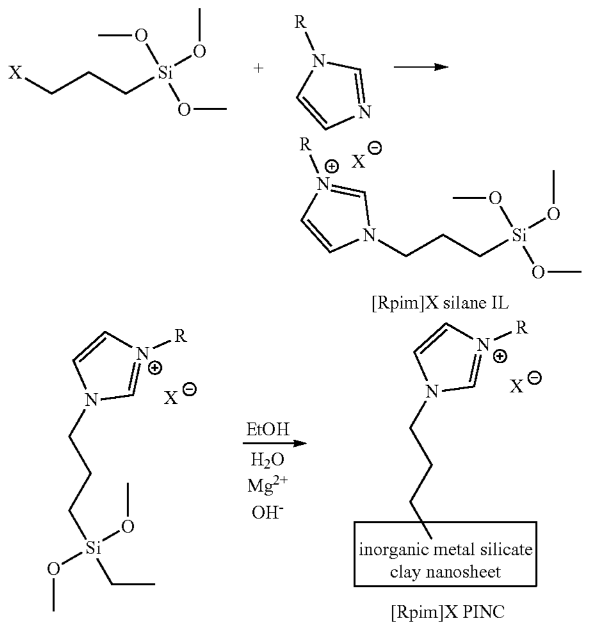

[Rpim]X silane IL

[Rpim]X PINC

R = methyl, propyl, octyl
X = I, Cl

Route 2 illustrates an example method toward alkylimidazolium-functionalized silane IL synthesis, followed by nanoclay formation in the presence of $Mg^{2+}$ and under basic conditions. This route is particularly effective for preparing PINCs as it results in aminoclay analogs with complete surface functionalization. For example, based on thermogravimetric analysis (TGA), an IL loading of approximately 3.8 mmol $g^{-1}$ was determined for [mpim]Cl PINC. With the PINCs possessing backbone comprising a hexagonal distribution of fully condensed surface silicon (talc JCPDS card 13-0558), the theoretical yield for maximum single-layer IL loading is calculated to be 4.2 mmol $g^{-1}$ (3 IL moieties per $nm^2$). It is important to note that discrepancies between the calculated and theoretical IL loadings can be due to residual interlamellar salt (likely NaCl) and char formed during TGA (as evidenced by the black appearance of the calcined product and potential surface defects on the nanosheet.

Beneficially, solvation of the silane ILs and PINCs can simplify characterization, anion exchange, and purification procedures. Silane ILs are readily soluble in water and chloroform, but not diethyl ether or ethyl acetate. Further, the polycationic surfaces of the PINCs cause them to disperse in water, but less so in non-aqueous media (e.g., MeOH, EtOH, acetone, chloro-form, hexanes). Mechanistically, this dispersion is similar to the delamination of aminoclay in water below pH 10 (the pKa for a primary ammonium proton). However, the synthesized PINCs are always charged, and thus not pH-dependent like aminoclay. Further, longer alkyl chains at the imidazolium "N" position contribute to more hydrophobic PINC surfaces, reducing the solubility of those PINCs in water. Indeed, dispersion of the 1-methyl-3-propylimidazolium iodide ([mpim]I) PINC in water results in a clear, colorless solution at concentrations above 100 mg mL-1 with light sonication, whereas an aqueous solution of [opim]I PINC has the appearance of a cloudy dispersion.

Characterization of PINCs

The iodide-based silane ILs and PINCs were characterized using H NMR spectroscopy, XRPD, FTIR spectroscopy, and TGA. The H NMR spectroscopic assignments and integrations display characteristic peaks for [mpim]I, [bpim]I, and [opim]I silanes and PINCs, with peak broadening in the [bpim]I PINC spectrum attributed to its decreased D20 solubility. The XRPD diffractograms for the iodide-based PINCs exhibit broader analogs of the talc (020), (110), (130), (200), (060), and (330) reflections, a finding which correlates well with that of Burkett et al. for their organo-functionalized nanoclays. Notably, the (001) reflection, which is representative of the interlamellar spacing between nanoclays, is difficult to discern. Without being bound by theory, it is thought that this observation is due to exfoliation or steric expansion of the interlayer spacing beyond the working range of the X-ray diffractometer used. The FTIR spectra reveal absorbance peaks corresponding to those of the magneso-silicate backbone and the organic moieties associated with the surface functional groups. The TGA thermograms reveal similar thermal stabilities for each iodide-based PINC, with the evaporation of trapped solvent concluding around 150° C. and thermal degradation of the surface organic groups beginning at around 50-300° C. These indicate that PINCs can be successfully used in applications at elevated temperatures (near 200° C.).

Although unfunctionalized aprotic ionic liquids, (e.g., 1-butyl-3-methylimidazolium bis(trifluoromethylsulfonyl) imide) typically produce negligible char residue upon heating in an inert atmosphere, similar thermolysis conducted under confinement within an oxide framework (e.g., silica) afforded significant carbonization yields. Char formation for thermolysis of the [mpim]Cl PINC is evident from the change in appearance from white to black, alluding to the possibility for these PINCs to act as matrices for the entrapment of char.

The monetary and temporal cost of bulk IL (and by extension SIL) production is a common barrier to their application. Therefore, as described herein, the expensive, week-long ambient synthesis using the iodine-based precursor silane was replaced with a cheaper, three-day, synthesis using 3-chloropropyltrimethoxysilane. Beneficially, this alteration to the method produces [mpim]Cl silane IL and PINC, which notably shows similar solvation properties and characterization results to those of [mpim]I PINC while reducing the reagent cost of the resulting composite by almost an order of magnitude.

The claim of complete surface functionalization requires conscientious reporting of IL loading and surface charge. As shown in the Examples and FIG. 13, utilizing TGA, an IL loading of approximately 3.8 mmol $g^{-1}$ for the [mpim]Cl PINC was calculated. Neat [mpim]Cl IL comprises an "IL loading" of 6.2 mmol $g^{-1}$ when calculated using the molar mass of 160.64 g $mol^{-1}$. Discrepancies between the calculated and theoretical IL loadings can be due to residual interlamellar salt (likely NaCl) and char formed during TGA (as evidenced by the black appearance of the calcined product shown in FIG. 13). Further investigation was conducted into the backbone structure to determine the presence of other errors by way of surface defects. Without being bound by theory, it is thought that the PINCs possess a talc-like backbone comprising a hexagonal distribution of fully condensed surface silicon, although as shown in the Examples and FIG. 3, the PINC backbone can be likened to that of aminoclay rather than fully-condensed talc (i.e., aminoclay is known to possess a small T3 peak). A PLNC talc-like backbone would yield a theoretical maximum single-layer IL loading of 4.2 mmol $g^{-1}$ (3 IL moieties per nm). The estimated IL loading of 3.8 mmol $g^{-1}$ achieved by the invention is over double that of other existing materials and is the closest of any SILP phase to the previously mentioned IL density of neat, unsupported [mpim]Cl IL (6.2 mmol $g^{-1}$). Thus, the bottom-up approach described herein intrinsically leads to the complete functionalization of the clay surface.

Methods of Making and Using a Nanoparticle Supported Catalyst Comprising Organic-Inorganic Hybrid Materials The functionalized organic-inorganic hybrid materials as described herein, particularly polyionic nanoclays, may be utilized as a catalysis-enhancing support for nanoparticles, such as gold nanoparticles. The formation of [mpim][$AuCl_4$] PINCs incentivizes investigation into substrate-stabilized AuNPs and heterogenous catalysis.

Thus, a method of producing a supported catalyst comprising one or more nanoparticles, preferably gold nanoparticles, comprises: contacting one or more nanoparticles and the functionalized organic-inorganic hybrid material described herein, preferably in the presence of water and a reducing agent.

In a further embodiment, the method of producing a supported catalyst comprising one or more gold nanoparticles comprises: dissolving the functionalized organic-inorganic hybrid material in water to form an aqueous solution; contacting the solution with one or more gold nanoparticles in the presence of a reducing agent; and stabilizing the one or more gold nanoparticles on the surface of the functionalized organic-inorganic hybrid material. In an embodiment, the one or more gold nanoparticles are stabilized on the surface of the functionalized organic-inorganic hybrid material by surface ligands and (where the functionalized organic-inorganic hybrid material is a polyionic nanoclay comprising imidazolium groups) the π electrons from the imidazolium groups.

Significantly, because the AuNPs appear to be sufficiently stabilized by surface ligands and the conjugated π electrons from the PINC imidazolium groups, sintering is prevented even after storage in a lab drawer for two months. As such, these supported AuNPs exhibit good long-term aqueous stability.

Methods of using a nanoparticle supported catalyst comprising the functionalized organic-inorganic hybrid materials described herein, particularly polyionic nanoclay supported gold nanoparticles, are provided.

In an embodiment, the method of using the comprising the functionalized organic-inorganic hybrid material supported nanoparticles comprises: generating the functionalized organic-inorganic hybrid material described herein, stabilizing one or more nanoparticles on the surface of the functionalized organic-inorganic hybrid material to form a supported catalyst, and using the supported catalyst in an application such as a catalytic reaction.

Supported catalysts, particularly supported gold nanoparticle catalysts, can be used in any suitable application, including redox catalysis, electronics, theranostics, and sensing.

In some embodiments, the supported catalysts described herein provide a reaction rate that occurs at least 10 times faster and up to 40 times faster than the same reaction occurring without the supported catalysts of the invention.

Methods of Making and Using Organic-Inorganic Hybrid Materials for Fluorescence Applications The functionalized organic-inorganic hybrid materials described herein can be functionalized to have utility in applications where fluorescence would be beneficial. For example, PINCs can be functionalized with fluorescent activity by adding a second moiety to part or all of the PINC surface, wherein the functional group comprises a fluorophore that can be attached to the second moiety.

The fluorophore may be any suitable fluorescing material, including, without limitation, synthetic fluorophores, fluorescent proteins, nucleic acid dyes, thiol reactive dyes (for example, acrylodan), and non-protein organic fluorophores. Examples of fluorescent proteins include GFP, EBFP, azurite, T-sapphire, cerulean, CyPet, TagCFP, AmCyanl, EYFP, TagYFP, Topaz, Venus, mCitrine, and the like. Examples of suitable families of non-protein organic fluorophores include derivatives of anthracene, acridine, acrylmethine, cyanine, coumarin, xanthene, squrarine (including ring-substituted squrarines and squrarine rotaxane derivatives), naphthalene, oxadiazole, pyrene, oxazine, tetrapyrrole, and dipyrromethene.

In an embodiment, the second moiety is a propylamine group and the fluorophore is a naphthalene derivative, for example, dansyl chloride (DNS-Cl). According to such an embodiment, DNS-Cl is covalently bonded to the PINC surface at the site of the propylamine group. Two different routes of preparing fluorescent PINCs (DNS-PINC) are shown, wherein DNS-$ap_x$([mpIm]Cl)$_{1-x}$ is the abbreviation for dansylated aminopropyl-modified 1-methyl-3-propylimidazolium chloride PINC, DNS-$ap_x$([mpPyrr]Cl)$_{1-x}$ is the abbreviation for dansylated aminopropyl-modified N-methyl-N-propylpyrrolidinium chloride PINC, and DNS-$ap_x$([pPy]I)$_{1-x}$ is the abbreviation for dansylated aminopropyl-modified N-propylpyridinium iodide PINC.

Route 1 for Synthesizing DNS-$Ap_x$([mpIm]Cl)$_{1-x}$ PINC:

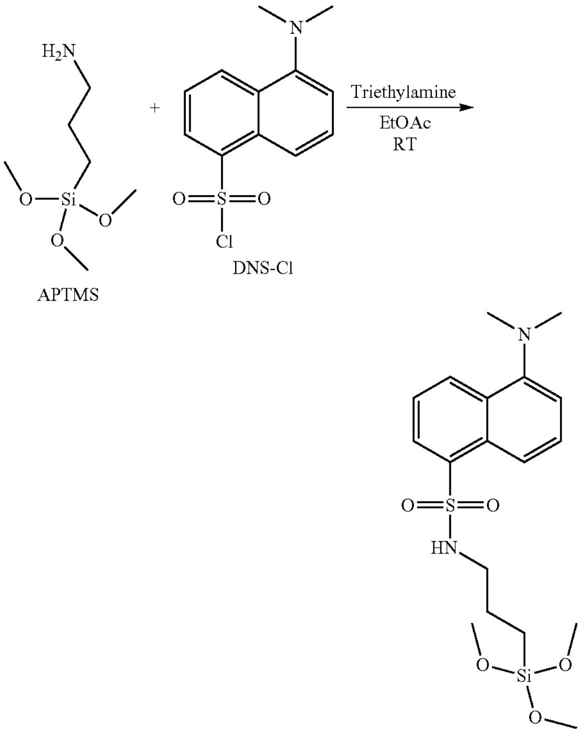

APTMS

DNS-Cl

DNS-APTMS silane

-continued
-continued
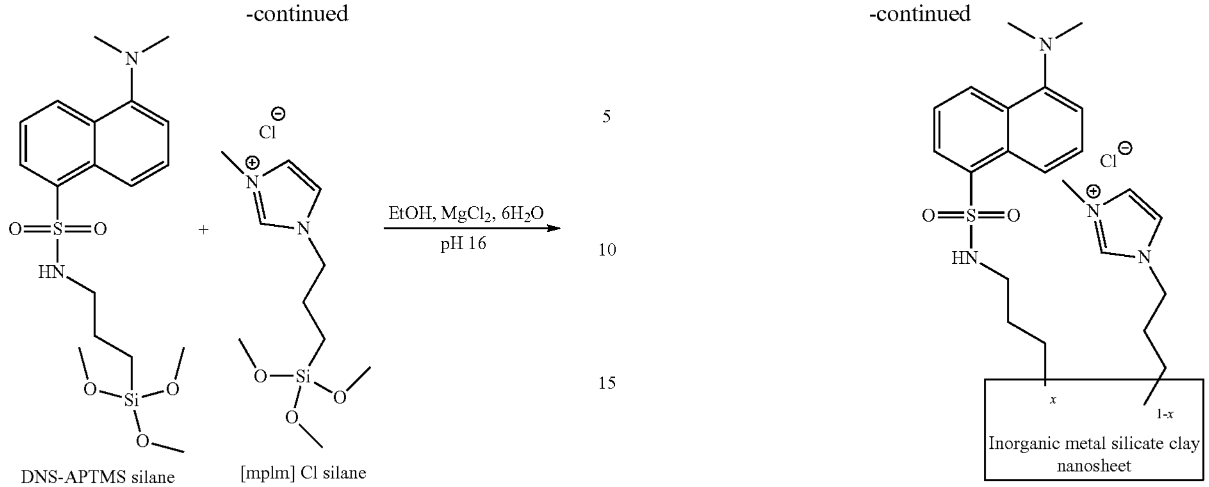
DNS-APTMS silane [mplm] Cl silane
Route 2 for Synthesizing DNS-$Ap_x([mpIm]Cl)_{1-x}$ PINC:
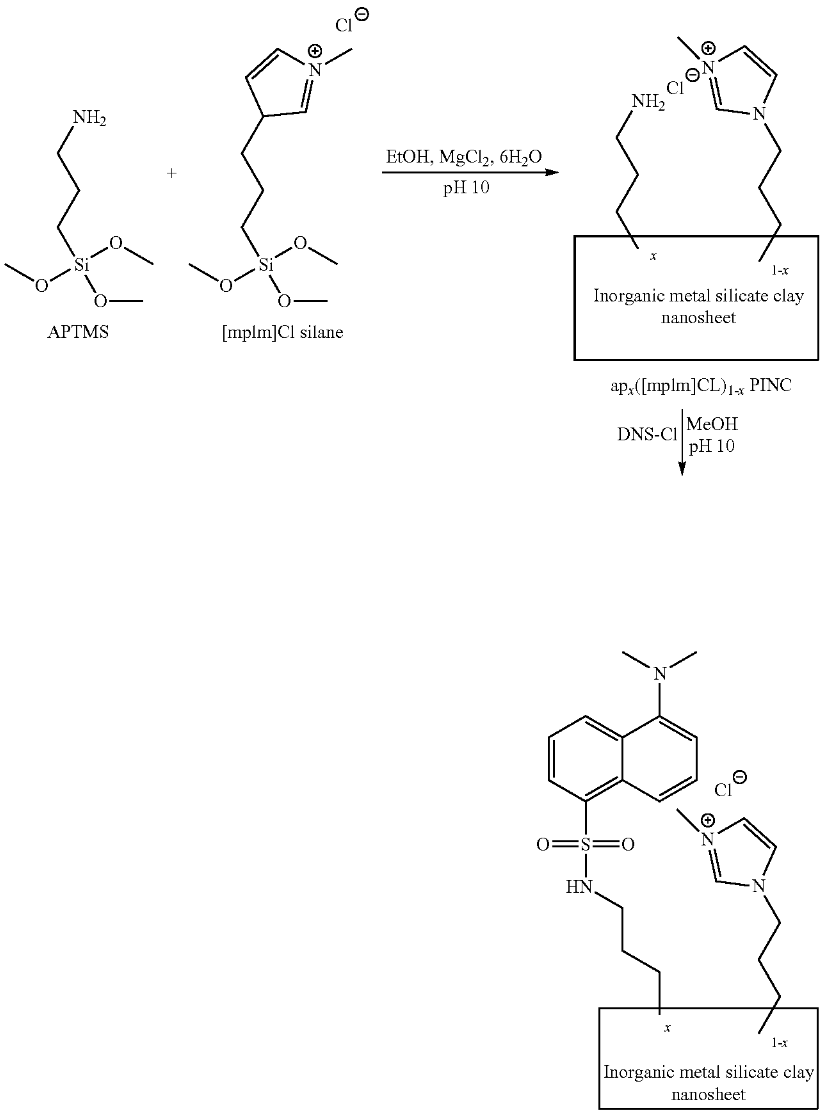
APTMS [mplm]Cl silane
$ap_x([mplm]CL)_{1-x}$ PINC A PINC may be tailored to incorporate one or more fluorophores covalently attached to its surface. The fluorescing PINCs may be used in applications where fluorescence is desirable, particularly analytical techniques such as fluorescence (bio) sensing and imaging, but also in fluorescent tags and imaging labels for assays and separations, theranostic agents, displays, radiative-decay engineering, DNA technology, scintillation devices, and detectors. Due to their versatility, the PINCs may be functionalized to obtained desired properties, such as colorimetric/solvatochromic sensing capabilities, pH sensitivity, analyte selectivity, indicator capabilities, on-off switching, fluorescence energy transfer, and multi-channel or multi-color systems (e.g., barcodes, ratiometric sensing). The fluorescing PINCs may be used to construct a variety of fluorescent barcodes with multiple, distinguishable spectral colors, relative intensities, and polarization/excited-state lifetime capabilities, opening opportunities in anti-counterfeiting, security, and biomedical assays.

Methods of Making Nacre Mimetic Polyionic Nanoclay Composites

The functionalized organic-inorganic hybrid materials described herein, specifically polyionic nanoclays, can be used to form nacre mimetic composites. A method for generating a nacre mimetic composite comprises generating the functionalized organic-inorganic hybrid material described herein and contacting the functionalized organic-inorganic hybrid material with poly(vinyl alcohol) (PVA) to form a thin film.

A 70 wt. % [ppy]Cl PINC/PVA film with an average thickness of 0.149 mm and having the structure:

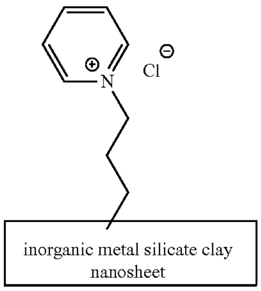

A 70 wt % o [mpim]Cl PINC/PVAfilm with an average thickness of 0.155 mm and having the structure:

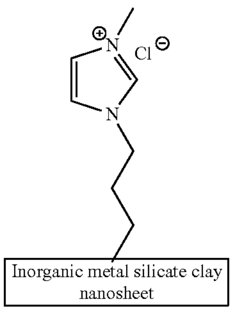

A 70 wt % [mppyr]Cl PINC/PVA film with an average thickness of 0.169 mm, and having the structure:

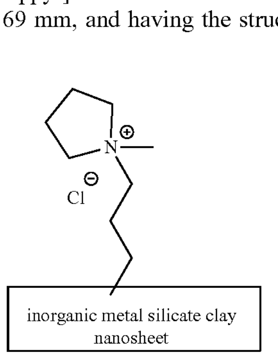

Nacre is an organic-inorganic material primarily comprised of crystallized calcium carbonate known for its tensile strength. The functionalized organic-inorganic hybrid materials described herein beneficially have properties similar to nacre. Interactions between the functionalized organic-inorganic hybrid materials sheets through the organic component could promote stronger materials, self-healing, incorporation of functional materials, etc.

Methods of Using Organic-Inorganic Hybrid Materials for Treating a Solution

The methods of using the functionalized organic-inorganic hybrid materials described herein further include methods of purifying a solution, the method comprising passing the solution over or through a surface comprising the functionalized organic-inorganic hybrid material described herein; and reducing the concentration of the one or more contaminants in the solution to form a treated solution. In particular, the functionalized organic-inorganic hybrid material is a functionalized organic-inorganic hybrid material of a 2:1 lamellar structure comprising: a basal ionic layer; a first phyllosilicate layer positioned on top of the basal ionic layer; a second phyllosilicate later positioned on the bottom of the basal ionic layer; and one or more functional groups/chemical moieties covalently bonded to the first phyllosilicate layer and the second phyllosilicate layer.

Optionally, the method may be repeated using the treated solution such that the treated solution is passed over or through the same surface, or two, three, four, or more different surfaces comprising the functionalized organic-inorganic hybrid material.

In some embodiments, the surface comprising the functionalized organic-inorganic hybrid material will form part of a sheet, membrane, or filter. In further embodiments, wherein the treated solution is passed over or through more than one different surface comprising the functionalized organic-inorganic hybrid material, the sheets, membranes, or filters may be arranged sequentially in a treatment system. In other embodiments, when the treated solution is passed over or through more than one different surface comprising the functionalized organic-inorganic hybrid material, the sheets, membranes, or filters may be staggered at different parts or junctures of a treatment system. In an embodiment, the treatment system is part of a water treatment plant, a ground soil treatment system, a home water filter, a food or beverage company, or any other area in which treatment is desired.

In some embodiments, the solution is an aqueous solution. In a further embodiment, the method is used to treat a solution contaminated with an oily waste or one or more hydrocarbons or hydrophobic organic compounds. In other embodiments, the method is used to treat an aqueous solution that is storm water, effluent from roads or tarmacs, bilge water, water from car washes, and flow back water (FBW) or produced water (PW) derived from petroleum recovery. In some embodiments, the method is used to treat water, or another aqueous solution contaminated with about 25, 50, 75, 100, 125, 150, 175, 200, 225, 250, 275, or 300 ppm of a contaminant which comprises oil or an oily waste or water or an aqueous solution that contains an amount of oil or other hydrophobic contaminants below their saturation point.

In some embodiments, the solution is an aqueous solution contaminated with targets for separation, extraction, or sequestration, for example, dyestuffs, radioisotopes (e.g., $TcO_4^-$), rare earths (cerium, neodymium, gadolinium), heavy metals (e.g., $AsO_4^{3-}$, mercury), gases (e.g., $CO_2$, xenon), oils, biomarkers, or biomolecules (e.g., therapeutic proteins or antibodies) or perfluorinated compounds.

EXAMPLES

Example Materials 1-methylimidazole (M50834, 99%), 1-butylimidazole (348414, 98%), 1-bromooctane (152951, 99%), Imidazole (I202, 99%), Sodium hydride (223441, 95%), Magnesium chloride hexahydrate (M2670, 2:99.0%), 3-chloropropyltrimethoxysilane (440183, 2:97%), Potassium bromide (P-5912, 2:99.0%), Deuterium oxide (151882; 99.9 atom % D), Sodium hydroxide (306576, 99.99%), Tetrachloroauric acid (520918, 2:99.9%), Sodium borohydride (213462, 99%), Ethyl acetate (E195-4, 99.9%), (3-iodopropyl) trimethoxysilane (SII6452.0), Absolute ethanol (2716)

Example 1. Methods of Synthesis

Figure 1A:
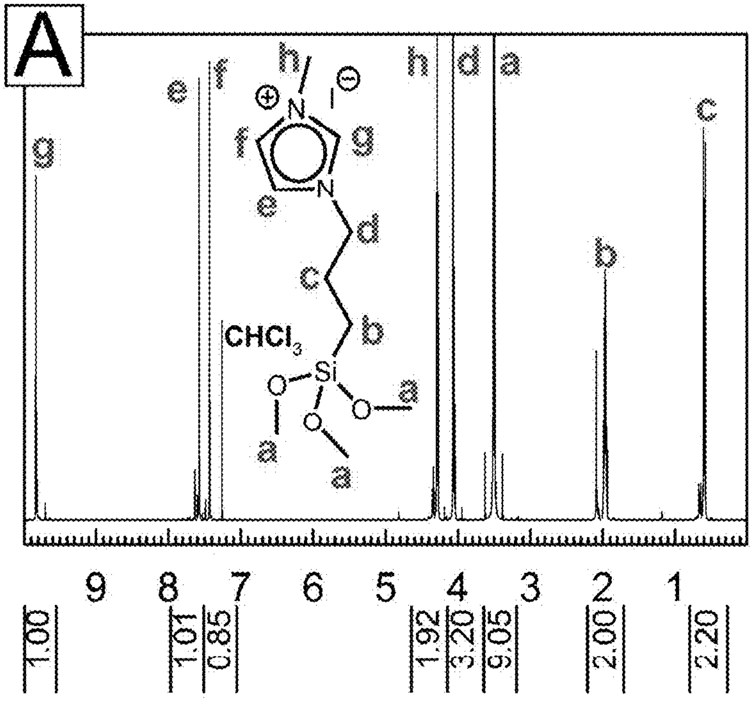
FIG. 1A and FIG. 1B show the results of H NMR spectra.
Figure 1B:
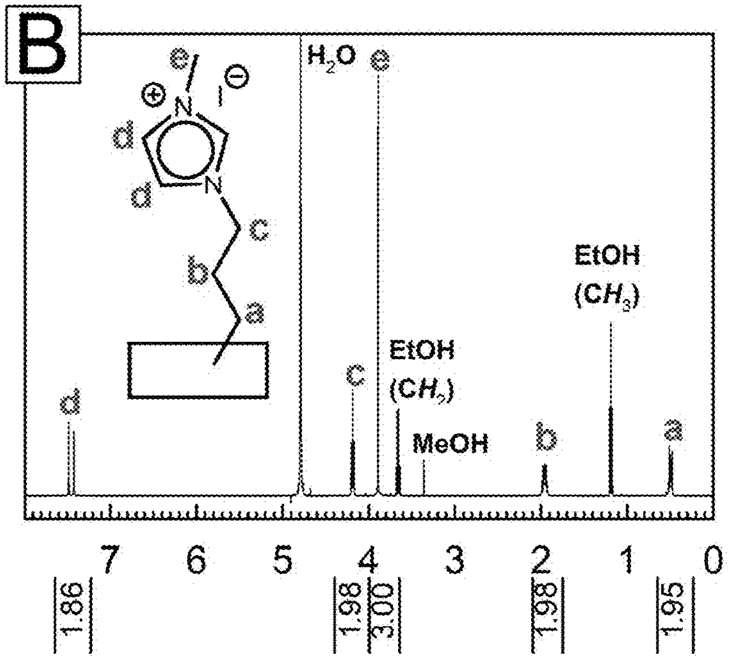

Example 1a. Synthesis of Silanes 2.00 grams (6.8 mmol) of (3-iodopropyl)trimethoxysilane was combined with 0.51 grains (6.6 mmol) of 1-methylimidazole in a clean, dry 15-mL round bottom flask. The mixture was stirred at room temperature and protected from light for 7 days. The resulting yellow liquid was rinsed with ethyl acetate under vigorous stirring three times to extract excess reactants, followed by rotary evaporation at 30° C. for 2 hours to obtain a viscous yellow liquid (yield of 0.4 grams or 2.00 mmol based on the proposed formula weight of 371.9 g/mol$^{-1}$), which was identified via H NMR to be 1-methyl-3 (trimethoxysilyl propyl) imidazolium iodide ([mpim]I silane) as shown in FIG. 1A.

This method was also used to synthesize 1-butyl-3-(trimethoxysilylpropyl) irnidazolium iodide ([bpim]I silane) and 1-octyl-3-(trimethoxysilylpropyl)imidazolium iodide ([opim]I silane) by replacing 1-methylimidazole with similar molar quantities of 1-butyl- or 1-octylimizadole, respectively. In this regard, I-butylimidazole was purchased while 1-octylimidazole was produced by dissolving 5.0 grams of imidazole and 14.2 grams of 1-bromooctane in 50 mL of absolute EtOH, followed by slow addition of 1.8 grams of sodium hydride while stirring to deprotonate the imidazole. This solution of 1-bromooctane was stirred for 1 day and distilled before use for silane synthesis.

It is further understood that (3-chropropyl)trimethoxysilane can be substituted for the (3-iodopropyl)trimethoxysilane by heating for 3 days at 80° C. (all else being the same), resulting in the chloride silanes.

Example 1b. Synthesis of PINCs 0.31 grams of MgCl·6H O (1.5 mmol) was dissolved in 15 grams of absolute EtOH in a 100-ml glass round bottom flask. 0.4 grams of [mpim]I silane was dissolved in 10 grams of absolute EtOH using brief sonication, forming a solution which was promptly added to the solution of Mg. To promote hydrolysis of the silane precursor, 4.0 mL of 0.5 M aqueous NaOH was added to the stirring solution, resulting in the formation of a white precipitate. This cloudy mixture was magnetically stirred at 400 rpm under ambient temperature for 4 h. The contents of the flask were transferred to a 50-mL Alcon centrifuge tube and rinsed three times using absolute EtOH and centrifugation (more particularly, a centrifuge at 10,000 rpm for 15 min, decant the liquid, redisperse the precipitate in ~20 mL of EtOH via brief shaking, repeat) to obtain a white precipitate of [mpim]I PINC, which was then lyophilized to obtain the dry PINC.

PINC powder was stored at room temperature in a lab drawer until use. This method was also used to synthesize butyl- and octylimidazolium iodide ([b- and [opim]I) PINCs as well as methylimidazolium chloride ([mpim]Cl) PINC using those respective silane precursors.

Example 2. Characterization of Iodide-Based Silane ILs and PINCs

The iodide-based silane ILs and PINCs were characterized using proton NMR spectroscopy, XRPD, FTIR spectroscopy, and TGA. All experiments were carried out using ultrapure Millipore water (18.2 Mn cm). Reagents were purchased commercially and used without further purification. The results of this characterization are shown in FIG. 1, specifically FIG. 1A, FIG. 1B, FIG. 1C, FIG. 1D, FIG. 1E, and FIG. 1E.

Example 2a. H NMR

Nuclear magnetic resonance (NMR) analysis was performed using either a Bruker Avance-500 MHz spectrometer or a Bruker Avance-600 MHz spectrometer operated at 500 or 600 MHz, respectively (frequencies are appropriately denoted in the related figure captions). Overall, H NMR spectroscopic assignments and integrations display characteristic peaks for [mpim]I, [bpim]I, and [opim]I silanes and PINCs with peak broadening in the [bpim]I PINC spectrum attributed to its decreased D20 solubility.

More particularly, the NMR spectrum for methylimidazolium iodide silane (FIG. 1A) shows peaks for the residual solvent (chloroform) and water (at 2.1 ppm). The following shifts are identified (600 MHz; $CDCCl_3$: 9.93 (1H, x, N—CH—N), 7.58 (1H, s, $CH_3$—N—CH—CH), 7.43 (1H, s, $CH_3$—N—CH—CH), 4.29 (2H, t, N—$CH_2$), 4.07 (3H, s, $CH_3$—N), 3.51 (9H, s, $CH_3$—O—Si), 1.97 (2H, m, Si—$CH_2$—$CH_2$), 0.60 (2H, t, Si—$CH_2$).

The H NMR spectrum for methylimidazolium iodide PINC (FIG. 1B) shows the presence of residual solvent (ethanol) and reaction byproduct (methanol). The following shifts are identified (500 MHz; $D_2O$): 7.48 (1H, s, $CH_3$—N—CH—CH), 7.42 (1H, s, $CH_3$—N—CH—CH), 4.19 (2H, t, N—$CH_2$), 3.89 (3H, s, $CH_3$—N), 1.96 (2H, m, Si—$CH_2$—$CH_2$), 0.50 (2H, t, Si—$CH_2$). The proton located at the N—CH—N location experiences rapid exchange with $D_2O$, resulting in its absence in the spectrum.

Figure 3:
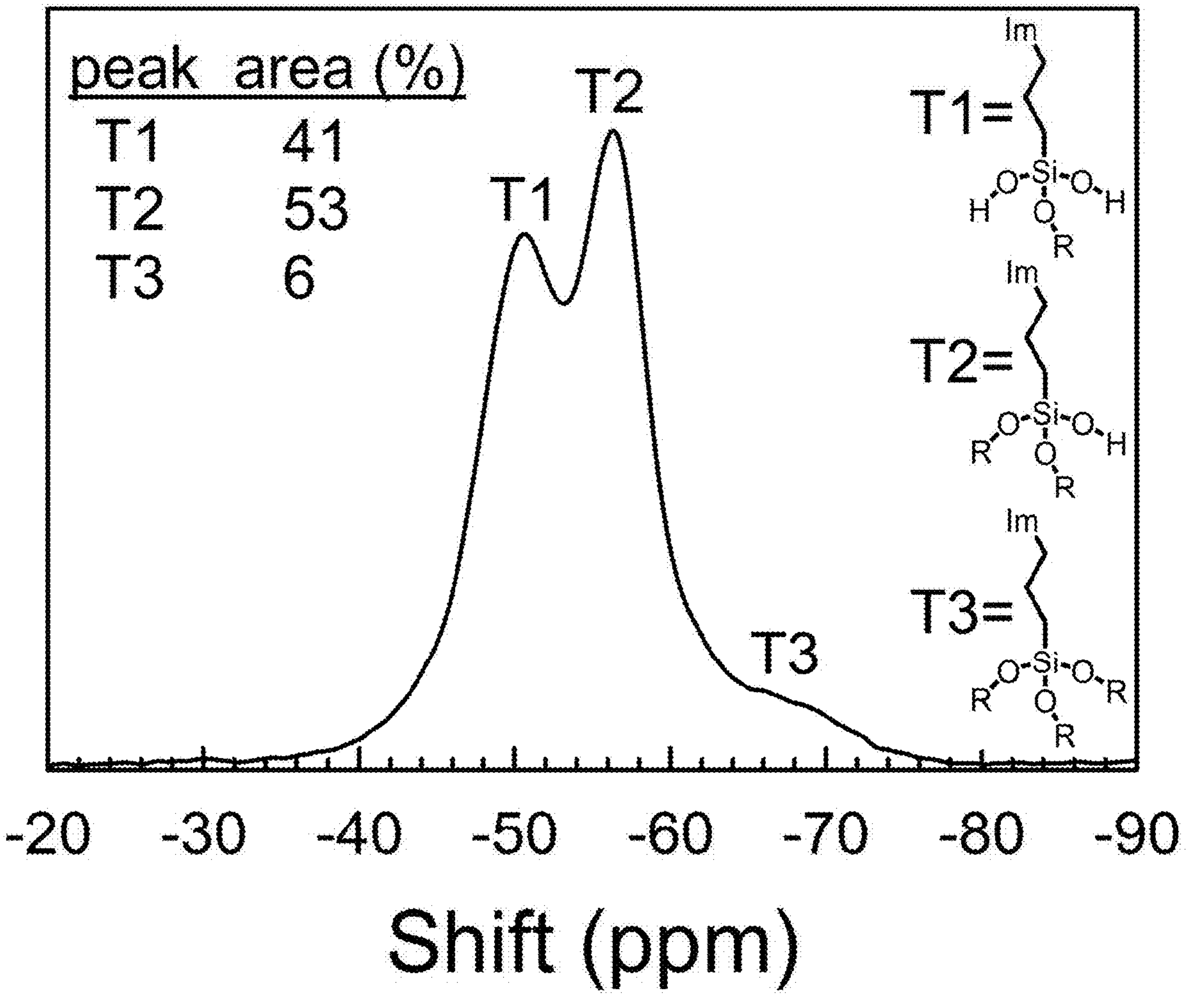
FIG. 3 shows the solid-state Si NMR spectrum for [mpim]Cl PINC. Structure representation for each condensation degree is also provided, wherein "Im" represents the imidazolium group and "R" represents either Mg or Si atoms. The area percentage (%) for each peak is based on the deconvoluted data, which inherently possesses a maximum error of 5%.

The Si NMR spectrum for [mpim]Cl PINC possesses T1, T2, and T3 peaks at −50.7, −56.5, and −66.5 ppm, respectively. Interestingly, as shown in FIG. 3, the solid-state Si NMR spectrum for [mpim]Cl PINC reveals a poly condensation of 55% for the Si layer (41% T1, 53% T2, and 6% T3 by area, where T1, T2, and T3 correspond to the singly-, doubly-, and triply-condensed Si atoms, respectively), likening the PINC backbone to that of aminoclay rather than fully-condensed talc (i.e., aminoclay is known to possess a small T3 peak). Although the low degree of polymerization makes the surface-bound IL estimation challenging, the bottom-up approach described herein intrinsically leads to the complete functionalization of the clay surface. Beneficially, the IL loading of 3.8 mmol $g^{-1}$ achieved by the invention is over double that of other existing materials and is the closest of any SILP phase to the previously mentioned IL density of neat, unsupported [mpim]Cl IL (6.2 mmol $g^{-1}$).

Example 2b. XRPD

Figure 1C:
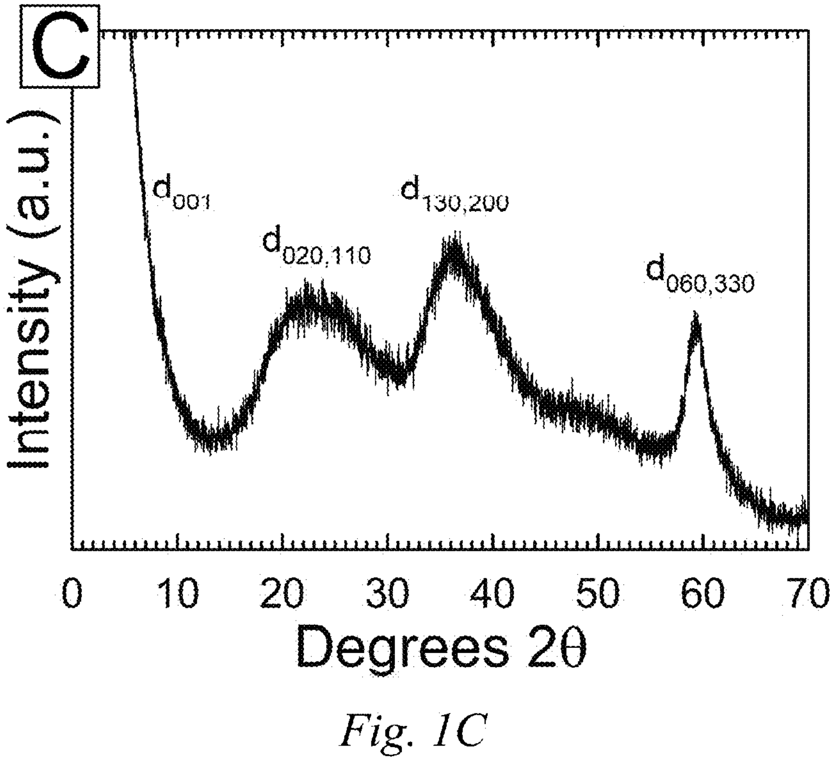
Figure 8:
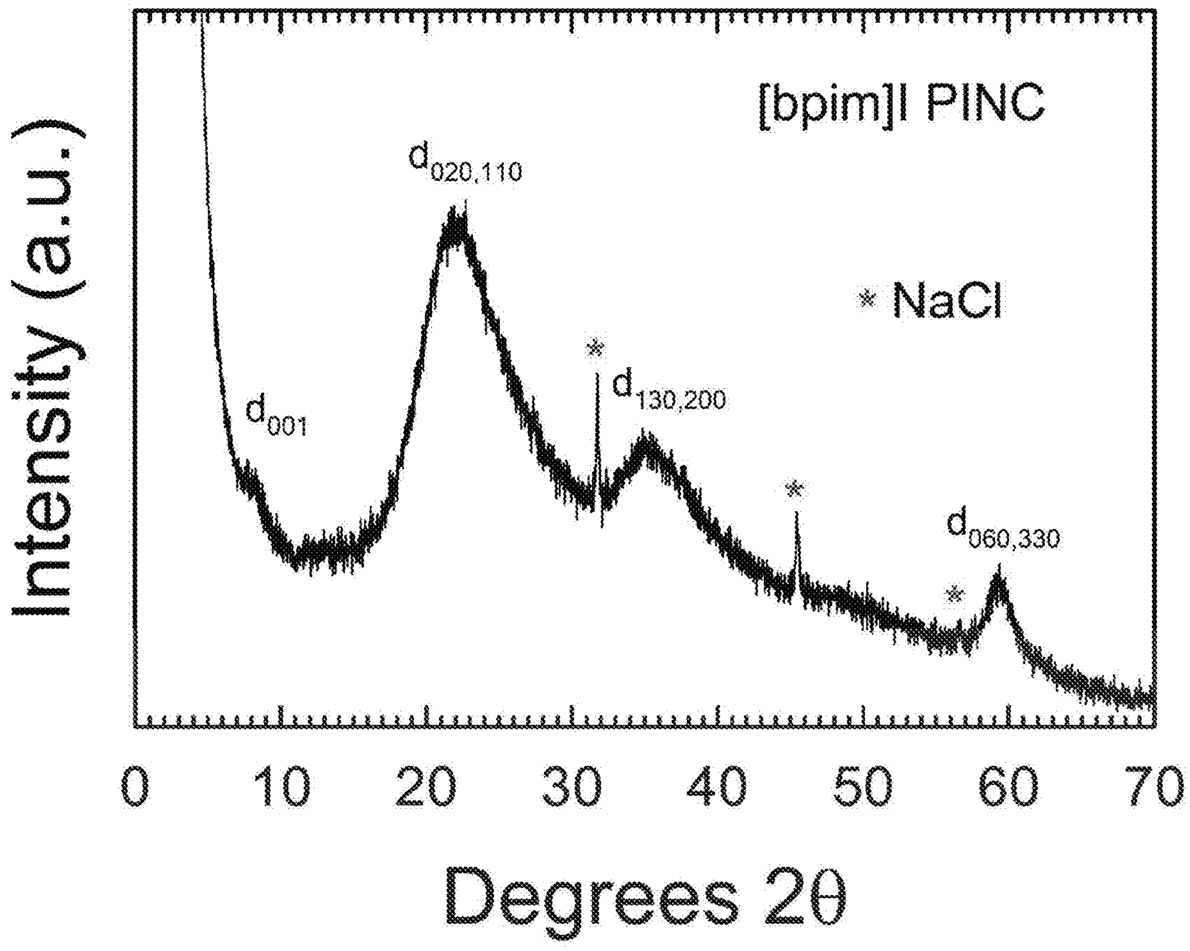
FIG. 8 depicts the XRPD diffractogram for the butylimidazolium iodide PINC. Sharp peaks are present at 32°, 45°, and 57° 28, corresponding to the (200), (220), and (222) reflections in NaCl, respectively. All other reflections are indicative of a 2:1 phyllosilicate clay, with peak broadening attributed to the large organic moiety [(1-butyl-(3-propyl) imidazolium] present on the lamella surface.
Figure 10:
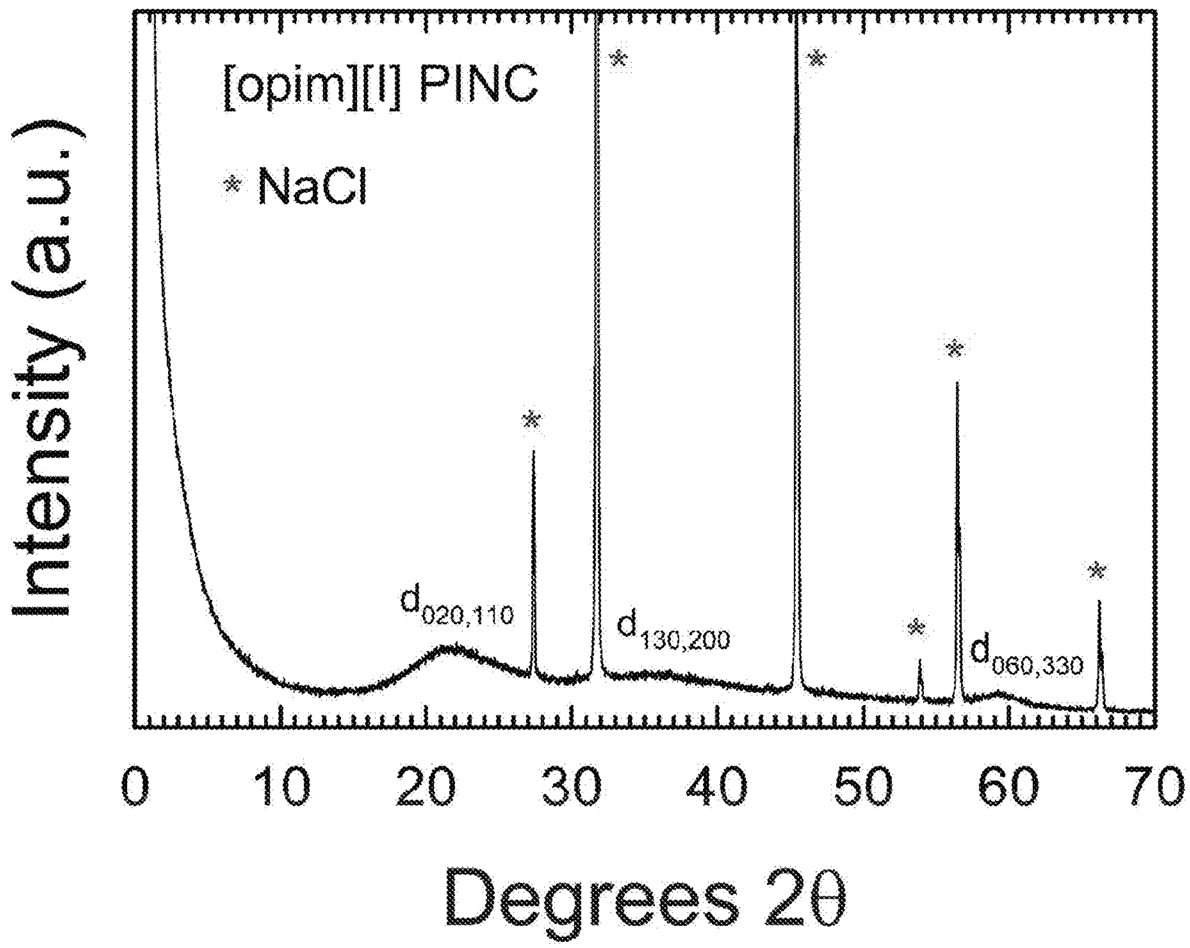
FIG. 10 shows the XRPD diffractogram for the octylimidazolium iodide PINC. Sharp peaks are present at 27°, 32°, 45°, 54°, 57°, and 66° 28, corresponding to the (111), (200), (220), (311), (222), and (400) reflections in NaCl, respectively. All other reflections are indicative of a 2:1 phyllosilicate clay, with peak broadening attributed to the large organic moiety [(1-octyl-(3-propyl) imidazolium] present on the lamella surface. It is possible that the absence of the (001) reflection in the PINC, typically found near 8° 2 8, is indicative of a large interlayer spacing in the lamellar structure resulting from steric hinderances caused by the large octyl chain.

X-ray powder diffraction (XRPD) was performed using a Scintag X2 diffractometer with a monochromatic Cu kα (λ=1.5406 Å) source operated at 45 kV and 40 mA with a 2θ angle pattern. Scanning was done in the region of 3°-70° The results are shown in FIG. 1C, FIG. 8, and FIG. 10. Overall, the XRPD diffractograms for the iodide-based PINCs exhibit broader analogs of the talc (020), (110), (130), (200), (060), and (330) reflections (JCPDS card 13-0558), a finding which correlates well with that of Burkett et al. for their organofunctionalized nanoclays. Notably, the (001) reflection, which is representative of the interlamellar spacing between nanoclays, is difficult to discern. Without being bound by theory, it is thought that this observation can be attributed to exfoliation or steric expansion of the interlayer spacing beyond the working range of the X-ray diffractometer used.

More particularly, is known that during the formation of 2:1 phyllosilicate clays (such as talc), coordination of silanes around the octahedral Mg complex is limited by the hydrophobicity of the organosilane moieties, resulting in a lamellar structure, stacking of individual clay platelets, and characteristic reflections when analyzed using X-ray powder diffraction (XRPD). Therefore, analysis of the layered structure within the solid [mpim]I PINC was performed (FIG. 1C), exhibiting reflections that are consistent with the parent Mg silicate (talc; JCPDS card 13-0558), albeit broader, with reflections at 3.93, 2.47, and 1.56 Å corresponding to the clay (020)(110), (130)(200), and (060)(330) reflections, respectively.

These peak broadenings are attributed to interlayer disorder caused by the organic moieties present on the PINC surface, a feature which is consistent with the findings of Burkett et al. Furthermore, the $d_{001}$ reflection, which is indicative of interlayer spacing, is not present when measured with a starting angle of 3° 2θ (29.43 Å), indicating that the interlayer spacing has been increased by steric hindrance and, likely, repulsive surface charges as compared to the spacing and similar reflection in a smaller organic moiety, such as the propyl amine found on aminoclay.

Figure 6:
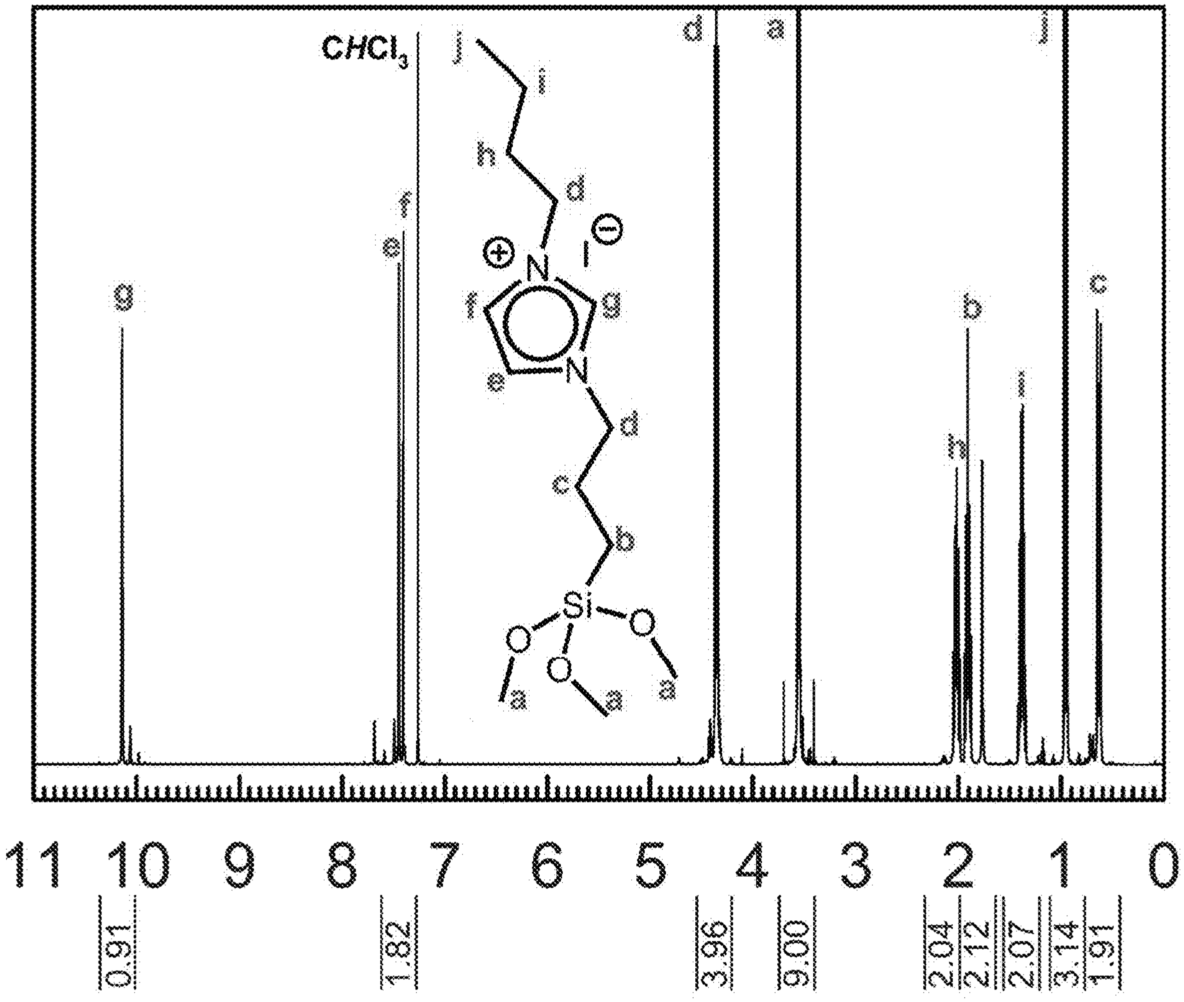
FIG. 6 shows the H-NMR spectrum of butylimidazolium iodide silane IL. Peak assignments show the presence of residual solvent (chloroform) and possibly water (at 1.8 ppm). The following shifts are identified (500 MHz; $CDCl_3$): 10.18 (1H, s, N—CH—N), 7.45 and 7.40 (1H each, s, CH2-N—CH—CH), 4.35 (4H, t, CH2-N—CH—N—CH2), 3.56 (9H, s, CH3-O—Si), 2.03 (2H, m, CH3-CH2-CH2), 1.91 (2H, m, Si—CH2), 1.39 (2H, m, CH3-CH2), 0.96 (3H, t, CH3), 0.64 (2H, t, Si—CH2-CH2).
Figure 7:
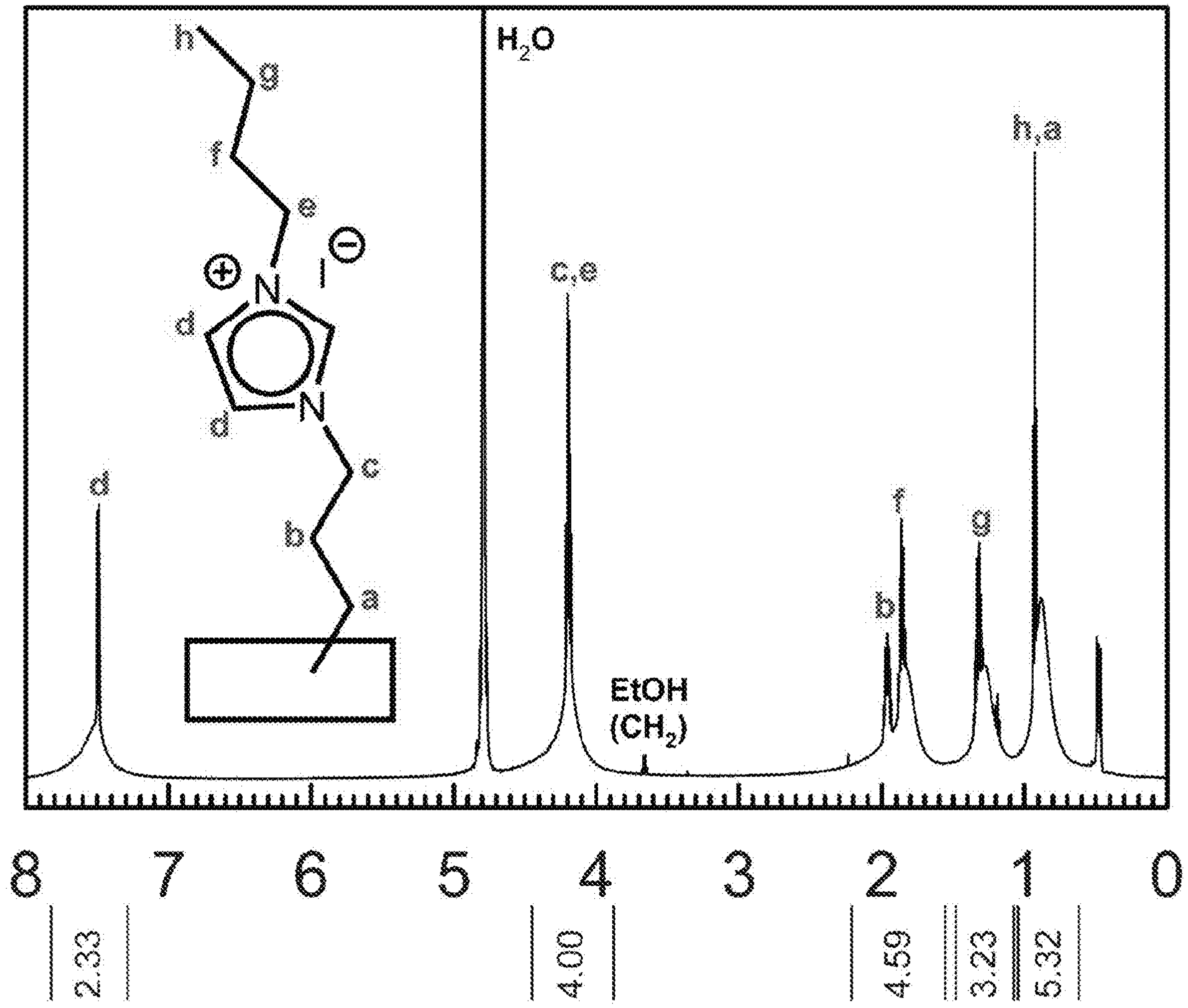
FIG. 7 shows the H-NMR spectrum of the butylimidazolium iodide PINC. The interlocking of the longer alkyl chain branching from the imidazolium ring dissuades delamination of the PINC in water, resulting in broader peaks than those observed in the methylimidazolium iodide PINC. This broadening also reduces peak resolution, producing a significant hurdle for integration. Peak assignments show the presence of residual solvent (ethanol). The following shifts are identified (600 MHz; D2O): 7.49 (2H, s, CH2-N—CH—CH), 4.19 (4H, m, CH2-N—CH—N—CH2), 1.96 (2H, m, Si—CH2-CH2), 1.87 (2H, m, CH3-CH2-CH2), 1.33 (3H, m, CH3-CH2), 0.94 (3H, s, CH3), 0.93 (2H, s, clay-CH2). The proton located at the N—CH—N location experiences rapid exchange with D2O, resulting in its absence from the spectrum.

These results lend credence to the formation of a lamellar 2:1 phyllosilicate clay with a sterically hindered surface functionality. Comparatively, the butylimidazolium PINC exhibits all of the above reflections with the addition of a (001) reflection at 3.76° 2θ (23.48 Å) and two sharp peaks (and an additional small peak) attributed to NaCl at 31.76° and 45.50° 2θ (and ~56.5° 2θ). (See FIG. 6, FIG. 7).

Example 2c. FTIR

Figure 1D:
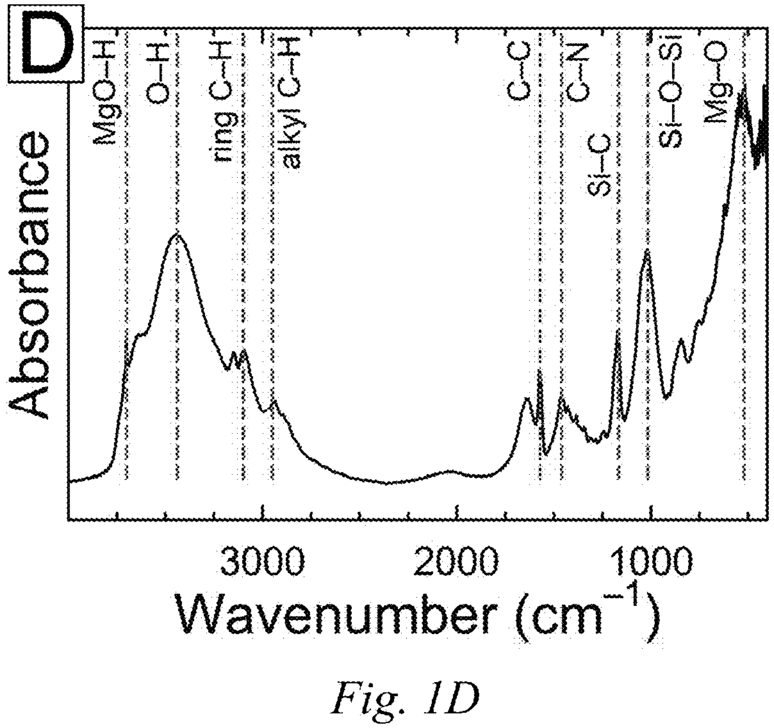
FIG. 1D shows the TIR spectrum of [mpim]I PINC.
Figure 11:
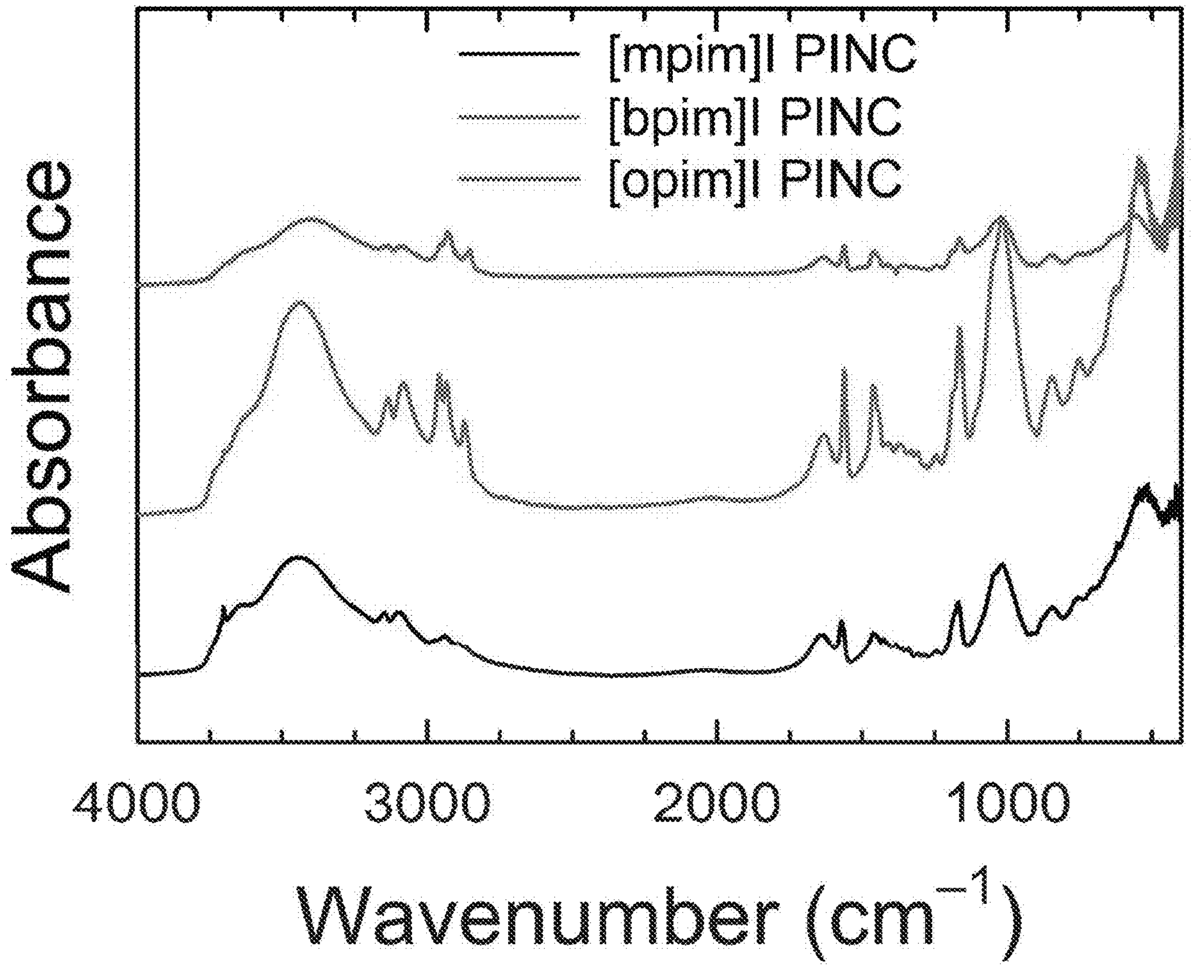
FIG. 11 depicts the Transmission FTIR spectra of the [m-, [b, and [opim]I PINCs. Magneso-silicate peaks are observed at ~520 $cm^{-1}$ for Mg—O, 1015-1020 $cm^{-1}$ for Si—O—Si, 1165-1170 $cm^{-3}$ for Si—C, 3430-3450 $cm^{-1}$ for O—H, and 3700 $cm^{-1}$ for MgO—H. Organic moieties display characteristic peaks at 1380-1480 $cm^{-1}$ for C—N, 1560-1575 $cm^{-1}$ for C—C, 2930-2960 $cm^{-1}$ for alkyl C—H, and 3000-3150 $cm^{-1}$ for ring C—H.

Fourier transform infrared (FTIR) spectroscopy was performed using a Nicolet Nexus 670 FTIR with potassium bromide (KBr) pellets, averaging 32 scans with a resolution of 2 $cm^{-1}$. The results are shown in FIG. 1D and FIG. 11. Overall, the FTIR spectra reveal absorbance peaks corresponding to those of the magneso-silicate backbone and the organic moieties associated with the surface functional groups.

More particularly, surface and framework vibrational modes within the alkylimidazolium PINC were analyzed using transmission Fourier transform infrared (FTIR) spectroscopy and were found to be consistent with those of a typical magneso-silicate structure, with absorption peaks observed at ~515 $cm^{-1}$ for Mg—O, 1020 $cm^{-1}$) for Si—O—Si, 1170 $cm^{-1}$ for Si—C, 3450 $cm^{-1}$ for O—H, and 3700 $cm^{-1}$ for MgO—H. Furthermore, the organic moieties within IL portion of the alkylimidazolium halide PINCs displayed characteristic peaks resembling those of similar ILs at 1380-1480 $cm^{-1}$ for C—N, 1572 $cm^{-1}$ for C—C, 2937 $cm^{-1}$ for alkyl C—H, and 3000-3150 $cm^{-1}$ for ring C—H. Further, the anion exchange precipitate proposed to be [mpim][Tf2N] PINC showed peaks belonging to both the cation moiety and the $Tf2N^{-}$ anion, indicating that metathesis did indeed occur.

Example 2d. TGA

Figure 1E:
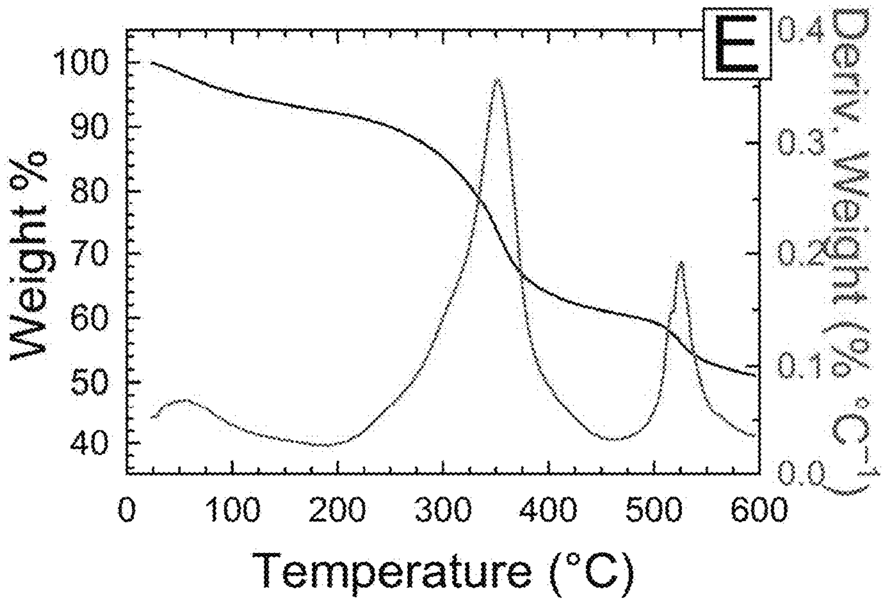
Figure 1F:
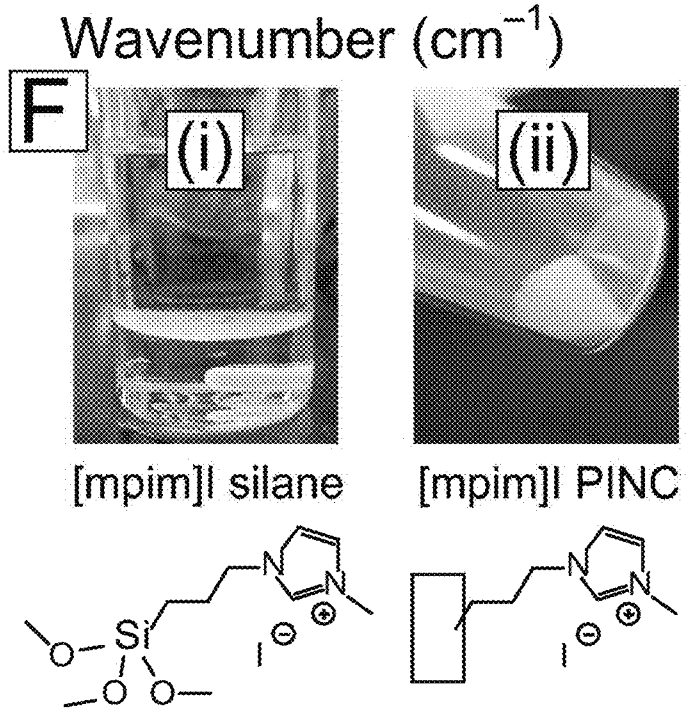
FIG. 1F shows photographs of i) [mpim]I silane IL below ethyl acetate and ii) [mpim]I PINC.
Figure 12A:
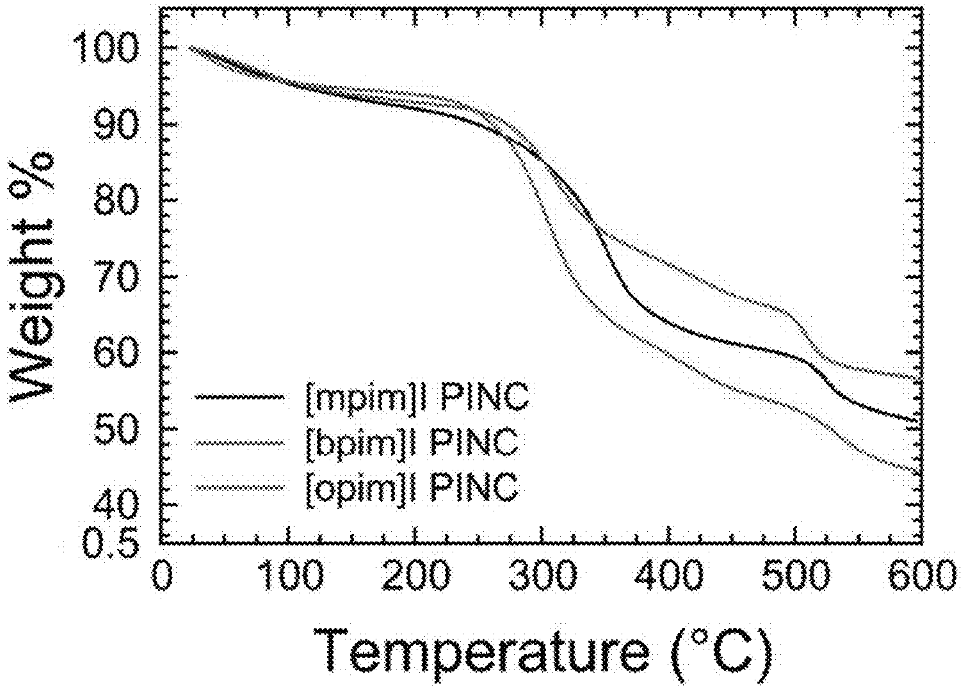
FIG. 12 shows the TGA thermogram (top) and $1^{st}$ derivative plot (bottom) for the methylimidazolium and butylimidazolium iodide PINCs. For [mpim]I PINC, the following mass losses are noted: 9% loss before 200° C. attributed to gradual release and evaporation of water, EtOH, and MeOH; 31% mass loss from 250 to 450° C. attributed to the degradation of the methylimidazolium functionality; 8% mass loss from 475 to 600° C. attributed to the degradation of the propyl chain. For the [bpim]] PINC, the following mass losses are noted: 6% loss before 200° C. attributed to gradual release and evaporation of water, EtOH, and MeOH; 30% mass loss from 225 to 375° C. attributed to the degradation of the butylimidazolium functionality; 20% mass loss from 375 to 600° C. attributed to the degradation of the propyl chain. For [opim]I PINC, the following mass losses are noted: 7% loss before 200° C. attributed to gradual release and evaporation of water, EtOH, and MeOH; 21% mass loss from 250 to 450° C. attributed to the degradation of the octylimidazolium functionality; 10% mass loss from 475 to 600° C. attributed to the degradation of the propyl chain. Note that the disproportionate mass losses observed for the organic components in [opim]I PINC are, without being bound by theory, attributed to residual NaCl (presence evident in XRPD).
Figure 12B:
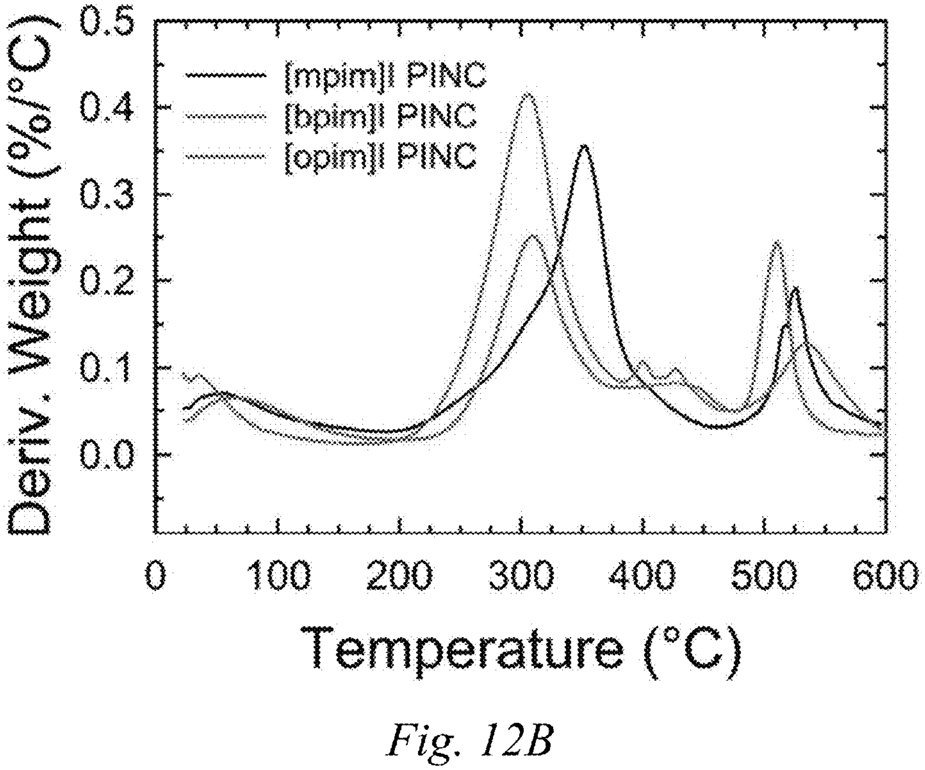

Thermogravimetric analysis (TGA) was performed using a TA Instruments Q50 TGA, with a Pt sample pan under 40 mL mini nitrogen purge. TGA results are shown in FIG. 1E FIG. 10, and FIG. 12, while Char formation for thermolysis of the [mpim]Cl PINC is shown in FIG. 13.

Overall, the TGA thermograms reveal similar thermal stabilities for each iodide-based PINC, with the evaporation of trapped solvent concluding around 150° C. and thermal degradation of the surface organic groups beginning at around 250-300° C. These results allude to the possibility of using these PINCs for applications at elevated temperatures near 200° C. Although unfunctionalized aprotic ionic liquids, (e.g., 1-butyl-3-methylimidazolium bis(trifluoromethylsulfonyl)imide) typically produce negligible char residue upon heating in an inert atmosphere, similar thermolysis conducted under confinement within an oxide framework (e.g., silica) afforded significant carbonization yields. Char formation for thermolysis of the [mpim]Cl PINC is evident from the change in appearance from white to black after treatment at 800° C. for 1 hour (FIG. 13), alluding to the possibility for these PINCs to act as matrices for the entrapment of char.

More particularly, hermogravimetric analysis (TGA) was performed (10° C. $min^{-1}$ from RT to 600° C.; 40 mL $min^{-1}$ N2 gas flow) to determine the degradation temperatures of the organic moieties in our PINC composites. For [mpim]I PINC (FIG. 1E), an approximate 9% mass loss while heating to 200° C. is attributed to gradual release and evaporation of water, EtOH, and MeOH trapped within the interlayer structure of the foliated PINCs.

Figure 9:
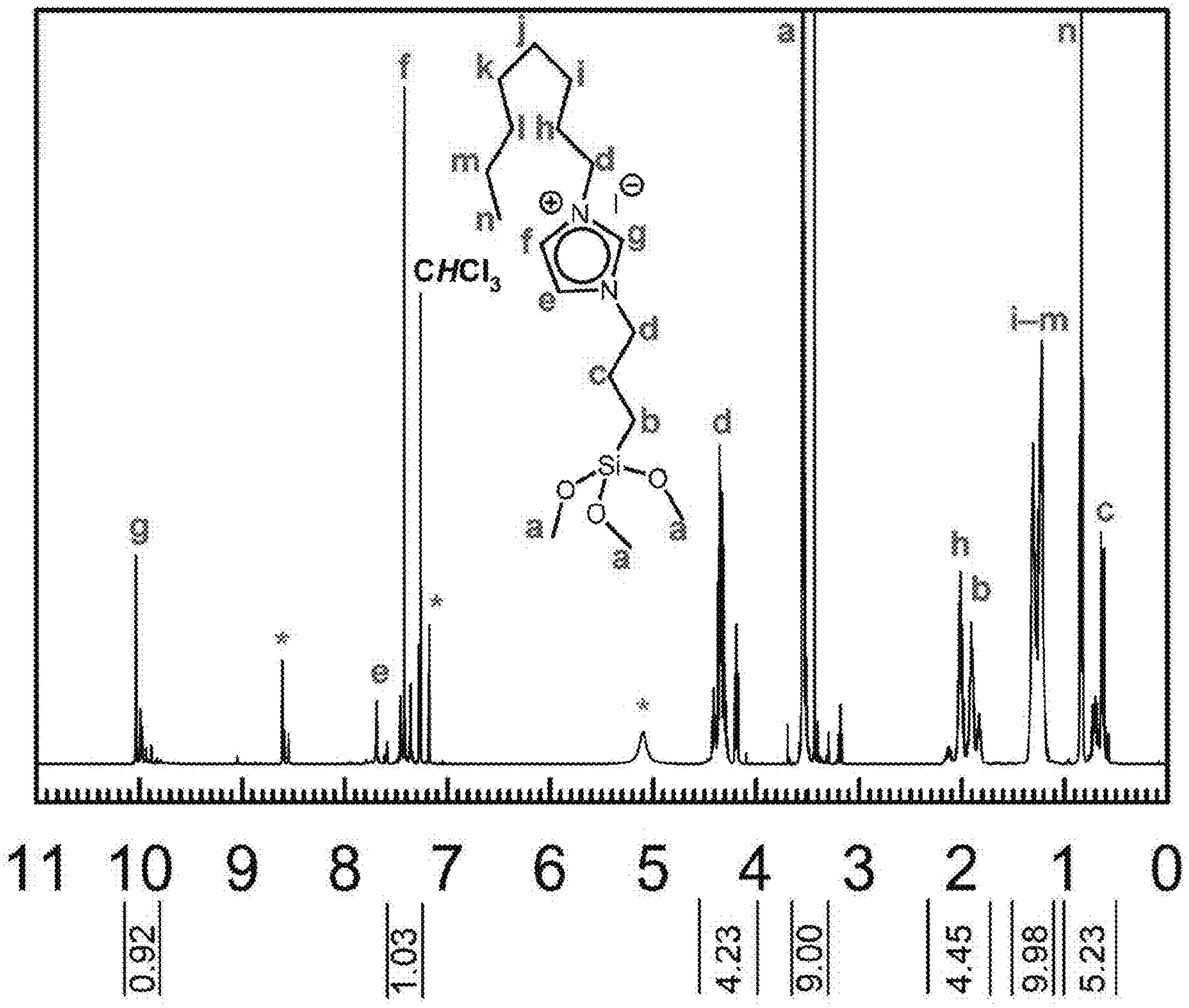
FIG. 9 shows the H-NMR spectrum of octylimidazolium iodide silane IL. Peak assignments show the presence of residual solvent (chloroform) and possibly water (at 1.8 ppm). The following shifts are identified (500 MHz; $CDCl_3$): 10.03 (1H, s, N—CH—N), 7.69 and 7.42 (1H each, s, CH2-N—CH—CH), 4.34 (4H, m, CH2-N—CH—N—CH2), 3.54 (9H, s, CH3-O—Si), 2.01 (2H, m, Si— . . . —N—CH2-CH2), 1.90 (2H, m, Si—CH2), 1.26 (10H, m, CH3-CH2-CH2-CH2-CH2-CH2), 0.84 (3H, t, CH3), 0.63 (2H, t, Si—CH2-CH2). Peaks marked with an asterisk (*) are unidentified but may belong to a degradant of octyimidazole.

Degradation of the methylimidazolium functionality occurs between 250° C. and 450° C. and accounts for approximately 31% of the overall sample mass, followed by degradation of the propyl chain (~8% mass loss) from 475° C. to 600° C. The remaining material, accounting for ~52% of the original mass, consists of the Mg silicate backbone and residual char. The [bpim]I PINC exhibited similar thermogravimetric degradation, with an approximate 6% mass loss before 200° C. attributed to gradual release and evaporation of water, EtOH, and MeOH, 30% mass loss from 225 to 375° C. attributed to the degradation of the butylimidazolium functionality, and 20% mass loss from 375 to 600° C. attributed to the degradation of the propyl chain. For [opim]I PINC, 7% mass loss before 200° C. is attributed to gradual release and evaporation of water, EtOH, and MeOH while 21% mass loss from 250 to 450° C. is attributed to degradation of the octylimidazolium functionality and 10% mass loss from 475 to 600° C. is attributed to the degradation of the propyl chain. (See FIG. 9). Note that the disproportionate mass losses observed for the organic components in [opim]I PINC are tentatively attributed to residual NaCl (presence evident in XRPD, FIG. 10).

Example 2e. TEM and SEM Imaging

Transmission electron microscopy (TEM) imaging was conducted on carbon-coated copper grids (Ted Pella, Inc. 01814-F, carbon type-B, 400 mesh copper grid) using an FEI Tecnai F20 microscope operating at a 200 keV accelerating electron voltage. 300-400 individual AuNPs were analyzed for the generation of the particle size histograms. Scanning electron microscopy (SEM) imaging was conducted using an FEI Helios NanoLab 600 FIB/FESEM. Zeta potential measurements were performed in aqueous media using a Malvern Zetasizer Nano ZS in folded capillary zeta cells. An assumed refractive index of 1.6 (talc) was used for all calculations.

Beneficially, the instant methods replace the expensive and time-consuming traditional week-long ambient synthesis using the iodine-based precursor silane (3-7 U.S.$ $mL^{-1}$) with a cheaper, three-day, 80° C. synthesis using 3-chloropropyltrimethoxysilane (0.20-0.40 U.S.$ $mL^{-1}$).

Figure 2A:
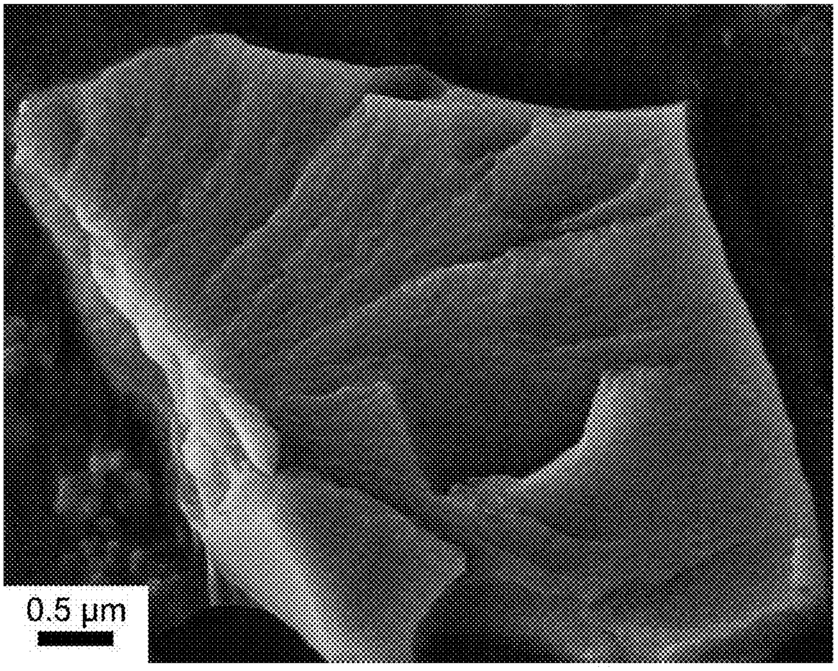
FIG. 2A shows the SEM image and FIG. 2B shows the TEM image. The stacked PINCs in the SEM image (FIG. 2A) allude to a layered structure, and the TEM image (FIG. 2B) presents an average platelet size of 59.2±26.8 nm (the smallest and largest measured platelets are 12 and 176 nm, respectively).
Figure 2B:
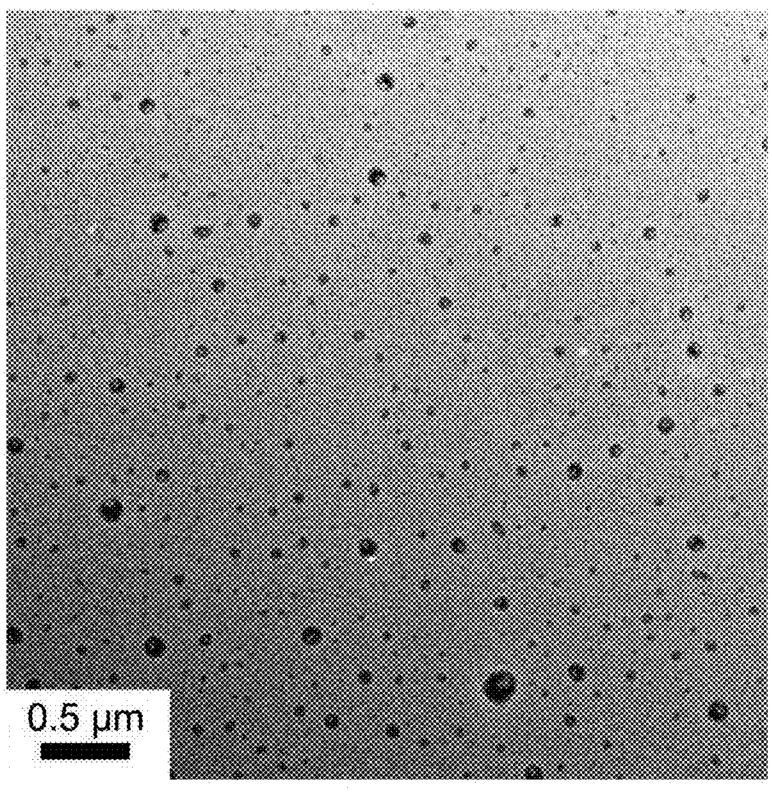

Beneficially, this alteration to the method produces [mpim]Cl silane IL and PINC, which notably shows similar solvation properties and characterization results to those of [mpim]I PINC (FIG. 14) while reducing the reagent cost of the resulting composite by almost an order of magnitude. This [mpim]Cl PINC was used for all following experiments and was further characterized using scanning electron microscopy (SEM) and transmission electron microscopy (TEM) to discern average platelet size and stacking (FIG. 2).

Example 2f. Zeta Potential Measurements

As a final characterization of the charged IL surface, zeta potential measurements of [mpim]Cl PINC colloid reveals a potential difference of +44 mV and +30 mV for [mpim]Cl and [bpim]1 PINCs, respectively, which are comparable with the value of +35 mV for aminoclay in an acidic medium.

Example 3. Anion Exchange on PINCs

Figure 4:
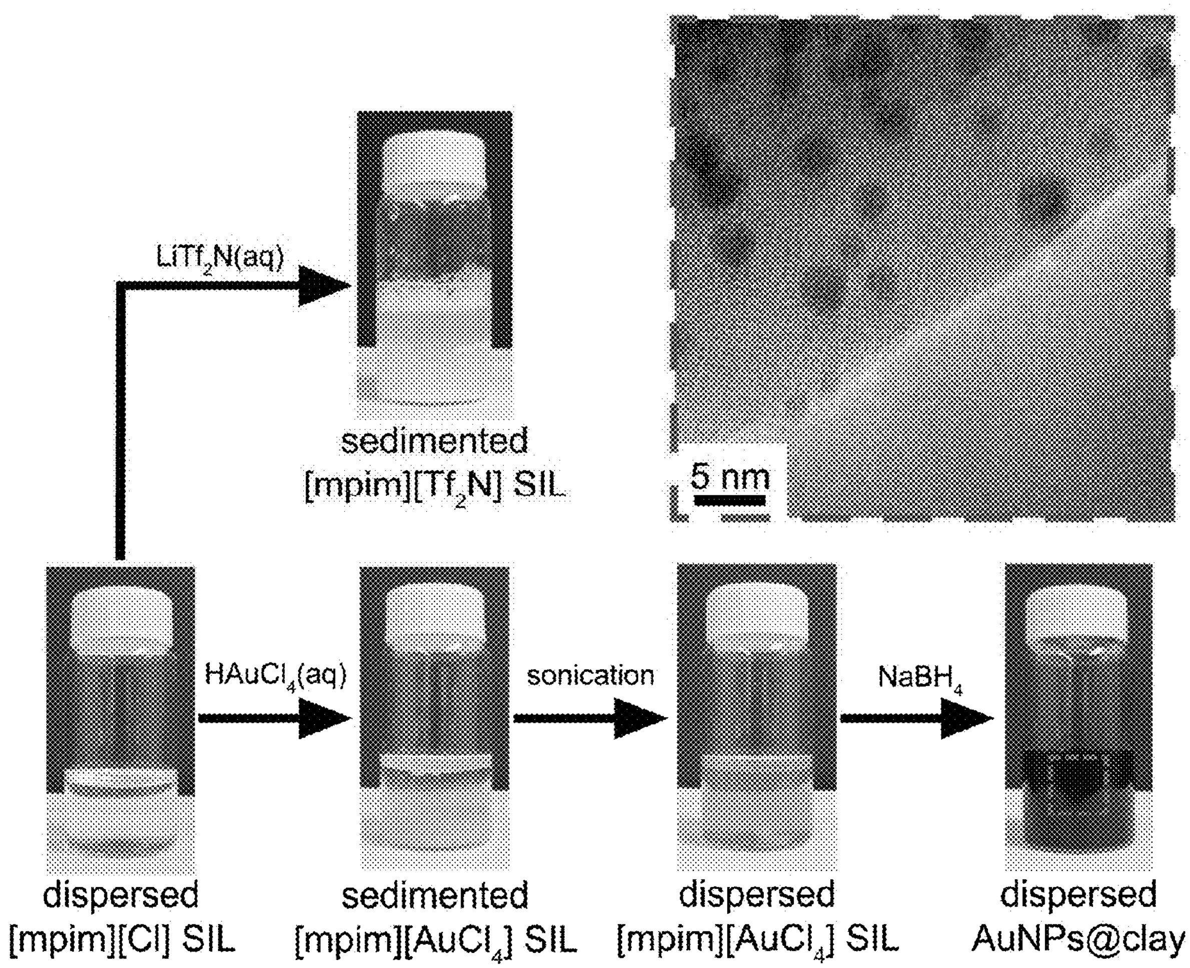
FIG. 4 shows the aqueous anion exchange of $Cl^-$ for $Tf_2N^-$ (see the top left of the figure) to form an insoluble SILP precipitate [mpim][$Tf_2N$] PINC, and $AuCl_4^-$ (see the bottom of the figure) to form a sediment of [mpim][$AuCl_4$] PINC, followed by sonication and reduction via sodium borohydride ($NaBH_4$) to create sub-5 nm AuNPs supported on the PINC substrate (see top right of the figure). The image in the figure is from the 1.0 mM PINC@AuNPs solution and consists of 2.5±0.7 nm AuNPs.

ILs are labeled as designer solvents due to the exchangeability of cations or anions toward a specific application. Without being bound by theory, it is thought that the cation can be exchanged during the synthesis of the silane. Anion exchange of halides present on the PINC was demonstrated through metathesis in an aqueous solution. The results are shown in FIG. 4, and FIG. 14.

The addition of excess aqueous $LiTf_2N$ to an aqueous dispersion of [mpim]Cl PINC precipitated the white solid [mpim][Tf N], characterized using XRPD, FTIR spectroscopy, and TGA. (See FIG. 14). The addition of aqueous $HAuCl_4$ produced a yellow precipitate of [mpim][$AuCl_4$] PINC, which can be re-dispersed through sonication. (See FIG. 4). This simple exchange alludes to many exciting applications in catalysis and separations.

Example 4. Synthesis of PINC@AuNPs Colloid

In a typical preparation, 100 mg of [mpim]Cl PINC was dissolved in 8.0 mL of $H_2O$. A 1.0 mL aliquot of aqueous 10 mM $HAuCl_4$ was added to this solution while stirring vigorously to form a yellow solution. After 1 min, 1.0 mL of aqueous 1.0 M $NaBH_4$ was added rapidly to the stirring solution to form an orange colloid of PINC@AuNPs. This colloid was stored at room temperature.

Example 5. Reduction of Aqueously Dispersed [mpim][$AuCl_4$] Species

In a typical reaction, 2.10 mL of 0.20 mM aqueous 4-NP (0.42 μmol) and 0.90 mL of freshly prepared 100 mM aqueous $NaBH_4$ (90 μmol) were combined in a 4-mL PMMA cuvette (1-cm path length) to yield a yellow solution of 4-nitrophenolate ($\lambda_{max}$=400 nm). Catalysis was initiated by adding 168 μL of 0.025 mM PINC@AuNPs solution (0.0042 μmol Au; diluted from a 1.0 mM PINC@AuNPs stock) to the system (1.0 mol % Au relative to 4-NP), followed by capping and rapid inversion to initiate the reaction. Solution absorbance at 400 nm was monitored using UV-vis spectroscopy, with a sampling rate of 10 data points per second. This reaction was performed in triplicate, and further trials were per-formed using 84-μL, 33.6-μL, and 16.8-μL aliquots of 0.025 mM PINC@AuNPs solution (0.0021, 0.00084, and 0.00042 pmol of Au, respectively) to simulate 0.5, 0.2, and 0.1 mol % Au to 4-NP, respectively. The results are provided in FIG. 15, which shows an extinction peak at approximately 500 nm. These data allude to the formulation of sub-5 nm gold nanoparticles (AuNPs) supported on the PINC surface (PINC@AuNPs) and are confirmed by TEM analysis. (See FIG. 4).

Significantly, the AuNPs appear to be sufficiently stabilized by surface ligands and the conjugated π electrons from the PINC imidazolium groups, such that sintering is prevented even after storage in a lab drawer for two months. As such, these supported AuNPs exhibit good long-term aqueous stability.

A control experiment was performed using the corresponding concentration of gold-free [mpim]Cl PINC. A solution of [mpim]Cl IL was prepared and used at a similar molar quantity in the place of PINC to make AuNPs. The resulting solution, prepared identically to that for the PINC, turned blue upon addition of $NaBH_4$ and, within 1 minute, black as the $Au^0$ aggregates that precipitated from solution. This control indicates that the structured PINC is required for the IL to act as an effective stabilizing ligand, and that bulk IL is insufficient to prepare similar AuNPs.

Example 6. Reaction Kinetics of PINC@AuNP Catalysis

Figure 5A:
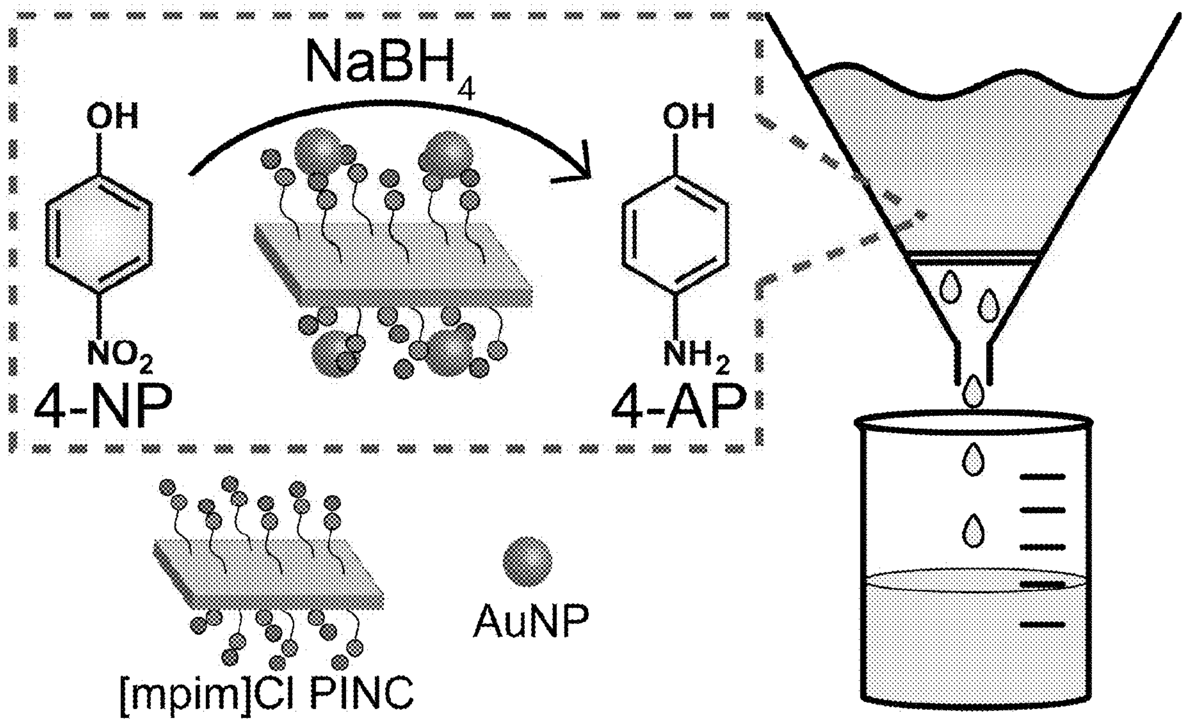
FIG. 5 shows a schematic of the catalyzed reduction of 4-NP to 4-AP using PINC@AuNPs and NaBH4 (see top of the figure) and the decrease in absorbance at 400 nm over time, corresponding to loss of the 4-nitrophenolate anion intermediate (see bottom left of the figure). The Figure also shows a plot of In ($A_0/A_t$) vs. time, extracting the slope. ($k_{app}$). Notably, the 0.1 and 0.2 mol % Au reactions appear to be bilinear in nature, and as a result, their respective $k_{app}$ values were calculated as an average of the two slopes. The turnover frequency (TOF) of the 0.1 mol % Au reaction is calculated to be 5,000 $h^{-1}$, which is faster than any other Au catalyst yet reported in the literature. All PINC@AuNPs used in these reductions were aged for 1 day before use.
Figure 5B:
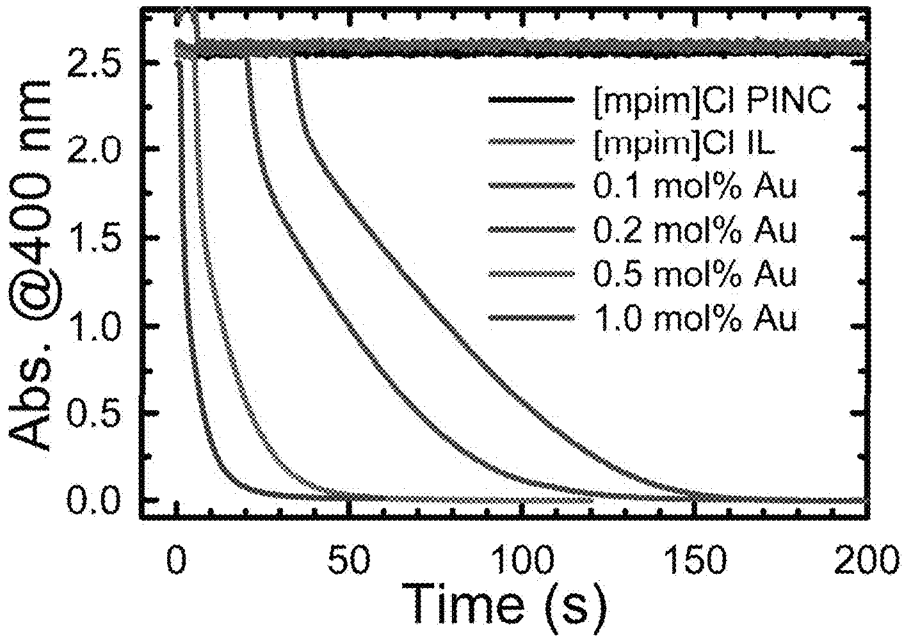
Figure 5C:
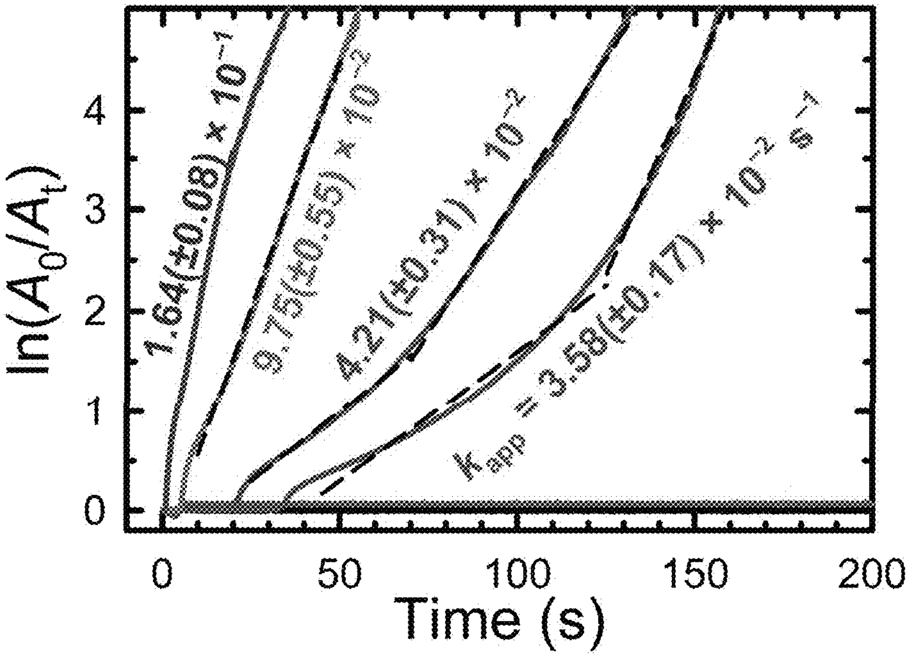

Due to the dual role of $NaBH_4$ as a reducing/capping agent, it is presumed that the AuNPs should possess a similar surface chemistry to those produced by Deraedt et al., albeit supported on a PINC surface; accordingly, these AuNPs should perform quite well as heterogeneous catalysts for the model reduction of 4-nitrophenol (4-NP) to 4-aminophenol (4-AP) using $NaBH_4$. The results are shown in FIG. 5.

The reaction kinetics were analyzed via UV-vis spectroscopy by monitoring the decrease in solution absorbance at 400 nm, corresponding to the reduction of the 4-nitrophenolate ion. The reduction was performed in triplicate using PINC@AuNPs solutions aged for 1 day using 1.0, 0.5, 0.2, and 0.1 mol % Au with respect to 4-NP.

The initial results were astounding: the addition of catalyst, equal to 1.0 mol % Au with respect to 4-NP, to the yellow 4-NP/$NaBH_4$ solution, resulted in a colorless solution within seconds. Without being bound by theory, it is thought that π-π stacking between the imidazolium and 4-NP entities ensures proximity between the reagents and the AuNP surface.

The linear correlation of ln(A0/At), where A0 is the initial absorbance and At is the time-dependent absorbance, vs. time was plotted (pseudo-first-order) for each catalyzed reaction and the corresponding slopes, representing apparent rates ($k_{app}$), were calculated. Further, turnover frequencies (TOFs) were calculated, where the reaction time is calculated from the end of the induction time to the time when the natural log of the absorbance ratio is equal to 3 (~5% completion).

More particularly, the linear correlation of $\ln(A_0/A_t)$ vs. time was used to calculate the apparent rate constants for ($k_{app}$) for 4-NP reduction, while the moles of 4-NP ($n_{4\text{-}np}$) divided by the product of moles of Au ($n_{Au}$) and reaction time ($t_{rxn}$) were used to calculate the turnover frequency (TOF), corrected for the reaction completion, as shown in Equation Si:

$$TOF = \frac{n_{4-NP}}{(n_m)(t_{rxn})} \times \frac{\text{completion }\%}{100}$$

Reaction time is defined here as the time from reaction initiation to the time when the value for $\ln(A_0/A_t)$ equals 3, and that the reaction completion percentage at $\ln(A_0/A_t)$ equals 3 is 95%.

A control experiment using [mpim]Cl PINC showed no change in absorbance at 400 nm over a 10 min monitoring period, ruling out the contribution of Au-free PINC to the catalytic activity.

Due to the slight dilution and the reaction progress during mixing, these spectra began at absorbances below the initial absorbance, which lends some error to the catalytic rate assessment. Three such reduction cycles proceeded without a noticeable decrease in catalytic rate, with the fourth and fifth cycles possessing significantly retarded rates. Therefore, 90 μL of 1.0 M $NaBH_4$ was added in addition to the 4-NP for the sixth and seventh cycles, resulting in a return of the catalyzed rate to almost the initial values. This implies that the PINC@AuNPs can be recycled at least seven times for this reaction. Results of the reaction kinetics calculations are shown in Table 1 and Table 2.

TABLE 1

Comparison of the Apparent Catalytic Rate ($k_{app}$), Reaction Time ($t_{rxn}$) and Turnover Frequency (TOF) for Each Tested mol % Au when Performing 4-NP Reduction Using PINC@AuNPs Aged for 1 Day or 2 Months (60 d) as the Catalyst

| mol % Au | $k_{app}$ ($s^{-1}$) | $t_{rxn}$ (h)[a] | TOF ($h^{-1}$)[b] |
|---|---|---|---|
| 1.0 (1 d) | 1.64(±0.08) × $10^{-1}$ | 9.61 × $10^{-3}$ | 21,000 ± 2,000 |
| 1.0 (60 d) | 1.54(±0.04) × $10^{-1}$ | 1.23 × $10^{-2}$ | 18,000 ± 1,000 |
| 0.5 (1 d) | 9.75(±0.55) × $10^{-2}$ | 1.39 × $10^{-2}$ | 20,000 ± 1,000 |
| 0.5 (60 d) | 9.88(±0.14) × $10^{-2}$ | 1.46 × $10^{-2}$ | 19,000 ± 1,000 |
| 0.2 (1 d) | 4.21(±0.31) × $10^{-2}$ | 3.11 × $10^{-2}$ | 18,000 ± 1,000 |
| 0.2 (60 d) | 4.21(±0.25) × $10^{-2}$ | 2.49 × $10^{-2}$ | 21,000 ± 2,000 |
| 0.1 (1 d) | 3.58(±0.17) × $10^{-2}$ | 3.43 × $10^{-2}$ | 25,000 ± 2,000 |
| 0.1 (60 d) | 2.95(±0.44) × $10^{-2}$ | 3.69 × $10^{-2}$ | 24,000 ± 1,000 |

[a]$t_{rxn}$ is defined here as the time required to achieve 95% substrate turnover.
[b]TOF is calculated as previously reported.[39]

TABLE 2

Comparison of 4-NP Catalysts

| catalyst | stabilizer | shape | size (nm) | metal (% mol) | $k_{app}$ ($s^{-1}$) | TOF ($h^{-1}$) | Ref. |
|---|---|---|---|---|---|---|---|
| AuNPs | boron nitride | spherical | 8.2 | 635 | 0.000833 | 0.00158 | 5 |
| AuNPs | Breynia rhamnoides | spherical | 25 | 30 | 0.00766 | 0.175 | 6 |
| AUNPs | chitosan | spherical | 20-24 | 31.7 | 0.0561 | 212 | 7 |
| AUNPs | cellulose nanofibers | spherical | 5 | 0.67 | 0.0059 | 563 | 8 |
| AUNPs | *Cylindrocladium floridanum* | spherical | 25 | 5 | 0.0267 | 641 | 9 |
| AUNPs | poly(ethylenimine) | spherical | 4-13 | 0.68 | 0.0070 | 1,200 | 10 |
| $Au_{0.7}Ag_{0.3}$NPs | $[closo\text{-}B_{10}H_{10}]^{2-}$ | spherical | 4.2 | 5 | 0.200 | 4,672 | 11 |
| AUNPs | borohydride | spherical | 3 | 0.2 | 0.009 | 9,000 | 12 |
| AUNPS | [mpim]Cl PINC | spherical | 2.5 | 0.1 | 0.0358 | 25,000 | this work |

Similar reductions were performed using 2-month-old PINC@AuNPs, with little change in the catalytic activity. Further, a 10-day-old stock and a 2-month-old stock were separately used to test the recyclability of these PINC@AuNPs as catalysts. As above, 2.10 mL of 0.20 mM aqueous 4-NP and 0.90 mL of freshly prepared 100 mM aqueous $NaBH_4$ were mixed in a 4-mL PMMA cuvette, followed by the addition of 2.1 μL of 1.0 mM PINC@AuNPs (representing 0.5 mol % Au with respect to 4-NP). The sample was mixed via inversion and the reduction was monitored at 400 nm using UV-vis spectroscopy.

Once the absorbance reached ≥95% completion, 84 μL of 5.0 mM 4-NP was rapidly added and the solution was quickly mixed with inversion and replaced in the instrument.

As shown in Table 1, the reaction consisting of 0.1 mol % Au possessed a $k_{app}$ of $3.58\times10^2$ $s^{-1}$ and a TOF of 25,000 $h^{-1}$, the latter of which is significantly higher than that of any previously reported gold catalyst. By way of comparison, a solution of $NaBH_4$-AuNPs produced by the Astruc group showed an optimal $k_{app}$ of $9.0\times10^{-3}s^{-1}$ (TOF of 9,000 $h^{-1}$) when applying a mol % Au of 0.2% and an assumed reaction completion time corresponding to the end of the induction time until ln(A0/At)=(~86.5% completion, although they do not correct for this when calculating TO). It is worth noting that, using their TO calculation and reaction completion criteria for the instant 0.1 mol % Au reaction, the disclosed methods and materials attain a TOF value of 45,000 ho. However, the 86.5% reaction completion is insufficient for this calculation: instead, the present disclosure utilizes the TOF at 95% completion with a mathematical correction for the remaining, unreacted 4-NP. In fact, all of the TOFs reported herein greatly exceed the highest catalytic activity reported to date (e.g., a TOF of just over 12000 $h^{-1}$) for bimetallic gold-silver nanoparticles.

Example 7. Catalyst Stability

Catalyst stability was also evaluated and shown to be quite good, as the loss in catalytic activity for 2-month-old PINC@AuNPs is minimal. As an additional control, PINC@AuNPs were prepared using a final [$NaBH_4$] of 10 mM (orders of magnitude lower than the typical experimental protocol), resulting in a colloid that expresses similar spectroscopic properties and catalytic efficacy, indicating that the excess borohydride in the colloid does not impact the catalytic rate. The results of this analysis are shown in FIG. 16.

Example 8. Recyclability of PINC@AuNPs

The rise in nanoparticle synthesis and application coincides with a concomitant increase in nanowaste, making the recyclability of nanocatalysts of obvious environmental and financial importance. The recyclability of these PINCs@AuNPs was assessed by performing multiple cycles of 4-NP reduction, with each cycle introducing a fresh aliquot of 4-NP to restart the reaction. The catalyzed reduction of 4-NP was performed as above using PINC@AuNPs aged for 10 days (0.5 mol % Au to 4-NP as the reduction using this loading of catalyst exhibited linear reduction kinetics with minimal induction time), except upon reaction completion, which was assumed when the time-dependent absorbance was <5% of the initial absorbance. Then, 84 μL of 5.0 mM 4-NP was added, the solution was mixed quickly with inversion, and the spectroscopic analysis was continued. The results are shown in FIG. 17.

As shown in this Figure, the catalytic rate was essentially unchanged for the first 3 cycles, whereas the 4th and 5th cycles showed a large decrease in the catalytic rate. For the 6th and 7th cycles, 0 μL of 1.0 M $NaBH_4$ was added alongside the aliquot of 4-NP. An increase in the reaction rate was observed, indicating that the rate retardation observed during the 4th and 5th cycles was attributed to a lack of $NaBH_4$. Overall, the excellent recyclability of these PINC@AuNPs catalysts with a drop in the $k_{app}$ of 26% after 7 cycles is a testament to the use of PINCs for in situ AuNP synthesis and stabilization.

The results of this analysis were confirmed using 2-month-old PINC@AuNPs, wherein similar results were obtained. (See FIG. 17).

Example 9. Bulk Production of AuNPs

There is a substantial drive toward bulk production of AuNPs, primarily catalytically active AuNPs, with emphasis on highly-concentrated AuNP solutions to reduce the waste of solvent and reaction time. During TEM analysis of the PINC@AuNPs, it was observed that much of the PINC surfaces were devoid of AuNPs when [Au]=1.0 mM and [PINC]=10.0 mg $mL^{-1}$ in the reaction solution. Thus, solutions were prepared with higher [Au] to increase the number of AuNPs formed.

As shown in FIG. 18 and FIG. 19, AuNP formation and stabilization was obtained up to [Au]=21.9 mM and [PINC]=27.4 mg $mL^{-1}$ with a mild increase in average AuNP diameter, from 2.5(0.7) to 3.9(1.0) nm evidenced by minor red-shifting of the resulting plasmon band and larger particle sizes observed during TEM analysis. While this is not proposed to be the upper concentration limit of Au for stable formation of PINC@AuNPs@, it should be noted that the yellow [mpim][$AuCl_4$] PINC precipitate (See FIG. 4) becomes increasingly more difficult to disperse, requiring extensive sonication times (≥30 min) to return to a clear, yellow-orange solution. Simple tuning of the reaction parameters could alleviate these issues, allowing for the ultraconcentrated synthesis of extremely catalytically-active supported PINC@AuNPs.

FIG. 18 also shows that the plasmon band of lyophilized and reconstituted PINC@AuNPs from the 21.9 mM Au solution is nearly identical to that of the parent solution, with even a bit of band narrowing, indicating the suitability of these PINC@AuNPs for di storage.

Example 10. Preparation and Analyis of Fluorescent PINCs

Dansylated PINC herein abbreviated as DNS-PINC was synthesized using two routes. In Route 1 different mol % of premade DNS-APTMS (APTMS-3-aminopropyltrimethoxy silane) was mixed with cationic silane (comprising imidazolium, pyrrolidinium, and pyridinium organic moieties) in ethanol followed by the addition of $MgCl_2.6H_2O$ and adjusting the pH of the solution to 10 upon addition of a base and precipitation of nano clay using an antisolvent. Dry clay was obtained by lyophilization. In route 2 cationic PINC containing different mol % of free amine was post-synthetically modified with DNS-Cl to obtain different mol % of DNS-PINC (0.1-20 mol % dansyl units).

Quantum yield was calculated using following equation S2:

$$\Phi_s=\Phi_{ref}\times(A_{ref}/A_s)\times(F_s/F_{ref})\times(\eta_s/\eta_{ref})^2$$

where $\Phi_s$ and $\Phi_{ref}$ are the quantum yields of the sample and standard, $F_s$ and $F_{ref}$ are the integrated emission intensities of the corrected spectra for the sample and standard, $A_s$ and $A_{ref}$ are the absorbances of the sample and standard at the excitation wavelength, and $\eta_s$ and $\eta_{ref}$ are the indices of refraction of the sample and standard solutions, respectively. Quantum yield vs. mol % of DNS-ap silane is shown in FIG. 20.

The absorbance of samples was measured using UV-vis spectrophotometer (A≤0.1 for 1-cm path length cuvettes). The samples were excited at 350 nm while scanning their emission from 360-700 nm using a fluorescence spectrometer to measure emission intensity. Fluorescence intensity is reported as integrated intensity (peak area) calculated from 400-679 nm while avoiding the double-Rayleigh scattering starting at ~680 nm. All absorbance and emission spectra were acquired using 1-cm path length quartz cuvettes. The results of this analysis are shown in FIG. 21 and FIG. 22.

Quinine sulphate (QS) in 0.1 M $H_2SO_4$ ($\lambda_{ex}$=350 nm; refractive index of 0.1 M $H_2SO_4$=1.343; QY of quinine sulphate is 0.577) was used as the reference.

Example 11. Solvatochromic Behavior of Dansylated PINC and pKa Analysis

Solvatochromic behavior of dansylated PINC was studied using dioxane/water mixtures. Fluorophore was mixed with dioxane/water mixtures containing different wt. % of dioxane, such that the final concentration of fluorophore was ~15 μM. Solvent mixtures in the absence of fluorophore were used as the blank for each different mixture. Fluorescence was measured using a fluorometer where samples were excited at 350 nm wavelength and the emission was collected at the 360-700 nm wavelength range. All samples were measured using a 1 cm path length quartz cuvette. The results are shown in FIG. 23 and FIG. 24.

The fluorescence probe was mixed with a series of aqueous buffer solutions, with the pH ranging from 2-12, and such that the final concentration of the probe was ~15 μM. The samples were excited at 350 nm and the emission was scanned in the range of 360-700 nm using a fluorimeter (with the excitation and emission slit widths at 5.0 nm). All solutions were blank subtracted with their respective buffer solutions. The results are shown in FIG. 25 and FIG. 26.

Example 12. Mechanical Stress Evaluation of Nacre Mimetic PINC Composites 0.70 g of polyionic nanoclay (PINC; surface groups of [ppy]Cl, [mpim]Cl, or [mppyr]Cl) and 0.30 g of poly(vinyl alcohol) (PVA average MW 30,000-70,000 Da, 87-90% hydrolyzed) were separately dissolved in 5 mL of water. These solutions were then combined at room temperature and under magnetic stirring to achieve a 70 wt % PINC to PVA mixture. This mixture was degassed using sonication and poured into a 90 mm diameter petri dish, followed by drying under ambient conditions for 48 h to acquire thin films. The film thickness was measured in three locations using a micrometer and the average thickness was calculated. A list of synthesized materials is provided in Table 3 below.

TABLE 3

| Film Hybrid material | Structure |
|---|---|
| 70 wt% [ppy]Cl PINC/ PVA film (average thickness = 0.149 mm) | 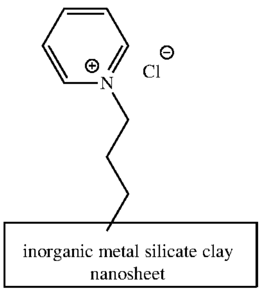 |
| 70 wt% [mpim]Cl PINC/ PVA film (average thickness = 0.155 mm) | 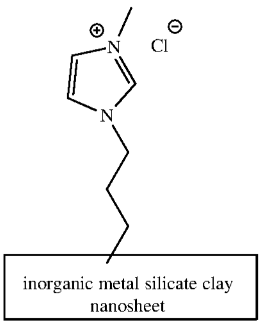 |

TABLE 3-continued

| Film Hybrid material | Structure |
|---|---|
| 70 wt% [mppyr]Cl PINC/ PVA film (average thickness = 0.169 mm) | 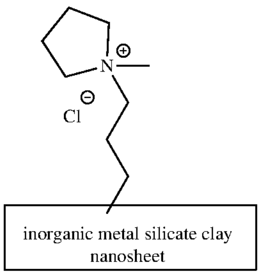 |

Preliminary mechanical tests were performed using a clip clamp setup where dog bone-shaped specimens (gauge length: 1 cm, width of the gauge length: 0.5 cm, width of the grip part: 1.5 cm, see images below) were clamped vertically and weight was attached to the bottom clip by adding measured aliquots of water in a hanging boat. Elongation upon stretching was measured using a micrometer. Young's modulus (E) is expressed in terms of force (F) applied over the area (A) of the sample cross-section, accounting for the change in length (ΔL) and the original length (L) using the equation S3:

$$E = \frac{F/A}{\Delta L/L}$$

The Young's modulus for the 70 wt % [ppy]Cl PINC/PVA film, [mpim]Cl PINC/PVA film, and [mppyr]Cl PINC/PVA film were calculated to be 426 GPa, 328 GPa, and 184 GPa, respectively. By way of comparison, here are typical Young's modulus values at room temperature for various materials: nylon (3 GPa), bamboo (10 GPa), bone (20 GPa), aluminum (70 GPa), spiderwebs (dragline) (10 GPa), titanium (120 GPa), high tensile steel (200 GPa), carbon fiber (200 GPa), Kevlar (180 GPa), carbon nanotubes (1000 GPa), and diamond (1200 GPa). Images of the specimen before and after the stress-strain test are shown in FIG. 27.

Further discussion of the polyionic nanoclays described herein is found in Larm et al., *Polyionic Nanoclays: Tailorable Hybrid Organic-Inorganic Catalytic Platforms*, Chem. Mater. 33(10), 3585-3592 (2021) along with the supporting information described therein, all of which is herein incorporated by reference in its entirety.

The embodiments being thus described, it will be obvious that the same may be varied in many ways. Such variations are not to be regarded as a departure from the spirit and scope of the disclosure and all such modifications are intended to be included within the scope of the following claims.

What is claimed is:

1. A functionalized organic-inorganic hybrid material comprising:

an inorganic metal silicate clay nanosheet having a surface and comprising a phyllosilicate, wherein the phyllosilicate comprises an octahedral magnesium cation interlayer disposed between cation-functionalized tetrahedral organosilicate sheets;

wherein the surface is modified by covalent attachment with a plurality of charged organic moieties; and wherein the plurality of charged organic moieties are covalently bound to the plurality of silicon atoms at the surface; and wherein the plurality of charged organic moieties has a plurality of non-covalent counterions associated with the plurality of charged organic moieties;

wherein the plurality of charged organic moieties comprises one or more permanently charged cationic groups;

wherein the plurality of non-covalent counterions comprises one or more anionic groups; and wherein the inorganic metal silicate clay nanosheet is a single layer nanosheet 5 nanometers or less in thickness.

2. The functionalized organic-inorganic hybrid material of claim 1, wherein the plurality of non-covalent counterions accompany the plurality of charged organic moieties to maintain electric neutrality.

3. The functionalized organic-inorganic hybrid material of claim 2, wherein the plurality of non-covalent counterions or the plurality of charged organic moieties further comprises a fluorescing fluorophore, wherein the fluorophore is a natural fluorophore, synthetic fluorophore, fluorescent protein, fluorescent peptide, nucleic acid, fluorogenic dye, reactive dye, or a combination thereof.

4. The functionalized organic-inorganic hybrid material of claim 1, wherein the one or more cationic groups comprise imidazolium, pyrrolidinium, pyridinium, cholinium, ammonium, phosphonium, sulfonium, a small biological species, a metal cation, a complex cation, or a combination thereof.

5. The functionalized organic-inorganic hybrid material of claim 4, wherein the small biological species comprises a saccharide, a peptide, or a combination thereof.

6. The functionalized organic-inorganic hybrid material of claim 1, wherein the one or more anionic groups comprise hexafluorophosphate, tetrafluoroborate, triflate, dicyanamide, methyl sulfate, dimethyl phosphate, acetate, trifluoroacetate, perchlorate, an amino acid, a carboxylate, bis(trifluoromethylsulfonyl)imide, an alkylsulfate, a sulfate, a halide, a pseudo-halide, a chromophore, a complex anion, or a combination thereof.

7. The functionalized organic-inorganic hybrid material of claim 1, wherein the anionic group comprises an alkylsulfate, alkylsulfonate, alkylcarboxylate, alkylphosphate, or a combination thereof.

8. The functionalized organic-inorganic hybrid material of claim 1, wherein the plurality of charged organic moieties further comprises a covalently bound zwitterionic organic moiety, such as a betaine, amino acid, or a combination thereof.

9. The functionalized organic-inorganic hybrid material of claim 1, wherein the plurality of charged organic moieties further comprises a pendant reactive group, wherein the pendant reactive group comprises a vinyl group, alkene, alkyne, methacrylate, alkyl halide, amine, epoxide, aldehyde, ketone, sulfhydryl group, maleimide, carboxylate, isothiocyanate, NHS ester, sulfonyl chloride, tosylate ester, glyoxal, photoreactive cross-linker, or a combination thereof.

10. The functionalized organic-inorganic hybrid material of claim 9, wherein the pendant reactive group is covalently coupled to a fluorescent probe, contrast agent, oligomer, polymer, chelating, extracting, targeting, or therapeutic ligand, aptamer, nucleic acid, enzyme, peptide, lipid, nanoparticle, or natural or synthetic antibody, or a combination thereof.

11. The functionalized organic-inorganic hybrid material of claim 1, further comprising one or more metal nanoparticles, bi-metallic nanoparticles, multi-metallic nanoparticles, or a combination thereof, wherein the one or more nanoparticles are supported on the surface of the inorganic metal silicate clay nanosheet.

12. The functionalized organic-inorganic hybrid material of claim 1, wherein the inorganic metal further comprises $Ca^{2+}$, $Zn^{2+}$, $Mn^{2+}$, $Co^{2+}$, $Ni^{2+}$, $Cu^{2+}$, $Ce^{3+}$, $Fe^{3+}$, $Al^{3+}$ or a lanthanide.

13. The functionalized organic-inorganic hybrid material of claim 1, wherein the functionalized organic-inorganic hybrid material has a completely or partially functionalized surface.

14. The functionalized organic-inorganic hybrid material of claim 1, wherein the functionalized organic-inorganic hybrid material is incorporated within a film, self-supported membrane, conformal coating, network, bulk material, or a combination thereof.

15. A method of synthesizing a functionalized organic-inorganic hybrid material comprising:

(i) reacting at least one non-ionic silane with at least one nucleophile to generate at least one ionic organosilane having a plurality of charged organic moieties; wherein the plurality of charged organic moieties are covalently bound to the organosilane; and (ii) reacting the ionic organosilane with a metal salt comprising Mg to form a functionalized organic-inorganic hybrid material comprising a clay nanosheet having a surface and comprising an inorganic metal comprising $Mg^{2+}$ and a plurality of silicon atoms; wherein the surface is modified by covalent attachment with the plurality of charged organic moieties; and wherein the plurality of charged organic moieties are covalently bound to the plurality of silicon atoms at the surface;

wherein the plurality of charged organic moieties has a plurality of non-covalent counterions associated with the plurality of charged organic moieties;

wherein the plurality of charged organic moieties comprises one or more permanently charged cationic groups;

wherein the plurality of non-covalent counterions comprises one or more anionic groups;

wherein the inorganic metal silicate clay nanosheet is a single layer nanosheet 5 nanometers or less in thickness, and wherein the inorganic metal silicate clay nanosheet comprises a phyllosilicate with an octahedral magnesium cation interlayer positioned between cation-functionalized tetrahedral organosilicates.

16. The method of claim 15, wherein the method further comprises (iii) contacting the functionalized organic-inorganic hybrid material with water to form an aqueous solution;

(iv) contacting the aqueous solution with one or more nanoparticles in the presence of a reducing agent; and (v) stabilizing the one or more nanoparticles on the surface of the functionalized organic-inorganic hybrid material; or wherein the method further comprises (iii) dissolving the functionalized organic-inorganic hybrid material in water to form an aqueous solution;

(iv) contacting the aqueous solution with a water-soluble polymer; and (v) forming the functionalized organic-inorganic hybrid material into a film.

17. A method of using a functionalized organic-inorganic hybrid material comprising:

(i) preparing a functionalized organic-inorganic hybrid material comprising a phyllosilicate with an octahedral magnesium cation interlayer positioned between cation-functionalized tetrahedral organosilicates by reacting at least one non-ionic silane with at least one nucleophile to generate at least one ionic organosilane having a plurality of charged organic moieties; wherein the plurality of charged organic moieties are covalently bound to the ionic organosilane; and reacting the ionic organosilane with a metal salt comprising Mg to form a functionalized organic-inorganic hybrid material comprising a clay nanosheet having a surface and comprising an inorganic metal comprising $Mg^{2+}$ and a plurality of silicon atoms; wherein the surface is modified by covalent attachment with the plurality of charged organic moieties; and wherein the plurality of charged organic moieties are covalently bound to the plurality of silicon atoms at the surface; and (ii) using the functionalized organic-inorganic hybrid material.

18. The method of claim 17, wherein the using comprises:

(iia) contacting a solution comprising one or more contaminants with a surface comprising the functionalized organic-inorganic hybrid material;

(iib) reducing the concentration of the one or more contaminants in the solution to form a treated solution; and (iic) optionally, repeating step (iia) or step (iib) one or more times with the treated solution; or wherein the using comprises using the functionalized organic-inorganic hybrid material in a catalytic reaction.

* * * * *